United States Patent
Crabtree et al.

(10) Patent No.: US 12,438,906 B2
(45) Date of Patent: *Oct. 7, 2025

(54) DETECTING KERBEROS TICKET ATTACKS WITHIN A DOMAIN

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,954

(22) Filed: Apr. 18, 2024

(65) Prior Publication Data

US 2024/0267402 A1 Aug. 8, 2024

Related U.S. Application Data

(63) Continuation of application No. 18/489,003, filed on Oct. 18, 2023, now Pat. No. 11,968,227, which is a continuation of application No. 17/973,520, filed on Oct. 25, 2022, now Pat. No. 11,799,900, said application No. 17/170,288 is a continuation-in-part of application No. 17/169,924, filed on Feb. 8, 2021, now Pat. No. 11,570,209, said application No. 17/973,520 is a continuation of application No. 17/170,288, filed on Feb. 8, 2021, now Pat. No. 11,570,204, said application No. 17/169,924 is a
(Continued)

(51) Int. Cl.
*H04L 9/40* (2022.01)
*G06F 16/2458* (2019.01)

(52) U.S. Cl.
CPC ...... *H04L 63/1441* (2013.01); *G06F 16/2474* (2019.01); *H04L 63/123* (2013.01); *H04L 63/20* (2013.01)

(58) Field of Classification Search
CPC ... G06F 16/2474; H04L 63/20; H04L 63/123; H04L 63/1441
See application file for complete search history.

(56) References Cited

U.S. PATENT DOCUMENTS 6,256,544 B1 7/2001 Weissinger
7,281,125 B2 10/2007 Challener et al.
(Continued)

FOREIGN PATENT DOCUMENTS

WO 2014159150 A1 10/2014
WO 2017075543 A1 5/2017

*Primary Examiner* — Mohammad A Siddiqi
(74) *Attorney, Agent, or Firm* — Galvin Patent Law LLC; Brian R Galvin

(57) ABSTRACT

A system and methods for mitigating authentication ticket attacks within a domain is provided, comprising an authentication object inspector configured to observe a new authentication object generated by an identity provider, and retrieve the new authentication object; and a hashing engine configured to retrieve the new authentication object from the authentication object inspector, calculate a cryptographic hash for the new authentication object, and store the cryptographic hash for the new authentication object in a data store; wherein subsequent access requests accompanied by authentication objects are validated by near-real-time comparison of hashes for each authentication object to previously-generated hashes.

12 Claims, 41 Drawing Sheets

Related U.S. Application Data continuation-in-part of application No. 15/837,845, filed on Dec. 11, 2017, now Pat. No. 11,005,824, which is a continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, and a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/616,427 is a continuation-in-part of application No. 14/925,974, filed on Oct. 28, 2015, now abandoned.

(60) Provisional application No. 62/596,105, filed on Dec. 7, 2017.

(56) References Cited

U.S. PATENT DOCUMENTS

| | | |
|---|---|---|
| 7,702,821 B2 | 4/2010 | Feinberg et al. |
| 8,601,554 B2 | 12/2013 | Gordon et al. |
| 9,137,131 B1 | 9/2015 | Sarukkai et al. |
| 9,203,829 B1 | 12/2015 | Levine et al. |
| 9,253,643 B2 | 2/2016 | Pattar et al. |
| 9,292,692 B2 | 3/2016 | Wallrabenstein |
| 9,602,530 B2 | 3/2017 | Ellis et al. |
| 9,652,604 B1 | 5/2017 | Johansson et al. |
| 9,853,977 B1 * | 12/2017 | Laucius ............... H04L 63/0884 |
| 10,038,559 B2 | 7/2018 | Burrows et al. |
| 10,050,787 B1 | 8/2018 | Johansson et al. |
| 10,061,635 B2 | 8/2018 | Ellwein |
| 10,237,259 B2 | 3/2019 | Ronda et al. |
| 10,248,910 B2 | 4/2019 | Crabtree et al. |
| 10,367,829 B2 | 7/2019 | Huang et al. |
| 10,410,214 B2 | 9/2019 | Doyle |
| 10,628,578 B2 | 4/2020 | Eksten et al. |
| 10,645,086 B1 | 5/2020 | Hadler |
| 11,005,824 B2 | 5/2021 | Crabtree et al. |
| 11,005,827 B2 * | 5/2021 | Wang ................... H04L 9/0662 |
| 11,329,980 B2 | 5/2022 | Callahan et al. |
| 11,570,204 B2 | 1/2023 | Crabtree et al. |
| 11,570,209 B2 * | 1/2023 | Crabtree ............... H04L 9/0643 |
| 11,799,900 B2 * | 10/2023 | Crabtree ............ H04L 63/1441 |
| 11,818,169 B2 * | 11/2023 | Crabtree ............... H04L 9/0643 |
| 11,968,227 B2 * | 4/2024 | Crabtree ................ H04L 63/20 |
| 2003/0041254 A1 | 2/2003 | Challener et al. |
| 2003/0145225 A1 | 7/2003 | Bruton, III et al. |
| 2005/0210255 A1 | 9/2005 | Kirovski |
| 2007/0036314 A1 | 2/2007 | Kloberdans et al. |
| 2007/0136821 A1 | 6/2007 | Hershaft et al. |
| 2007/0150744 A1 | 6/2007 | Cheng et al. |
| 2008/0021866 A1 | 1/2008 | Hinton et al. |
| 2009/0182672 A1 | 7/2009 | Doyle |
| 2011/0087888 A1 | 4/2011 | Rennie |
| 2011/0302412 A1 | 12/2011 | Deng et al. |
| 2013/0117831 A1 | 5/2013 | Hook et al. |
| 2015/0128258 A1 | 5/2015 | Novozhenets |
| 2015/0281225 A1 * | 10/2015 | Schoen ................. H04L 63/08 726/9 |
| 2015/0317481 A1 | 11/2015 | Gardner et al. |
| 2016/0072845 A1 | 3/2016 | Chiviendacz et al. |
| 2016/0275123 A1 | 9/2016 | Lin et al. |
| 2020/0014680 A1 | 1/2020 | Gujarathi |
| 2021/0099868 A1 | 4/2021 | Damlaj et al. |

\* cited by examiner

DETECTING KERBEROS TICKET ATTACKS WITHIN A DOMAIN

CROSS-REFERENCE TO RELATED APPLICATIONS

Priority is claimed in the application data sheet to the following patents or patent applications, each of which is expressly incorporated herein by reference in its entirety:
Ser. Nos. 18/489,003
17/973,520
17/170,288
17/169,924
15/837,845
62/596,105
15/825,350
15/725,274
15/655,113
15/616,427
14/925,974
15/237,625
15/206,195
15/186,453
15/166,158
15/141,752
15/091,563
14/986,536

BACKGROUND OF THE INVENTION

Field of the Invention

The disclosure relates to the field of network security, particularly to the detecting and mitigating attacks involving forged authentication objects.

Discussion of the State of the Art

Maintaining the security of computer systems is a matter of great economic significance in the modern world. At the same time, computer users within large enterprises, which maintain one or several protected computing domains each comprising many computers and other devices, often require secure access on many devices across the domain. A common way of providing this securely is to use domain controllers to provide authentication objects for users—after they successfully authenticate themselves—so that they can access those devices, applications, and services within the domain that are authorized for their particular user profile. Unfortunately, even with strong authentication systems such as KERBEROS, which is used within Microsoft Active Directory domains, security lapses do occur. In particular, a variety of KERBEROS-based attack vectors have been shown to be possible, including "golden ticket" and "silver ticket" attacks, which may grant to hostile attackers potentially unlimited access to and control of vital domain assets if not detected quickly.

What is needed is a system that can mitigate, in real-time, ticket-based KERBEROS attacks in enterprise domains.

SUMMARY OF THE INVENTION

Accordingly, the inventor has conceived, and reduced to practice, a system and method for detecting and mitigating Kerberos ticket attacks within a domain.

In a typical embodiment, a system for detecting and mitigating forged authentication object attacks acts as an external, and non-blocking validation service for existing implementations using an authentication domain that uses a common identity provider. The system provides services to generate cryptographic hashes to legitimately-generated authentication objects, and also to check incoming authentication objects against a database of cryptographic hashes of previously-generated authentication objects (and detecting fraudulent authentication attempts by detecting attempts whose authentication objects' cryptographic hashes are not present in the database of authentication object hashes). The system may also allow setting of a plurality of rules to trigger events after certain conditions are satisfied.

In one aspect of the invention, a system for mitigating Kerberos ticket attacks within a domain, comprising: an authentication object inspector comprising at least a processor, a memory, and a plurality of programming instructions stored in the memory and operating on the processor, wherein the programmable instructions, when operating on the processor, cause the processor to: receive network traffic comprising a plurality of network packets, the plurality of network packets comprising at least a plurality of first authentication objects known to be generated by an identity provider associated with an authentication domain; store a record of each received authentication object, with attached metadata comprising at least a timestamp of when the authentication object was received, in a time-series database; calculate a cryptographic hash of each first authentication object using a hashing engine; store the cryptographic hashes of the first authentication objects in a database of hashes for the identity provider; receive a request for access to a network resource within the authentication domain accompanied by a second authentication object; calculate a cryptographic hash of the second authentication object using the hashing engine; compare the hash of the second authentication object with the hashes of the first authentication objects stored in the database of hashes to determine whether the hash of the second authentication object already exists in the database; where the hash of the second authentication object does not exist in the database: analyze a plurality of stored authentication object records to determine a plurality of compromised accounts; analyze a plurality of stored traffic records to determine a plurality of access paths; generate an incident report comprising the results of the analyses of the plurality of stored authentication object records and the plurality of stored traffic records; transmit the incident report via a second network connection that is not connected to, or visible to, to the identity provider; and a hashing engine comprising a second plurality of programming instructions stored in the memory of, and operating on the processor of, the computing device, wherein the second plurality of programmable instructions, when operating on the processor, cause the computing device to: receive authentication objects from the authentication object inspector; calculate a cryptographic hash for each authentication object received by performing at least a plurality of calculations and transformations on each authentication object received; and return the cryptographic hash of each authentication object received to the authentication object inspector, is disclosed.

In another aspect of the invention, a method for mitigating Kerberos ticket attacks within a domain, comprising the steps of: (a) identifying an invalid authentication ticket claiming to be issued by an identity provider based on a mismatch between a calculated cryptographic hash and a stored cryptographic hash; (b) analyzing a plurality of stored authentication object records to determine a plurality of compromised accounts; (c) analyzing a plurality of stored traffic records to determine a plurality of access paths; (d) generating an incident report comprising the results of the analyses of the plurality of stored authentication object records and the plurality of stored traffic records; (e) transmitting the incident report via a secondary network connection that is not visible to the identity provider; (f) identifying a plurality of low-risk compromised accounts from within the plurality of compromised accounts; (g) disabling all compromised accounts except the identified plurality of low-risk accounts; (h) disabling additional compromised accounts as they appear; (i) when no new compromised accounts have appeared after a determined time period, remove the plurality of access paths; (j) repeating steps (b) through (i) for any additional access attempt using one of the plurality of low-risk accounts; and (k) when no additional attempts have been made using a low-risk account after a determined time period, disable the low-risk account, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
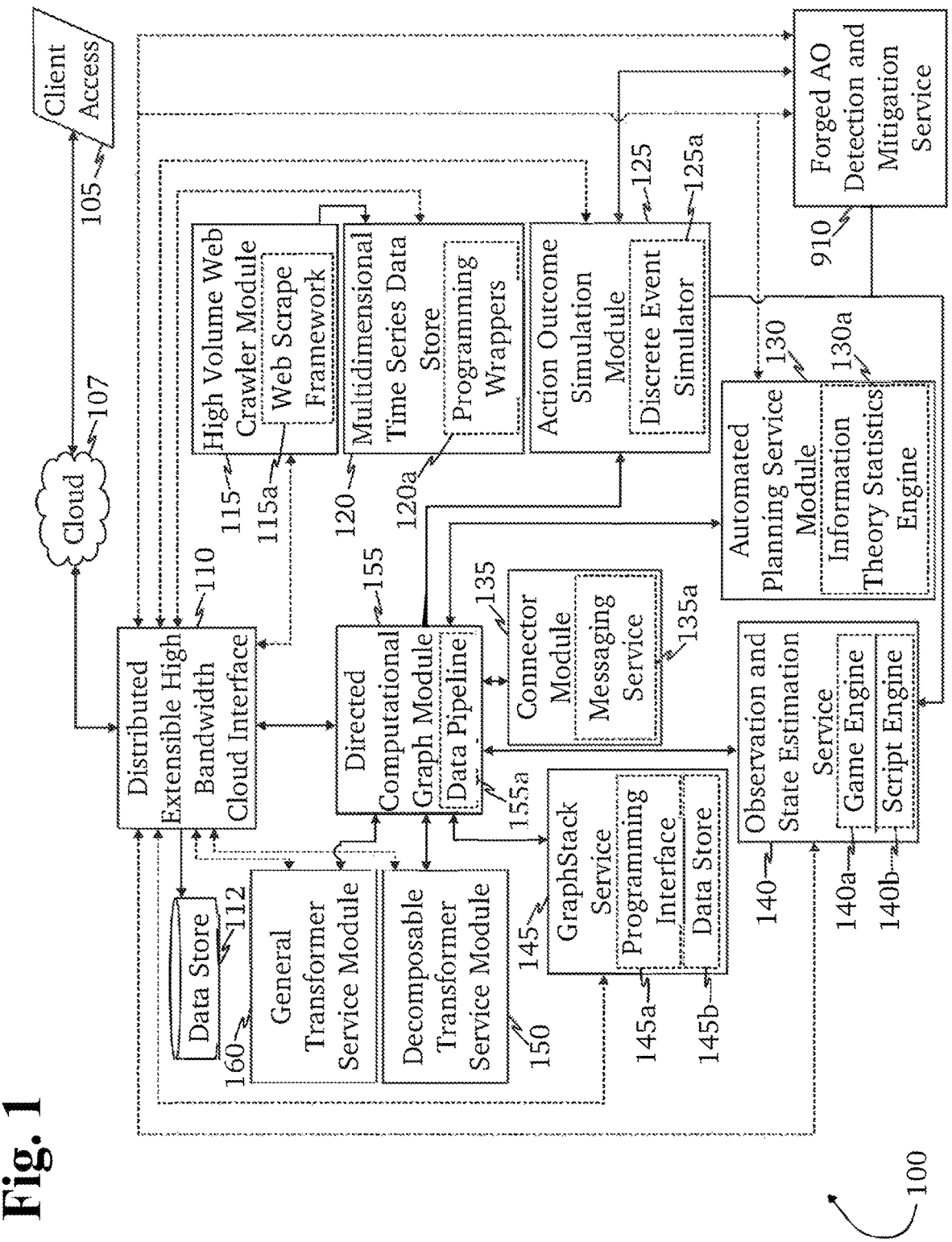
FIG. 1 is a diagram of an exemplary architecture of an advanced cyber decision platform according to one aspect.

The inventor has conceived, and reduced to practice, a system and method for detecting and mitigating Kerberos ticket attacks within a domain.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph=

(Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention.

As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context", as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline", as used herein and interchangeably referred to as a "data pipeline" or a "processing pipeline", refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

Conceptual Architecture

Figure 30:
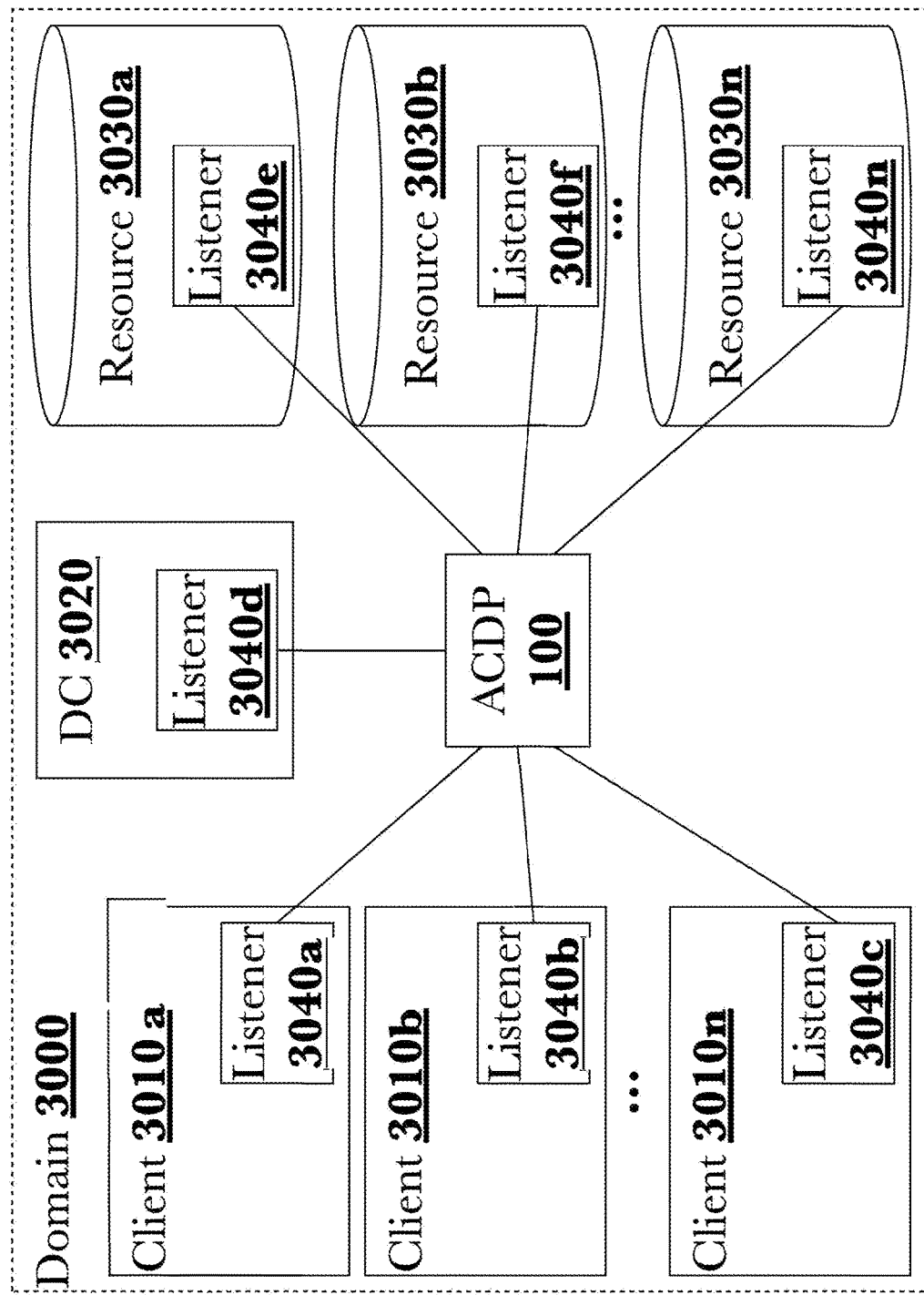
FIG. 30 is a block diagram illustrating a system for detecting and mitigating attacks using forged authentication objects within a domain, according to a preferred embodiment of the invention.

FIG. 30 is a block diagram illustrating a system for detecting and mitigating attacks using forged authentication objects (AOs) within a domain, according to a preferred embodiment of the invention. According to the embodiment, an advanced cyber decision platform (ACDP) 100 may be operated within a domain 3000, providing analysis and predictive capabilities that are discussed in greater detail below (referring to FIG. 1). A plurality of client devices 3010*a-n* may connect to a domain controller 3020 for authentication purposes, receiving authentication tickets as appropriate when a client passes authentication (for example, when the client device is known and provides valid credentials for an account). An identity provider such as a Kerberos domain controller (DC) 3020 authenticates devices and accounts before providing an authentication ticket comprising an authentication object to a requesting device, which is then used to access resources 3030*a-n* within the domain according to the privileges given to the ticketholder's account. This facilitates single sign-on (SSO) within a domain and minimizes the risks associated with passing credentials between devices in a network, as the user authenticates once and is issued a ticket that may then be checked at each resource to determine an access level, rather than requiring the user to sign on at each resource individually.

More particularly, a client device 3010*a-n* first requests a SSO ticket (also referred to as a ticket-granting-ticket, or TGT) from the DC 3020. The DC returns a TGT that is encrypted using a key known only to the DC, which is then stored on the client device. When the client device attempts to access a resource 3030*a-n* on the network, it provides the TGT to the domain controller where it is checked for validity (for example, ensuring that the account is valid and the ticket has not expired), and if valid the account is checked for access privileges to the requested resource. If access is permitted, the DC returns a ticket and session key specific to the requesting client and the resource being accessed, allowing the user to access the resource transparently without the need for additional sign-on (as the tickets and keys are exchanged in the background without user involvement, and typically the exchange occurs rapidly with no apparent delay in accessing the resource).

In traditional arrangements, this architecture is vulnerable to a variety of ticket-based attacks involving forged tickets, such as a "golden ticket" attack wherein a TGT is forged and used to obtain full domain administrator privileges (for example, by manufacturing tickets for falsified accounts with full privileges within the domain), or a "silver ticket" attack where a ticket is forged for a specific account by exploiting information that is ordinarily inaccessible in memory on a client device. Generally, Kerberos ticket-based attack types include, but are not limited to: sapphire, diamond, golden, silver, and similar attacks that rely on compromising one or more aspects of Kerberos ticket-based privilege management. To detect and mitigate this category of threats, a plurality of listeners 3040*a-n* may be installed on each of the client devices, the domain controller, and any connected resources within the domain. Each listener passively collects cryptographic hashes for tickets exchanged between the DC and clients, which may then (by the ACDP) be compared against previous hashes for known-issued tickets. Attacks may then be identified based on hash mismatches, such as (for example) detecting a Kerberos ticket attack by identifying a client passing a TGT when no TGT was previously issued to the client, or detecting a silver ticket attack by identifying when a client is passing a service ticket when no such service ticket was issued to that client. The specific threat identification methods are described below in greater detail, with reference to FIGS. 31-37.

FIG. 1 is a diagram of an exemplary architecture of an advanced cyber decision platform (ACDP) 100 according to one aspect. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135*a* needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155*a*, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115*a* of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145*a*, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

For example, the Information Assurance department is notified by the system 100 that principal X is using credentials K (Kerberos Principal Key) never used by it before to access service Y. Service Y utilizes these same credentials to access secure data on data store Z. This correctly generates an alert as suspicious lateral movement through the network and will recommend isolation of X and Y and suspension of K based on continuous baseline network traffic monitoring by the multidimensional time series data store 120 programmed to process such data 120a, rigorous analysis of the network baseline by the directed computational graph 155 with its underlying general transformer service module 160 and decomposable transformer service module 150 in conjunction with the AI and primed machine learning capabilities 130a of the automated planning service module 130 which had also received and assimilated publicly available from a plurality of sources through the multi-source connection APIs of the connector module 135. Ad hoc simulations of these traffic patterns are run against the baseline by the action outcome simulation module 125 and its discrete event simulator 125a which is used here to determine probability space for likelihood of legitimacy. The system 100, based on this data and analysis, was able to detect and recommend mitigation of a cyberattack that represented an existential threat to all business operations, presenting, at the time of the attack, information most needed for an actionable plan to human analysts at multiple levels in the mitigation and remediation effort through use of the observation and state estimation service 140 which had also been specifically preprogrammed to handle cybersecurity events 140b.

A forged authentication object detection and mitigation service 910 may be used to detect and mitigate cyberattacks stemming from the use of authentication objects generated by an attacker. Service 910 is discussed in further detail below in FIG. 2.

According to one aspect, the advanced cyber decision platform, a specifically programmed usage of the business operating system, continuously monitors a client enterprise's normal network activity for behaviors such as but not limited to normal users on the network, resources accessed by each user, access permissions of each user, machine to machine traffic on the network, sanctioned external access to the core network and administrative access to the network's identity and access management servers in conjunction with real-time analytics informing knowledge of cyberattack methodology. The system then uses this information for two purposes: First, the advanced computational analytics and simulation capabilities of the system are used to provide immediate disclosure of probable digital access points both at the network periphery and within the enterprise's information transfer and trust structure and recommendations are given on network changes that should be made to harden it prior to or during an attack. Second, the advanced cyber decision platform continuously monitors the network in real-time both for types of traffic and through techniques such as deep packet inspection for pre-decided analytically significant deviation in user traffic for indications of known cyberattack vectors such as, but not limited to, ACTIVE DIRECTORY™/Kerberos pass-the-ticket attack, ACTIVE DIRECTORY™/Kerberos pass-the-hash attack and the related ACTIVE DIRECTORY™/Kerberos overpass-the-hash attack, ACTIVE DIRECTORY™/Kerberos Skeleton Key, ACTIVE DIRECTORY™/Kerberos golden and silver ticket attack, privilege escalation attack, compromised user credentials, ransomware disk attacks, and forged authentication object attack (also may be referred to as authentication tickets). When suspicious activity at a level signifying an attack (for example, including but not limited to skeleton key attacks, pass-the-hash attacks, or attacks via compromised user credentials) is determined, the system issues action-focused alert information to all predesignated parties specifically tailored to their roles in attack mitigation or remediation and formatted to provide predictive attack modeling based upon historic, current, and contextual attack progression analysis such that human decision makers can rapidly formulate the most effective courses of action at their levels of responsibility in command of the most actionable information with as little distractive data as possible. The system then issues defensive measures in the most actionable form to end the attack with the least possible damage and exposure. All attack data are persistently stored for later forensic analysis.

Figure 2:
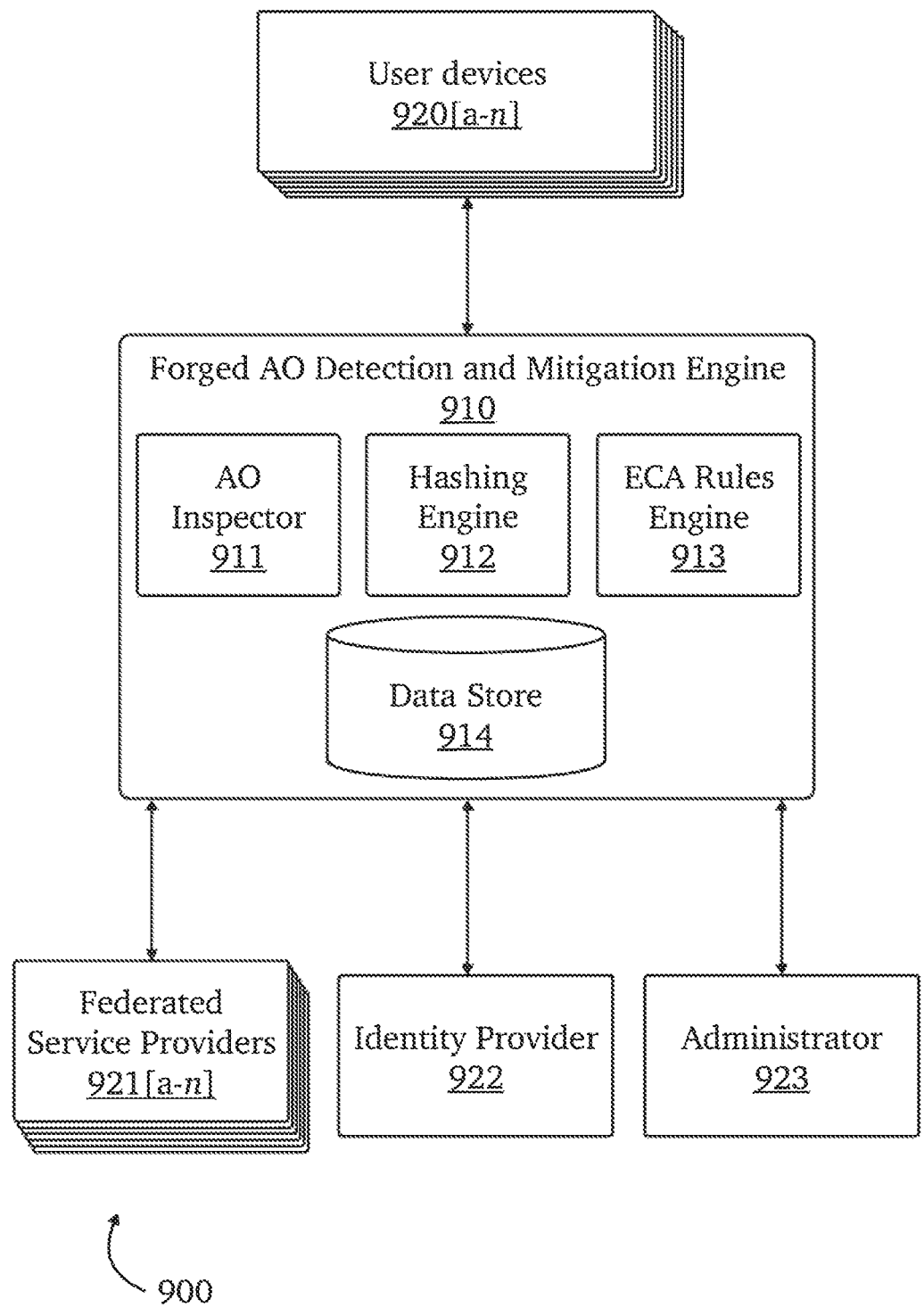
FIG. 2 is a block diagram illustrating an exemplary system architecture for a system for detecting and mitigating forged authentication object attacks according to various embodiments of the invention.

FIG. 2 is a block diagram illustrating an exemplary system architecture 900 for a system 910 for detecting and mitigating forged authentication object attacks according to various embodiments of the invention. Architecture 900 may comprise system 910 acting as a non-blocking intermediary between a connecting user 920[*a-n*], a plurality of federated service providers (SP) 921a-n, an identity provider (IdP) 922, and an administrative user 923.

System 910 may be configured to verifying incoming connections when the user has an AO, and also keeps track of legitimately generated AO's. System 910 may comprise an AO inspector 911, a hashing engine 912, an event-condition-action (ECA) rules engine 913, and a data store 914.

AO inspector 911 may be configured to use faculties of ACDP 100, for example DCG module 155 and associated transformer modules to analyze and process AO's associated with incoming connections, and observation and state estimation services 140 to monitor connections for incoming AO's. Incoming AO's may be retrieved for further analysis by system 910.

Hashing engine 912 may be configured to calculate a cryptographic hash for AOs generated by identity provider 922 using functions of ACDP 100, such as DCG module 155, generate a cryptographic hash for both incoming AO's (for analysis purposes), and new AO's created by IdP 922. A one-way hash may be used to allow protecting of sensitive information contained in the AO, but preserving uniqueness of each AO. Generated hashes may be stored in data store 914. Hashing engine may also run a hash check function, used for validating incoming AO's.

ECA rules engine 913 may be used by a network administrator to create and manage ECA rules that may trigger actions and queries in the event of detection of a forged AO. Rules may be for example, tracking and logging the actions of the suspicious user, deferring the suspicious connection, and the like. Rules may be nested to create a complex flow of various conditional checks and actions to create a set of "circuit breaker" checks to further ascertain the connection, or try and resolve the matter automatically before notifying a human network administrator.

Data store 914 may be a graph and time-series hybrid database, such as multidimensional time-series data store 120 or data store 112, that stores hashes, ECA rules, log data, and the like, and may be quickly and efficiently queried and processed using ACDP 100.

Federated service providers 921*a-n* may comprise a group of trusted service partners that may share a common IdP 922 in which user 920[*a-n*] may wish to access. Federated service providers 921*a-n* may be, for instance, services employing MICROSOFT'S ACTIVE DIRECTORY FEDERATED SERVICES (AS DS), AZURE AD, OKTA, many web browser single-sign-on (SSO) implementations, cloud service provides (such as, AMAZON AWS, AZURE, and GOOGLE), and the like.

Figure 3A:
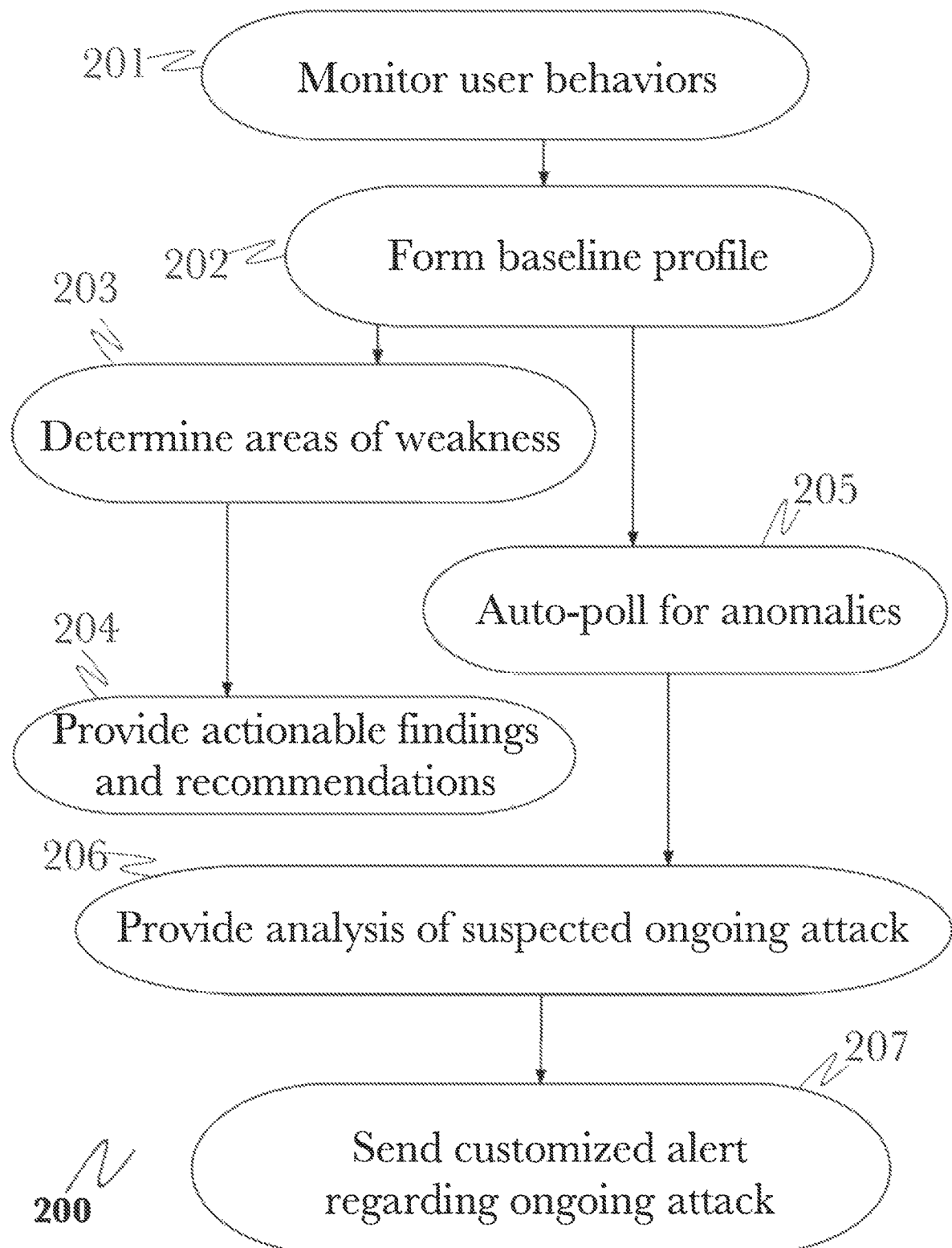
FIG. 3A is a flow diagram of an exemplary function of the business operating system in the detection and mitigation of predetermining factors leading to and steps to mitigate ongoing cyberattacks.

FIG. 3A is a flow diagram of an exemplary function of the business operating system in the detection and mitigation of predetermining factors leading to and steps to mitigate ongoing cyberattacks 200. The system continuously retrieves network traffic data 201 which may be stored and preprocessed by the multidimensional time series data store 120 and its programming wrappers 120*a*. All captured data are then analyzed to predict the normal usage patterns of network nodes such as internal users, network connected systems and equipment and sanctioned users external to the enterprise boundaries for example off-site employees, contractors and vendors, just to name a few likely participants. Of course, normal other network traffic may also be known to those skilled in the field, the list given is not meant to be exclusive and other possibilities would not fall outside the design of the invention. Analysis of network traffic may include graphical analysis of parameters such as network item to network usage using specifically developed programming in the graphstack service 145, 145*a*, analysis of usage by each network item may be accomplished by specifically pre-developed algorithms associated with the directed computational graph module 155, general transformer service module 160 and decomposable service module 150, depending on the complexity of the individual usage profile 201. These usage pattern analyses, in conjunction with additional data concerning an enterprise's network topology; gateway firewall programming; internal firewall configuration; directory services protocols and configuration; and permissions profiles for both users and for access to sensitive information, just to list a few non-exclusive examples may then be analyzed further within the automated planning service module 130, where machine learning techniques which include but are not limited to information theory statistics 130*a* may be employed and the action outcome simulation module 125, specialized for predictive simulation of outcome based on current data 125*a* may be applied to formulate a current, up-to-date and continuously evolving baseline network usage profile 202. This same data would be combined with up-to-date known cyberattack methodology reports, possibly retrieved from several divergent and exogenous sources through the use of the multi-application programming interface aware connector module 135 to present preventative recommendations to the enterprise decision makers for network infrastructure changes, physical and configuration-based to cost effectively reduce the probability of a cyberattack and to significantly and most cost effectively mitigate data exposure and loss in the event of attack 203, 204.

While some of these options may have been partially available as piecemeal solutions in the past, we believe the ability to intelligently integrate the large volume of data from a plurality of sources on an ongoing basis followed by predictive simulation and analysis of outcome based upon that current data such that actionable, business practice efficient recommendations can be presented is both novel and necessary in this field.

Once a comprehensive baseline profile of network usage using all available network traffic data has been formulated, the specifically tasked business operating system continuously polls the incoming traffic data for activities anomalous to that baseline as determined by pre-designated boundaries 205. Examples of anomalous activities may include a user attempting to gain access several workstations or servers in rapid succession, or a user attempting to gain access to a domain server of server with sensitive information using random userIDs or another user's userID and password, or attempts by any user to brute force crack a privileged user's password, or replay of recently issued ACTIVE DIRECTORY™/Kerberos ticket granting tickets, or using a forged Kerberos ticket, or the presence on any known, ongoing exploit on the network or the introduction of known malware to the network, just to name a very small sample of the cyberattack profiles known to those skilled in the field. The invention, being predictive as well as aware of known exploits is designed to analyze any anomalous network behavior, formulate probable outcomes of the behavior, and to then issue any needed alerts regardless of whether the attack follows a published exploit specification or exhibits novel characteristics deviant to normal network practice. Once a probable cyberattack is detected, the system then is designed to get needed information to responding parties 206 tailored, where possible, to each role in mitigating the attack and damage arising from it 207. This may include the exact subset of information included in alerts and updates and the format in which the information is presented which may be through the enterprise's existing security information and event management system. Network administrators, then, might receive information such as but not limited to where on the network the attack is believed to have originated, what systems are believed currently affected, predictive information on where the attack may progress, what enterprise information is at risk and actionable recommendations on repelling the intrusion and mitigating the damage, whereas a chief information security officer may receive alert including but not limited to a timeline of the cyberattack, the services and information believed compromised, what action, if any has been taken to mitigate the attack, a prediction of how the attack may unfold and the recommendations given to control and repel the attack 207, although all parties may access any network and cyberattack information for which they have granted access at any time, unless compromise is suspected. Other specifically tailored updates may be issued by the system 206, 207.

Figure 3B:
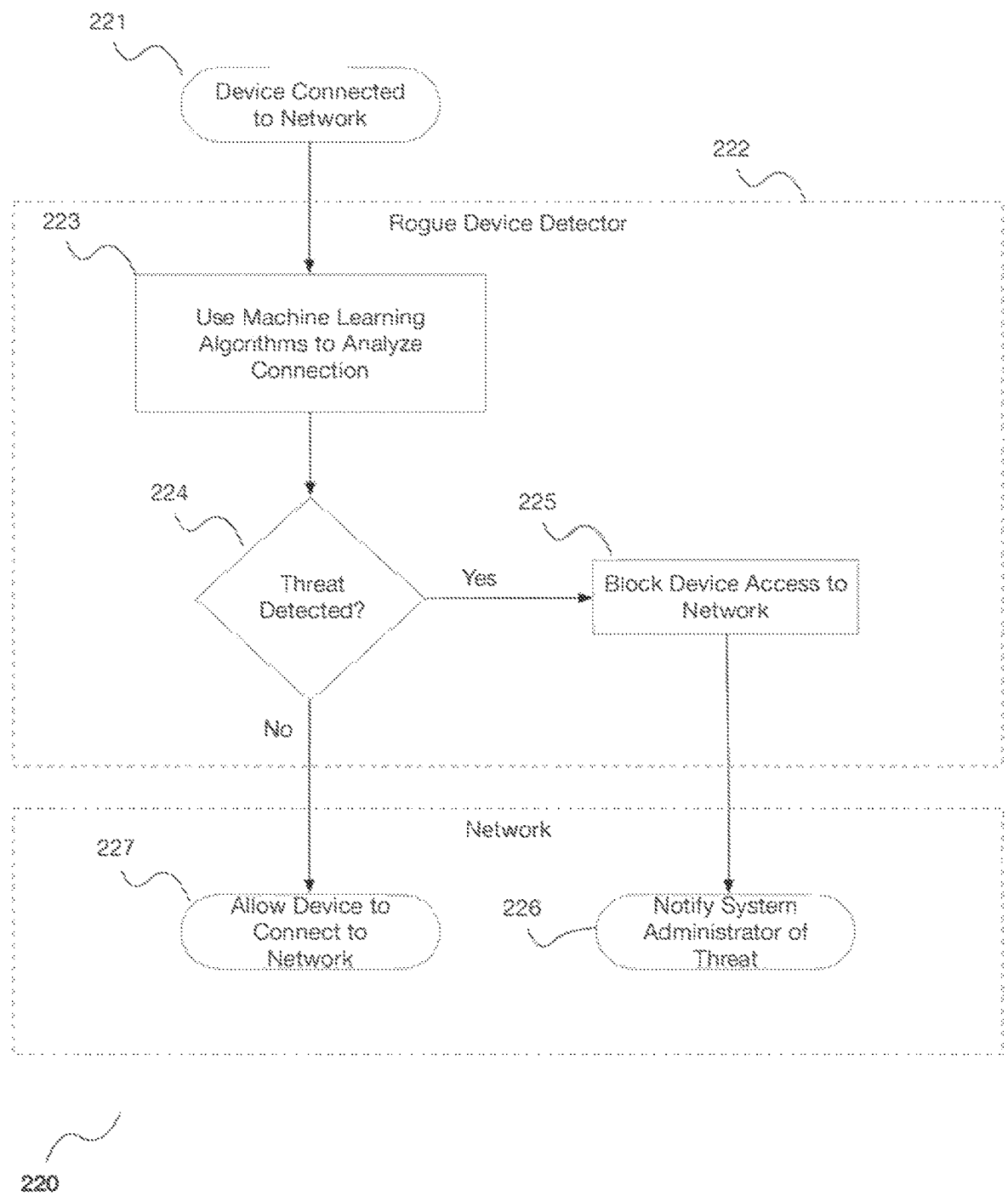
FIG. 3B is a process diagram showing a general flow of the process used to detect rogue devices and analyze them for threats.

FIG. 3B is a process diagram showing a general flow of the process used to detect rogue devices and analyze them for threats 220. Whenever a device is connected to the network 221, the connection is immediately sent to the rogue device detector 222 for analysis. As disclosed below at 300, the advanced cyber decision platform uses machine learning algorithms to analyze system-wide data to detect threats. The connected device is analyzed 223 to assess its device type, settings, and capabilities, the sensitivity of the data stored on the server to which the device wishes to connect, network activity, server logs, remote queries, and a multitude of other data to determine the level of threat associated with the device. If the threat reaches a certain level 224, the device is automatically prevented from accessing the network 225, and the system administrator is notified of the potential threat, along with contextually-based, tactical recommendations for optimal response based on potential impact 226. Otherwise, the device is allowed to connect to the network 227.

Figure 3C:
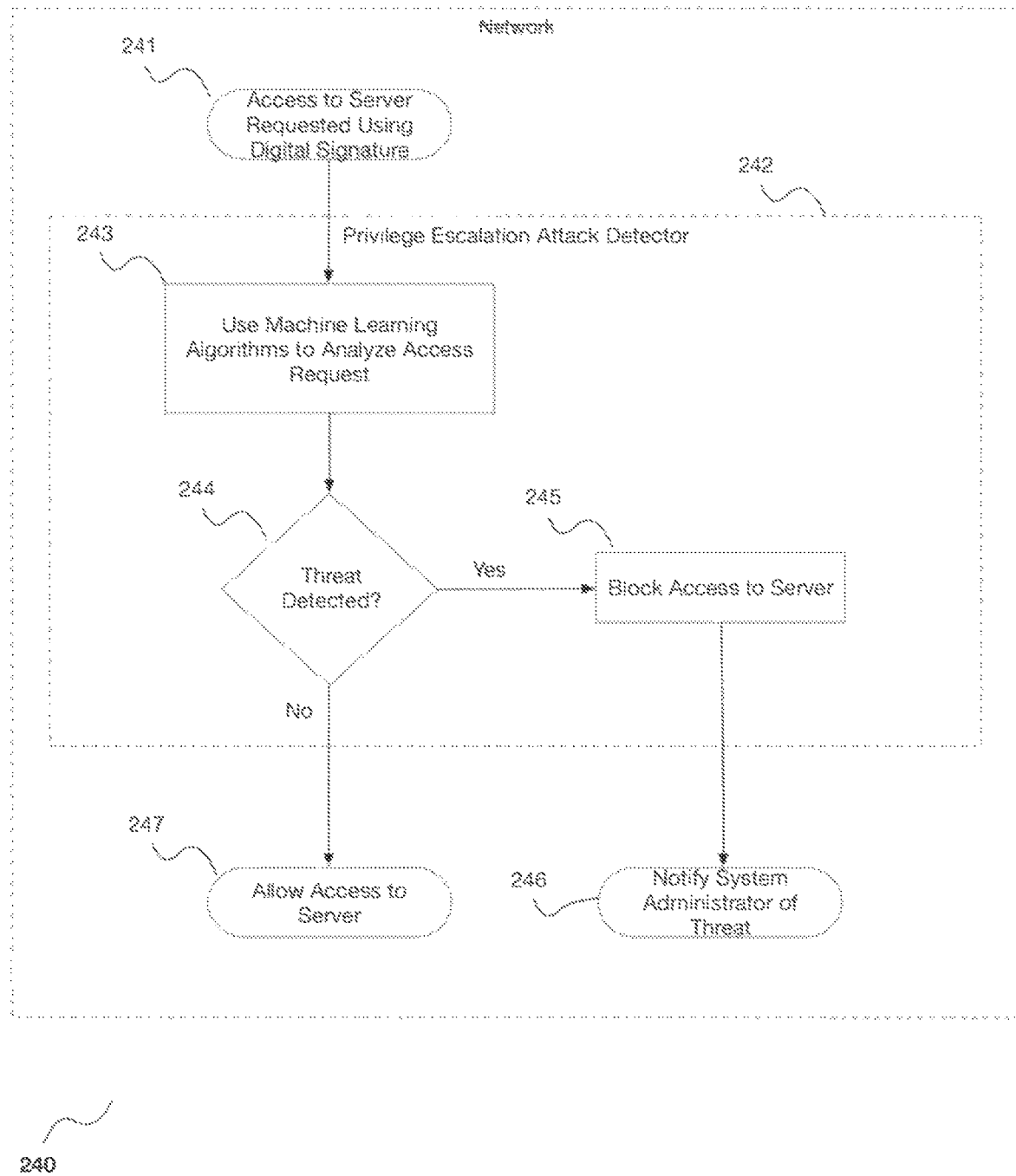
FIG. 3C is a process diagram showing a general flow of the process used to detect and prevent privilege escalation attacks on a network.

FIG. 3C is a process diagram showing a general flow of the process used to detect and prevent privilege escalation attacks on a network (for example, "Golden Ticket" attacks) 240. When access to a server within the network is requested using a digital signature or AO 241, the connection is immediately sent to the privilege escalation attack detector 242 for analysis. As disclosed below at 300, the advanced cyber decision platform uses machine learning algorithms to analyze system-wide data to detect threats. The access request is analyzed 243 to assess the validity of the access request using the digital signature validation, plus other system-wide information such as the sensitivity of the server being accessed, the newness of the digital signature or AO, the digital signature's or AO's prior usage, and other measures of the digital signature's or AO's validity. If the assessment determines that the access request represents a significant threat 244, even despite the Kerberos validation of the digital signature or validation of a AO, the access request is automatically denied 245, and the system administrator is notified of the potential threat, along with contextually-based, tactical recommendations for optimal response based on potential impact 246. Otherwise, the access request is granted 247.

Figure 3D:
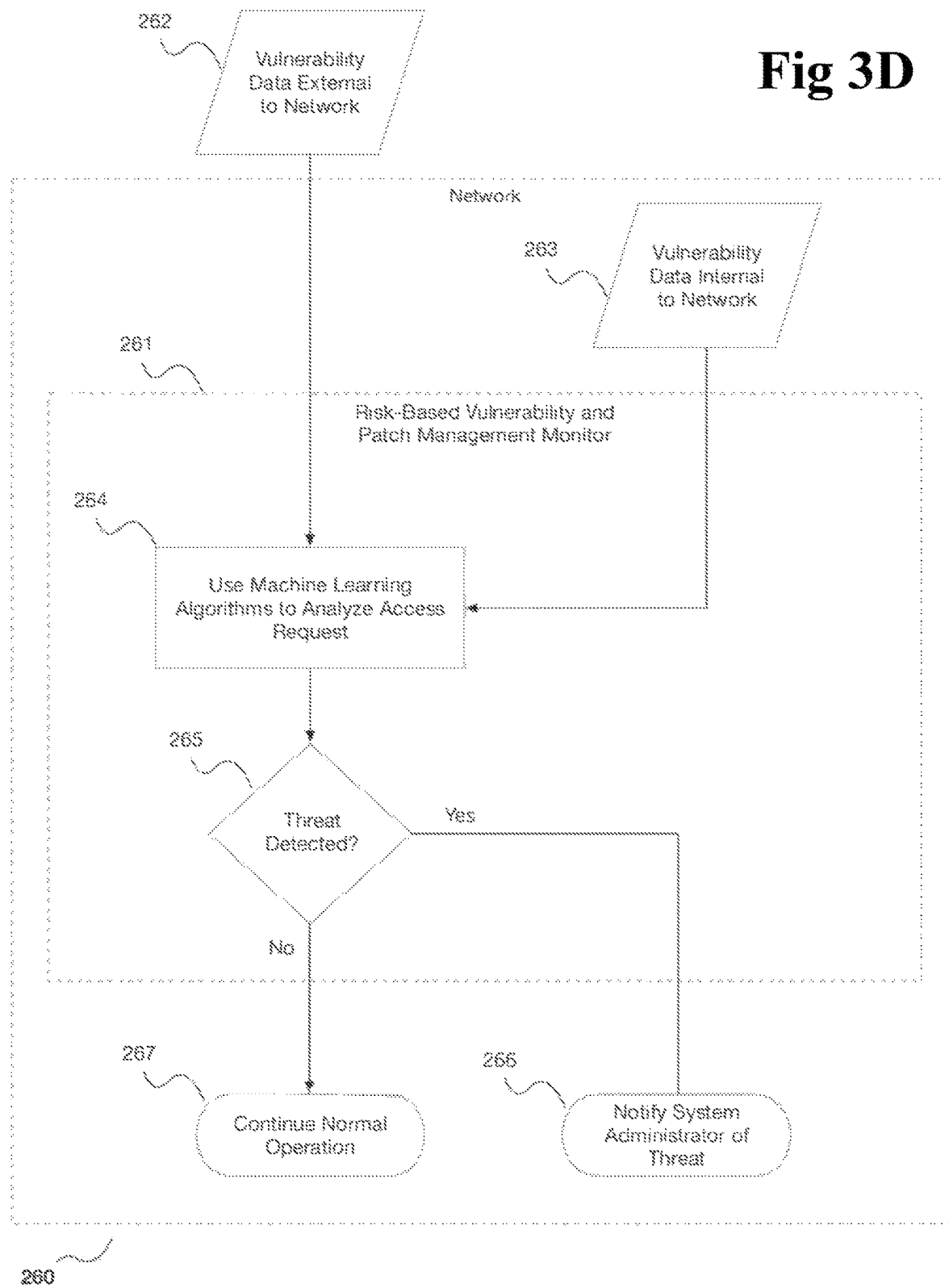
FIG. 3D is a process diagram showing a general flow of the process used to manage vulnerabilities associated with patches to network software.

FIG. 3D is a process diagram showing a general flow of the process used to manage vulnerabilities associated with patches to network software 260. As part of a continuously-operating risk-based vulnerability and patch management monitor 261, data is gathered from both sources external to the network 262 and internal to the network 263. As disclosed below at 300, the advanced cyber decision platform uses machine learning algorithms to analyze system-wide data to detect threats. The data is analyzed 264 to determine whether network vulnerabilities exist for which a patch has not yet been created and/or applied. If the assessment determines that such a vulnerability exists 265, whether or not all software has been patched according to manufacturer recommendations, the system administrator is notified of the potential vulnerability, along with contextually-based, tactical recommendations for optimal response based on potential impact 266. Otherwise, network activity is allowed to continue normally 267.

Figure 4A:
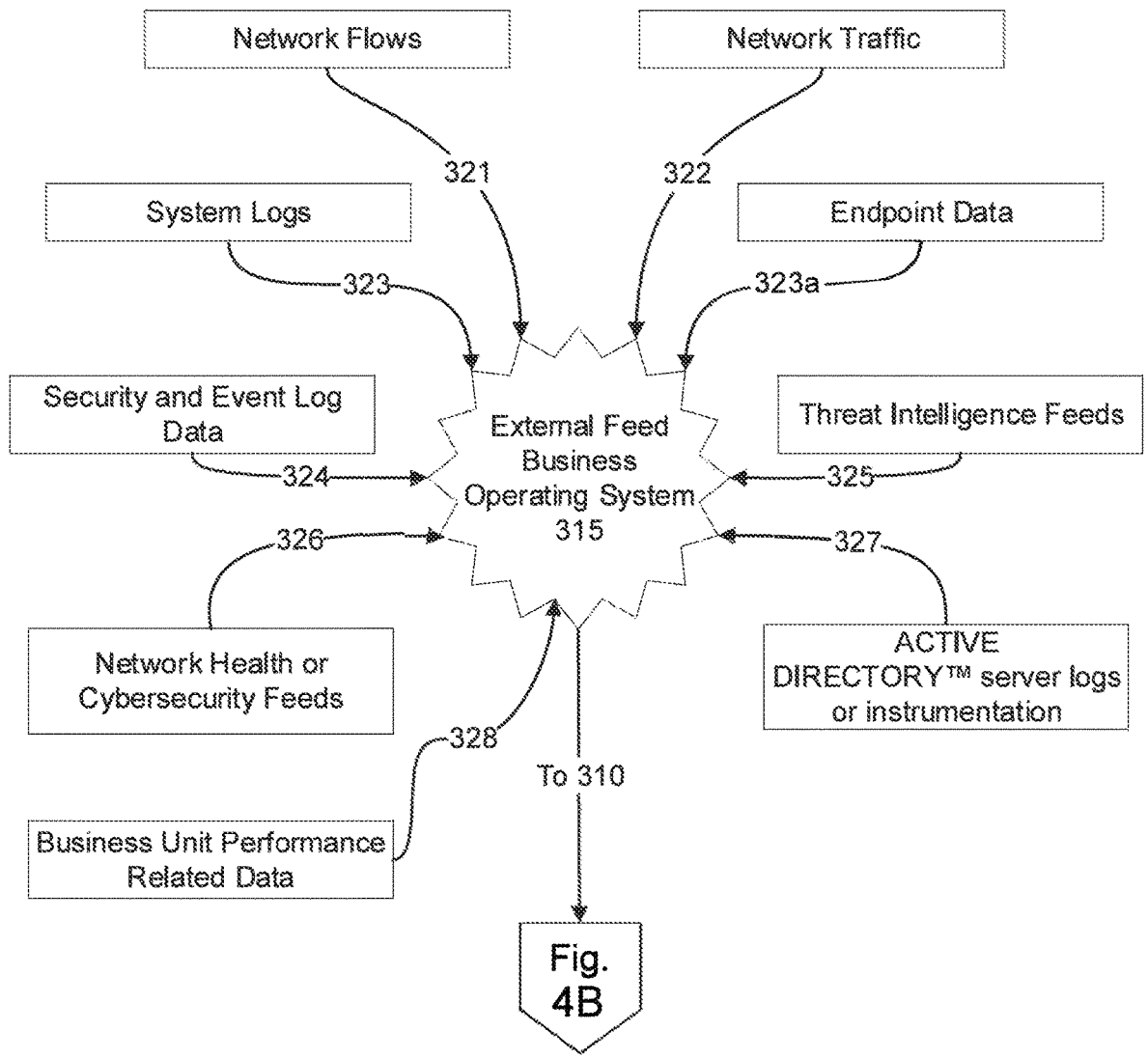
FIGS. 4A and 4B are process diagrams showing business operating system functions in use to mitigate cyberattacks.
Figure 4B:
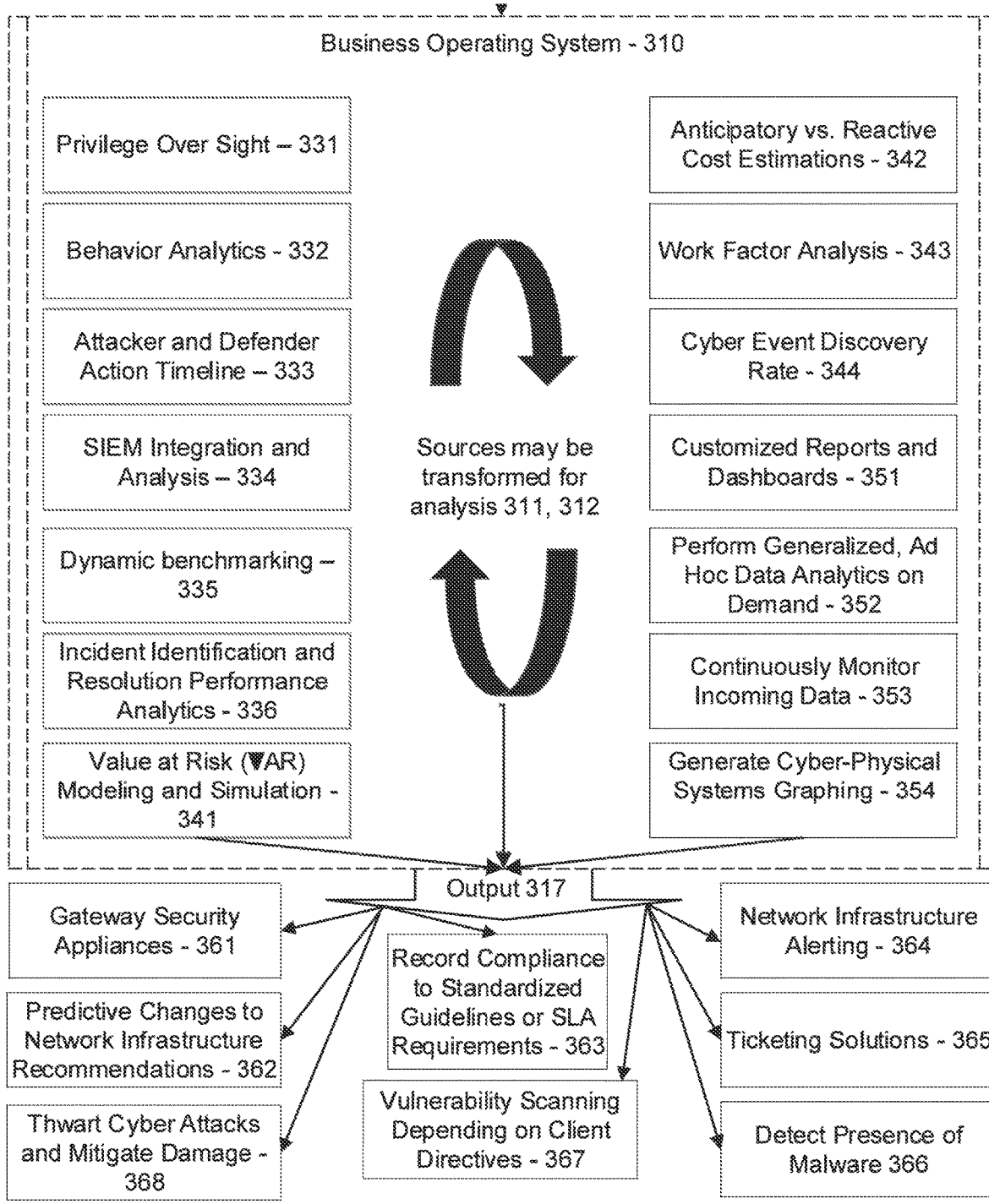

FIGS. 4A and 4B are process diagrams showing a general flow 300 of business operating system functions in use to mitigate cyberattacks. Input network data which may include network flow patterns 321, the origin and destination of each piece of measurable network traffic 322, system logs from servers and workstations on the network 323, endpoint data 323a, any security event log data from servers or available security information and event (SIEM) systems 324, external threat intelligence feeds 324a, identity or assessment context 325, external network health or cybersecurity feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 368, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367. These examples are, of course, only a subset of the possible uses of the system, they are exemplary in nature and do not reflect any boundaries in the capabilities of the invention.

Figure 5:
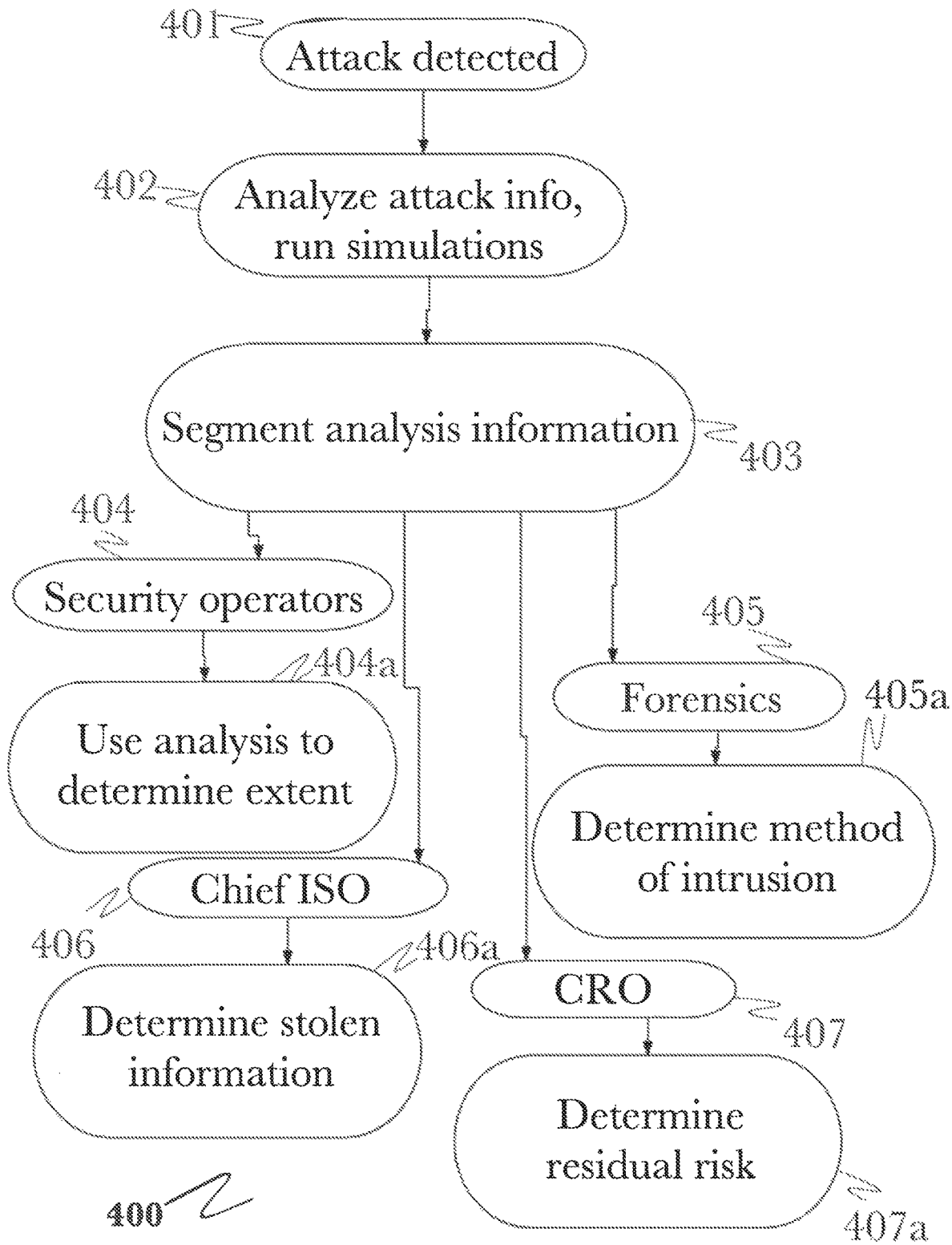
FIG. 5 is a process flow diagram of a method for segmenting cyberattack information to appropriate corporation parties.

FIG. 5 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused arrangement may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404a to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406a what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405a to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407a was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

Figure 6:
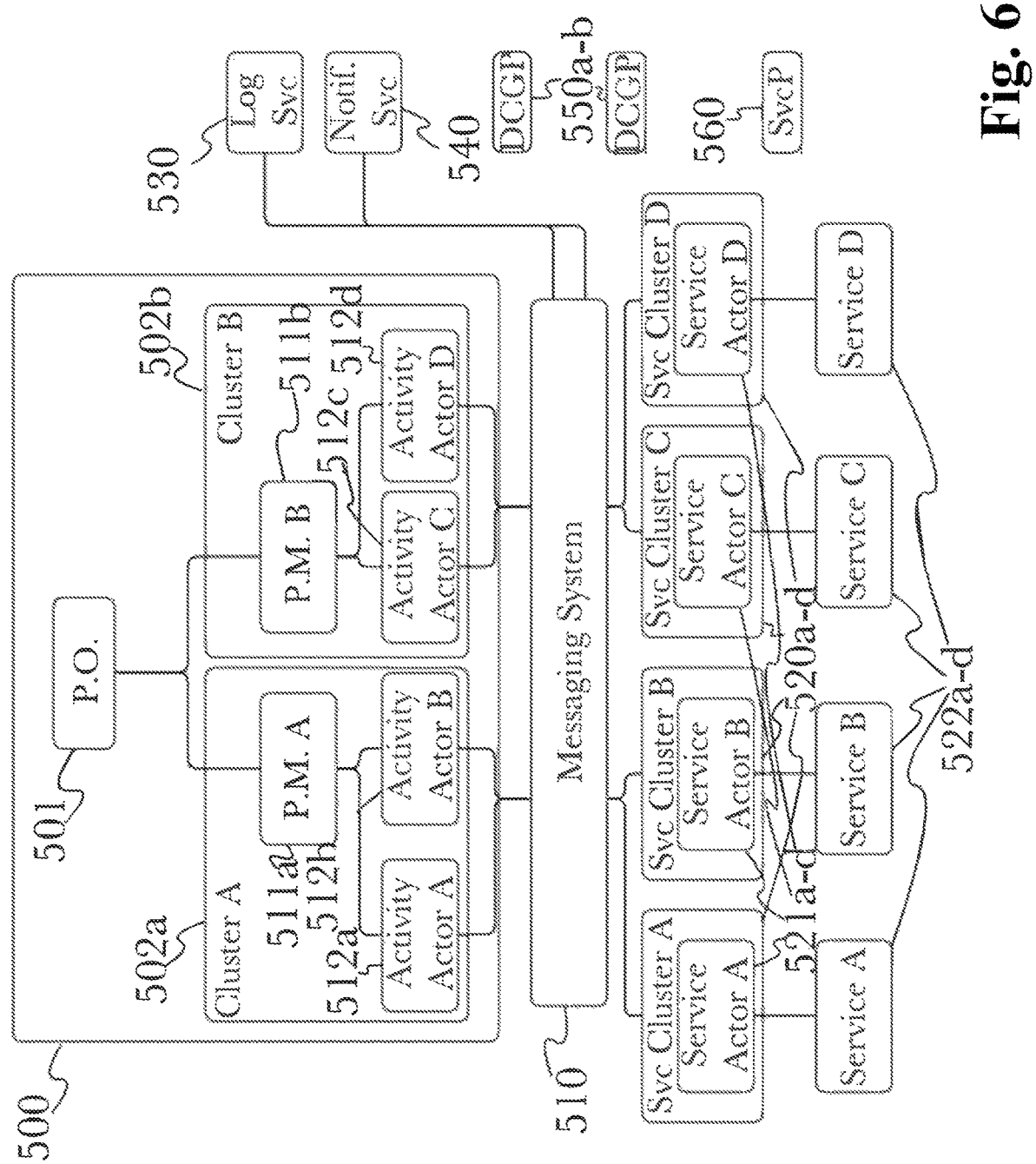
FIG. 6 is a diagram of an exemplary architecture for a system for rapid predictive analysis of very large data sets using an actor-driven distributed computational graph, according to one aspect.

FIG. 6 is a diagram of an exemplary architecture for a system for rapid predictive analysis of very large data sets using an actor-driven distributed computational graph 500, according to one aspect. According to the aspect, a DCG 500 may comprise a pipeline orchestrator 501 that may be used to perform a variety of data transformation functions on data within a processing pipeline, and may be used with a messaging system 510 that enables communication with any number of various services and protocols, relaying messages and translating them as needed into protocol-specific API system calls for interoperability with external systems (rather than requiring a particular protocol or service to be integrated into a DCG 500).

Pipeline orchestrator 501 may spawn a plurality of child pipeline clusters 502a-b, which may be used as dedicated workers for streamlining parallel processing. In some arrangements, an entire data processing pipeline may be passed to a child cluster 502a for handling, rather than individual processing tasks, enabling each child cluster 502a-b to handle an entire data pipeline in a dedicated fashion to maintain isolated processing of different pipelines using different cluster nodes 502a-b. Pipeline orchestrator 501 may provide a software API for starting, stopping, submitting, or saving pipelines. When a pipeline is started, pipeline orchestrator 501 may send the pipeline information to an available worker node 502a-b, for example using AKKA™ clustering. For each pipeline initialized by pipeline orchestrator 501, a reporting object with status information may be maintained. Streaming activities may report the last time an event was processed, and the number of events processed. Batch activities may report status messages as they occur. Pipeline orchestrator 501 may perform batch caching using, for example, an IGFS™ caching filesystem. This allows activities 512a-d within a pipeline 502a-b to pass data contexts to one another, with any necessary parameter configurations.

A pipeline manager 511a-b may be spawned for every new running pipeline, and may be used to send activity, status, lifecycle, and event count information to the pipeline orchestrator 501. Within a particular pipeline, a plurality of activity actors 512a-d may be created by a pipeline manager 511a-b to handle individual tasks, and provide output to data services 522a-d. Data models used in a given pipeline may be determined by the specific pipeline and activities, as directed by a pipeline manager 511a-b. Each pipeline manager 511a-b controls and directs the operation of any activity actors 512a-d spawned by it. A pipeline process may need to coordinate streaming data between tasks. For this, a pipeline manager 511a-b may spawn service connectors to dynamically create TCP connections between activity instances 512a-d. Data contexts may be maintained for each individual activity 512a-d, and may be cached for provision to other activities 512a-d as needed. A data context defines how an activity accesses information, and an activity 512a-d may process data or simply forward it to a next step. Forwarding data between pipeline steps may route data through a streaming context or batch context.

A client service cluster 530 may operate a plurality of service actors 521a-d to serve the requests of activity actors 512a-d, ideally maintaining enough service actors 521a-d to support each activity per the service type. These may also be arranged within service clusters 520a-d, in a manner similar to the logical organization of activity actors 512a-d within clusters 502a-b in a data pipeline. A logging service 530 may be used to log and sample DCG requests and messages during operation while notification service 540 may be used to receive alerts and other notifications during operation (for example to alert on errors, which may then be diagnosed by reviewing records from logging service 530), and by being connected externally to messaging system 510, logging and notification services can be added, removed, or modified during operation without impacting DCG 500. A plurality of DCG protocols 550a-b may be used to provide structured messaging between a DCG 500 and messaging system 510, or to enable messaging system 510 to distribute DCG messages across service clusters 520a-d as shown. A service protocol 560 may be used to define service interactions so that a DCG 500 may be modified without impacting service implementations. In this manner it can be appreciated that the overall structure of a system using an actor-driven DCG 500 operates in a modular fashion, enabling modification and substitution of various components without impacting other operations or requiring additional reconfiguration.

Figure 7:
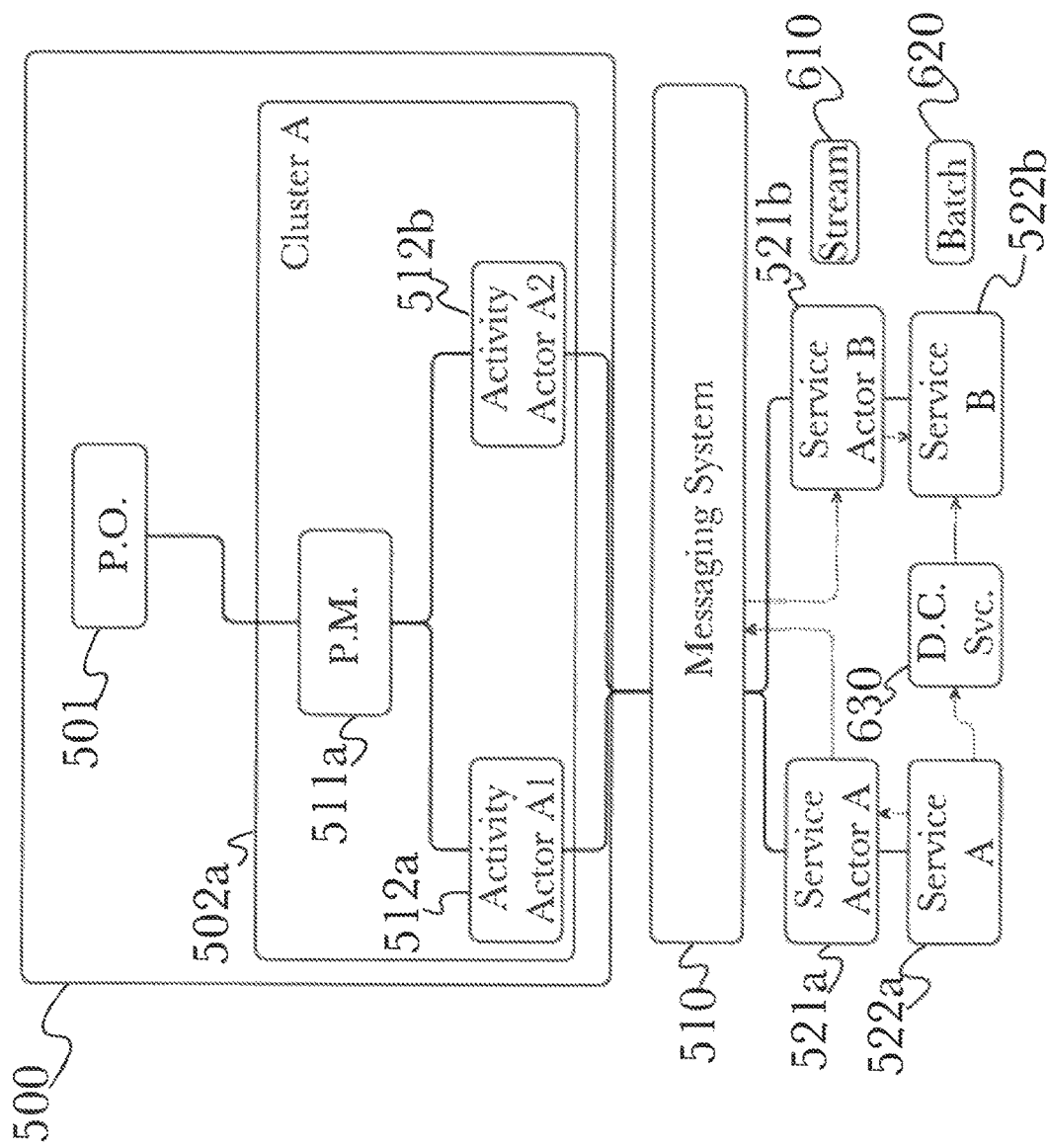
FIG. 7 is a diagram of an exemplary architecture for a system for rapid predictive analysis of very large data sets using an actor-driven distributed computational graph, according to one aspect.

FIG. 7 is a diagram of an exemplary architecture for a system for rapid predictive analysis of very large data sets using an actor-driven distributed computational graph 500, according to one aspect. According to the aspect, a variant messaging arrangement may utilize messaging system 510 as a messaging broker using a streaming protocol 610, transmitting and receiving messages immediately using messaging system 510 as a message broker to bridge communication between service actors 521a-b as needed. Alternately, individual services 522a-b may communicate directly in a batch context 620, using a data context service 630 as a broker to batch-process and relay messages between services 522a-b.

Figure 8:
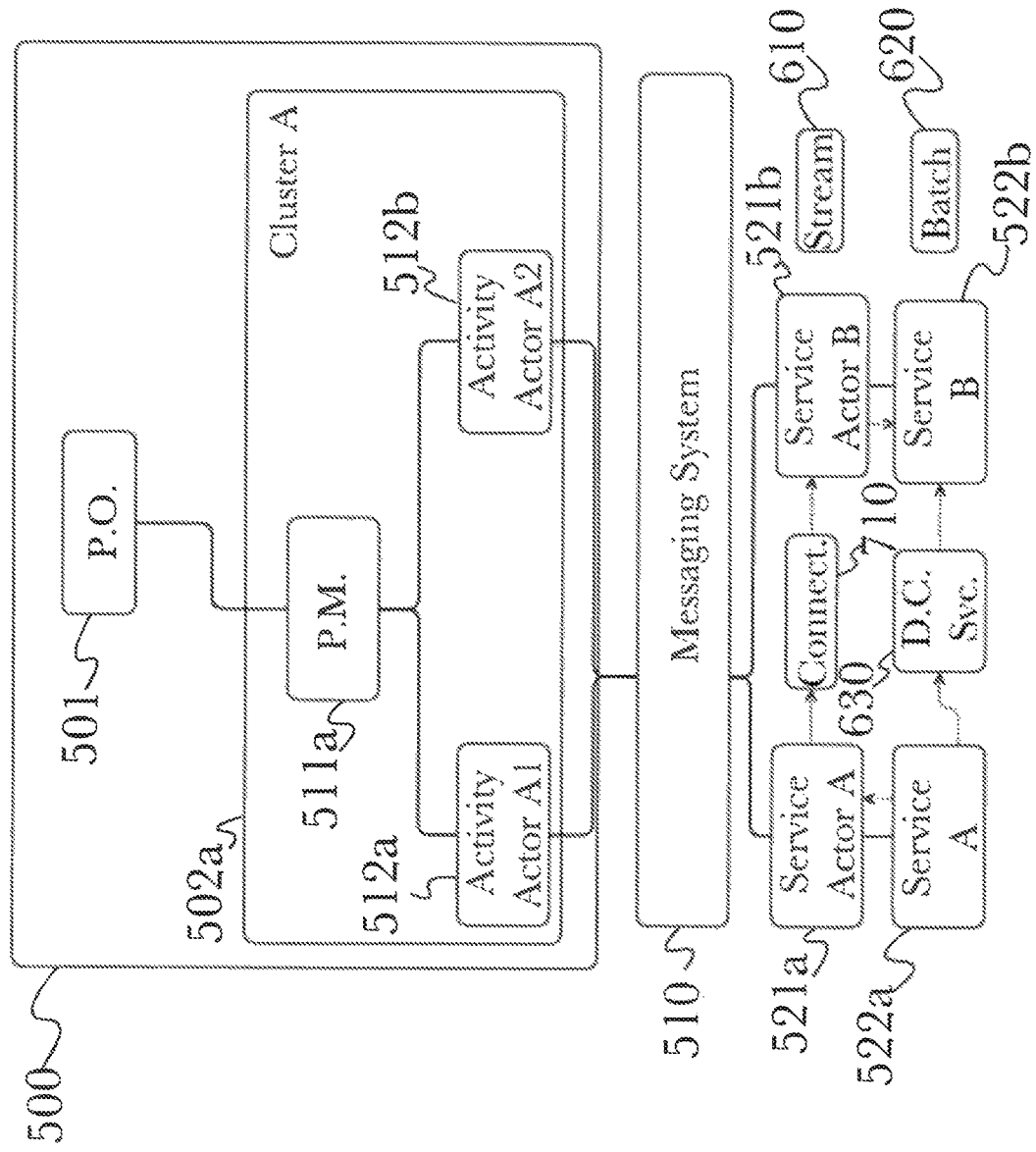
FIG. 8 is a diagram of an exemplary architecture for a system for rapid predictive analysis of very large data sets using an actor-driven distributed computational graph, according to one aspect.

FIG. 8 is a diagram of an exemplary architecture for a system for rapid predictive analysis of very large data sets using an actor-driven distributed computational graph 500, according to one aspect. According to the aspect, a variant messaging arrangement may utilize a service connector 710 as a central message broker between a plurality of service actors 521a-b, bridging messages in a streaming context 610 while a data context service 630 continues to provide direct peer-to-peer messaging between individual services 522a-b in a batch context 620.

It should be appreciated that various combinations and arrangements of the system variants described above (referring to FIGS. 1A-8) may be possible, for example using one particular messaging arrangement for one data pipeline directed by a pipeline manager 511a-b, while another pipeline may utilize a different messaging arrangement (or may not utilize messaging at all). In this manner, a single DCG 500 and pipeline orchestrator 501 may operate individual pipelines in the manner that is most suited to their particular needs, with dynamic arrangements being made possible through design modularity as described above in FIG. 6.

Figure 9:
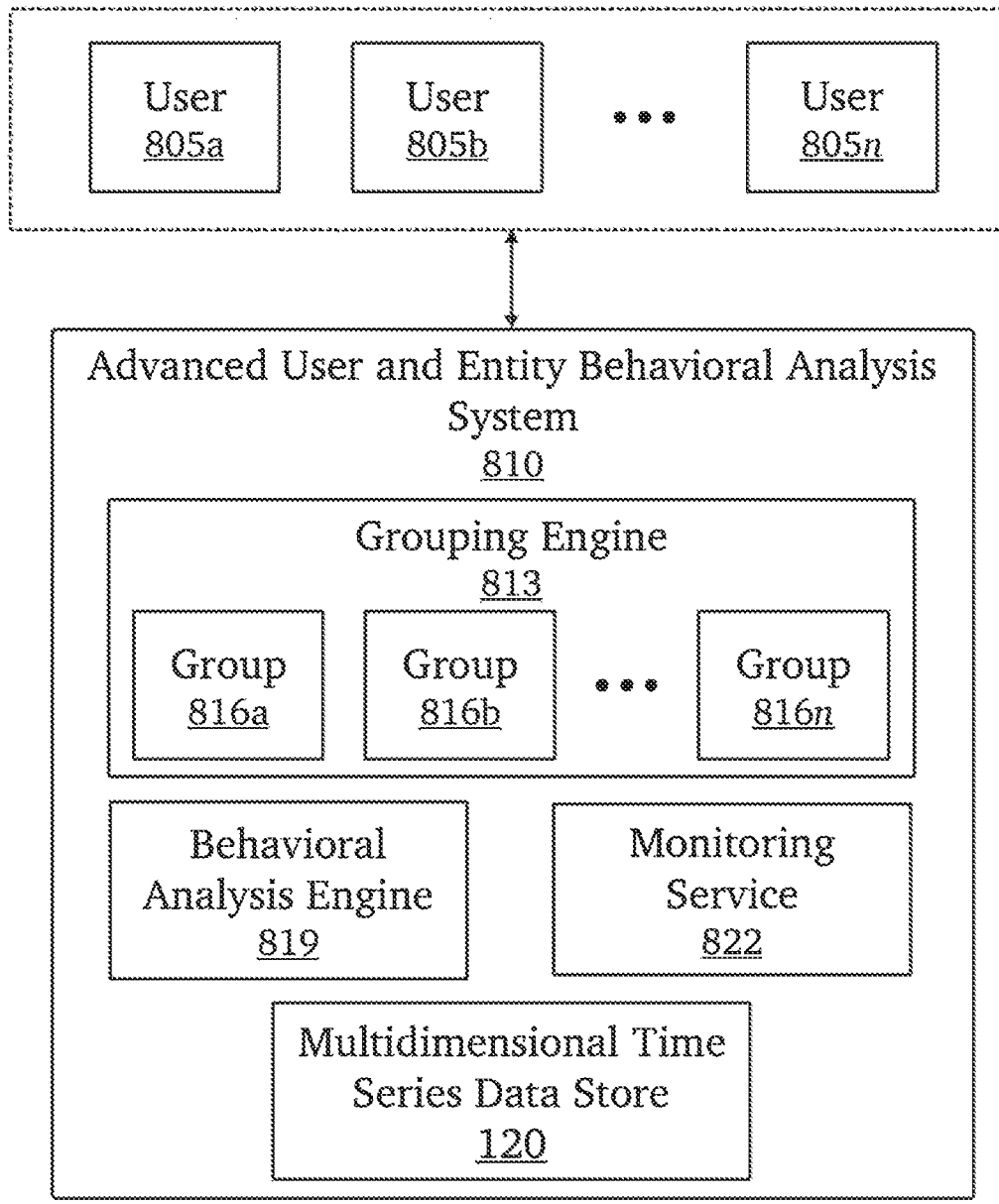
FIG. 9 is a diagram of an exemplary architecture for a user and entity behavioral analysis system, according to one aspect.

Another way to detect cyberthreats may be through the continuous monitoring and analysis of user and device behavioral patterns. This method may be particularly useful when there is little info available on an exploit, for example, a newly developed malware. FIG. 9 is a diagram of an exemplary architecture 800 for a user and entity behavioral analysis system, according to one aspect. Architecture 800 may comprise a plurality of users 805a-n, which may be individuals or connected devices, connecting to a user and entity behavioral analysis system 810. System 810 may comprise a grouping engine 813, a behavioral analysis engine 819, a monitoring service 822, and a multidimensional time series data store 120 for storing gathered and processed data. Grouping engine 813 may be configured to gather and identify user interactions and related metrics, which may include volume of interaction, frequency of interaction, and the like. Grouping engine 813 may use graph stack service 145 and DCG module 155 to convert and analyze the data in graph format. The interaction data may then be used to split users 805a-n into a plurality of groups 816a-n. Groupings may be based on department, project teams, interaction frequency, and other metrics which may be user-defined. Groupings may not be permanent, and may be adjusted and changed in real-time as group dynamics change. This may be automated by system 810, or an administrative user may manually change the groupings.

Behavioral analysis engine 819 may batch process and aggregate overall usage logs, access logs, Kerberos session data, or data collected through the use of other network monitoring tools commonly used in the art such as BRO or SURICATA. The aggregated data may then be used to generate a behavioral baseline for each group established by grouping engine 813. Behavioral analysis engine 819 may use graph stack service 145 and DCG module 155 to convert and analyze the data in graph format using various machine learning models, and may also process the data using parallel computing to quickly process large amounts of data. Models may be easily added to the system. Behavioral analysis engine 819 may also be configured to process internal communications, such as email, using natural language processing. This may provide additional insight into current group dynamics so that a more accurate baseline may be established, or may provide an insight into health and mood of users.

Monitoring service 822 may actively monitor groups for anomalous behavior, as based the established baseline. For example, monitoring service 822 may use the data pipelines of ACDP system 100 or multidimensional time series data store 120 to conduct real-time monitoring of various network resource sensors. Aspects that may be monitored may include, but is not limited to, anomalous web browsing, for example, the number of distinct domains visited exceeding a predefined threshold; anomalous data exfiltration, for example, the amount of outgoing data exceeding a predefined threshold; unusual domain access, for example, a subgroup consisting a few members within an established group demonstrating unusual browsing behavior by accessing an unusual domain a predetermined number of times within a certain timeframe; anomalous login times, for example, a user logging into a workstation during off-hours; unlikely login locations, for example, a user logging in using an account from two distinct locations that may be physically impossible within a certain timeframe; anomalous service access, for example, unusual application access or usage pattern; and new machines, for example, a user logging into a machine or server not typically accessed.

Detailed Description of Exemplary Aspects

Figure 31:
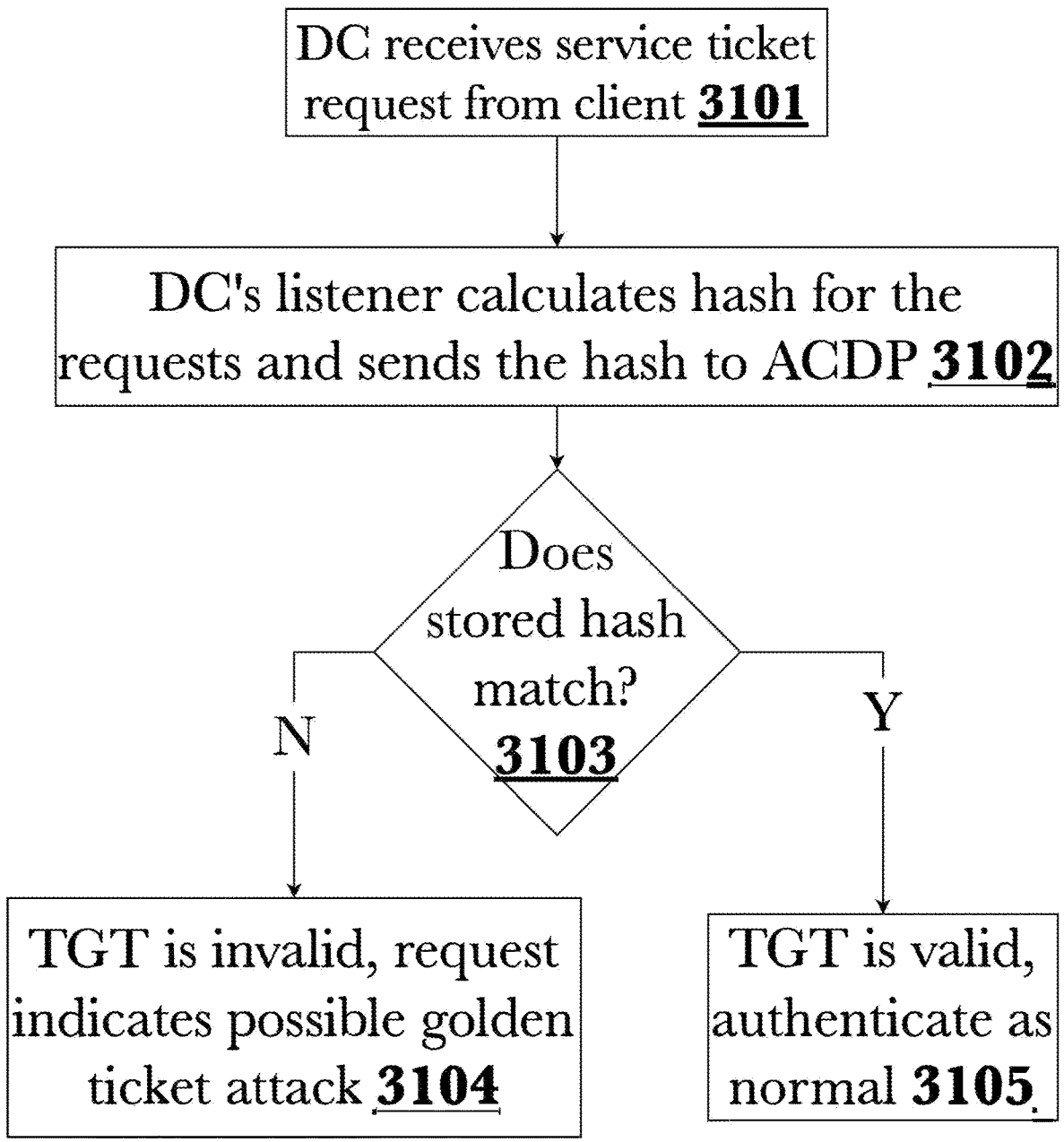
FIG. 31 is a flow diagram illustrating a method for detecting Kerberos ticket attacks within a domain, according to an aspect of the invention.

FIG. 31 is a flow diagram illustrating a method for detecting Kerberos ticket attacks within a domain, according to an aspect of the invention. In a golden ticket attack, a malicious actor forges a TGT using compromised information (such as information dumped from memory on a client device connected to the domain, regardless of the authentication tickets actually issued to that client device), and then uses this falsified TGT to grant themselves domain administrator access. According to the method, a DC 3020 configured with a passive listener (as described above, with reference to FIG. 30) receives a request for a service ticket from a client (also known as a "principal" according to the Kerberos authentication protocol) 3101, the request including a TGT. The listener calculates a hash for the included TGT 3102, and sends the hash to ACDP 100. ACDP 100 then checks 3103 for a stored hash for the requesting client, which would indicate that the TGT is valid and was previously issued to this client for use in requesting service tickets for resource access. If no existing hash is found, or an existing hash does not match the one provided, this indicates that the TGT has been forged or altered and there is a high risk that the service ticket request is part of a golden ticket attack being used to obtain illicit access to domain resources 3104. If an existing hash is found that does match the one provided, this indicates that the TGT is valid for the requesting client, and the service ticket requests may be authorized and authentication proceeds as normal 3105.

Figure 32:
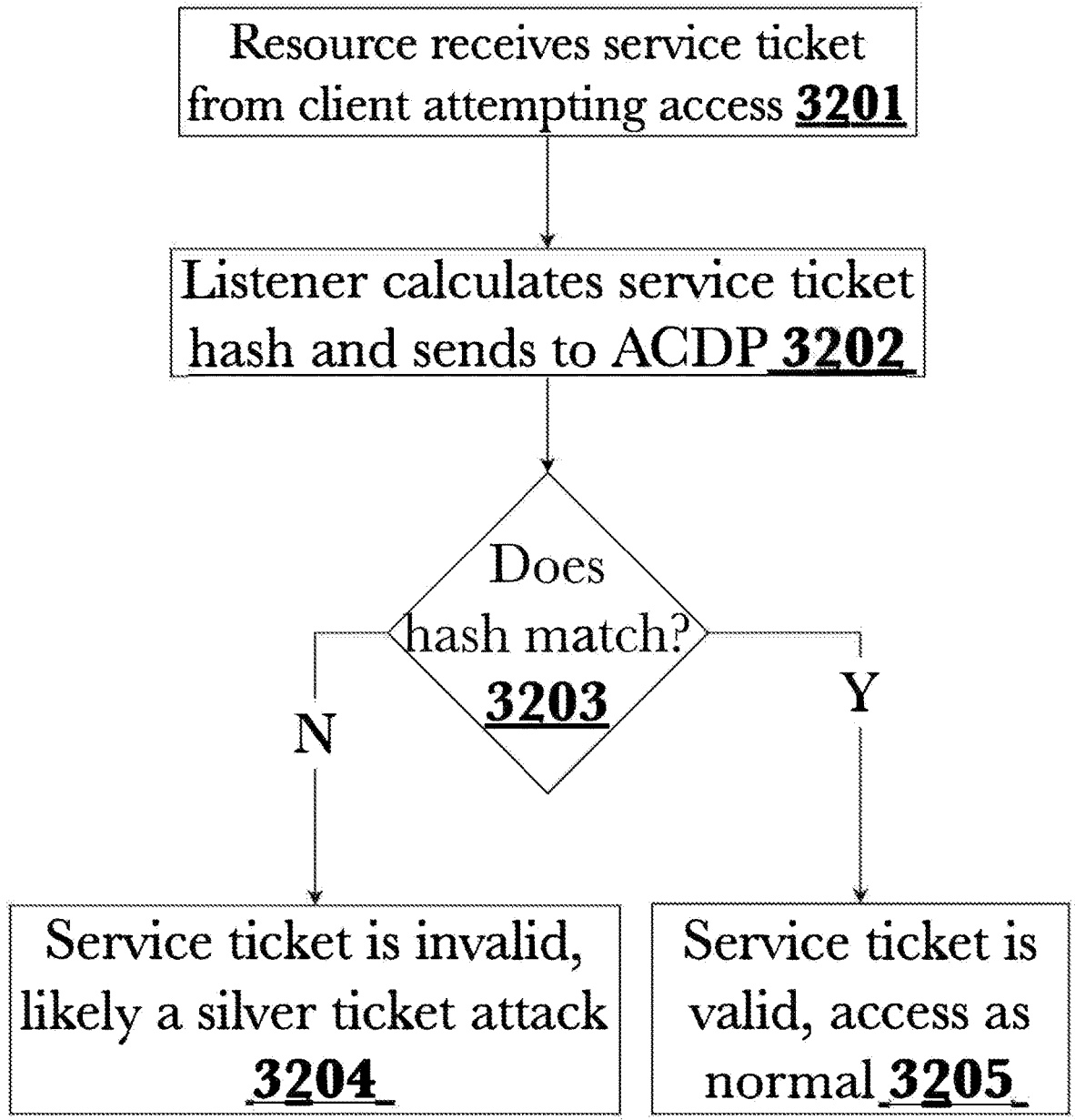
FIG. 32 is a flow diagram illustrating a method for detecting "silver ticket" attacks within a domain, according to an aspect of the invention.

FIG. 32 is a flow diagram illustrating a method for detecting silver ticket attacks within a domain, according to an aspect of the invention. A silver ticket attack involves a malicious actor forging a service ticket, rather than the TGT involved in a golden ticket attack. According to the method, a resource configured with a passive listener (as described above, with reference to FIG. 30) receives a service ticket from a client (also known as a "principal" according to the Kerberos authentication protocol) 3201. The listener calculates a hash for the service ticket 3202, and sends the hash to ACDP 100. ACDP 100 then checks 3203 for a stored hash for the client, which would indicate that the service ticket is valid and was previously issued to this client for use in accessing the respective resource. If no existing hash is found, or an existing hash does not match the one provided, this indicates that the service ticket has been forged or altered and there is a high risk that the service ticket is part of a silver ticket attack being used to obtain illicit access to domain resources 3204. If an existing hash is found that does match the one provided, this indicates that the service ticket is valid for the client and resource, and the client may be authorized to access the resource as normal 3205.

Golden and silver ticket attacks may be detected using this hash-based approach, as forged tickets generated by malicious software contain formatting anomalies such as empty fields that would be populated if the TGT was properly-issued and valid. These anomalies result in a different hash being created than the one created for a valid TGT issued by the DC, thereby making the forged ticket obvious upon inspection. Once such an attack has been detected, care must be taken not to alert the malicious actor that they have been discovered, as they may abandon the attack prematurely and prevent the collection of important information such as from where the attack originated or what access paths were used, what was accessed using the forged ticket, or what the intent of the attack may have been. Therefore, when a golden or silver ticket attack is discovered, a domain administrator may identify compromised accounts involved in the attack and choose to disable all but a selection of low-risk accounts; this may prevent the attacker from accessing sensitive information or causing damage to internal resources, while still allowing them some degree of activity to conceal their discovery while the administrator continues to analyze the attack.

Figure 33:
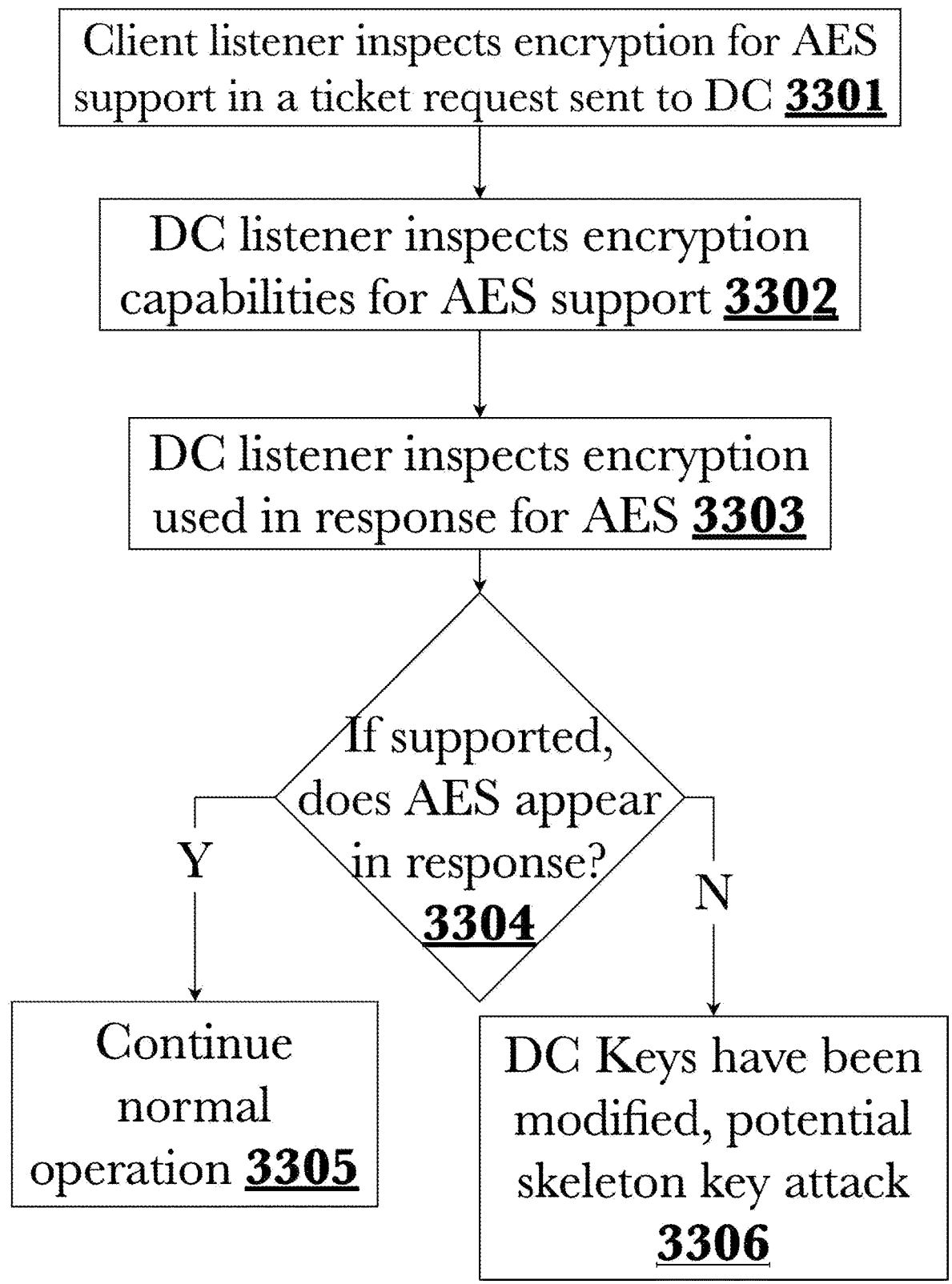
FIG. 33 is a flow diagram illustrating a method for detecting "skeleton key" attacks within a domain, according to an aspect of the invention.

FIG. 33 is a flow diagram illustrating a method for detecting "skeleton key" attacks within a domain, according to an aspect of the invention. In a skeleton key attack, a malicious actor modifies stored keys on a DC to grant themselves the ability to change the master password, enabling additional attacks as they can take control of the DC and perform such actions as granting tickets or creating new accounts with full privileges within the domain. According to the method, a listener operating on a client device may inspect the client's advertised encryption types within a ticket request to determine if AES is supported 3301. A listener operating on a DC may similarly inspect the DC's advertised encryption types for AES support 3302, as well as inspecting the encryption that appears in a DC response to the ticket request 3303 to determine whether AES encryption is used 3304. If AES is used in the response, operation continues as normal 3305. However, if AES is supported by both the client and DC yet does not appear in the response, this indicates that the keys stored by the DC have been tampered with 3306, potentially as part of a skeleton key attack wherein an attacker manipulates stored keys to implant a modified key that allows use of a new master password to grant them access.

Figure 34:
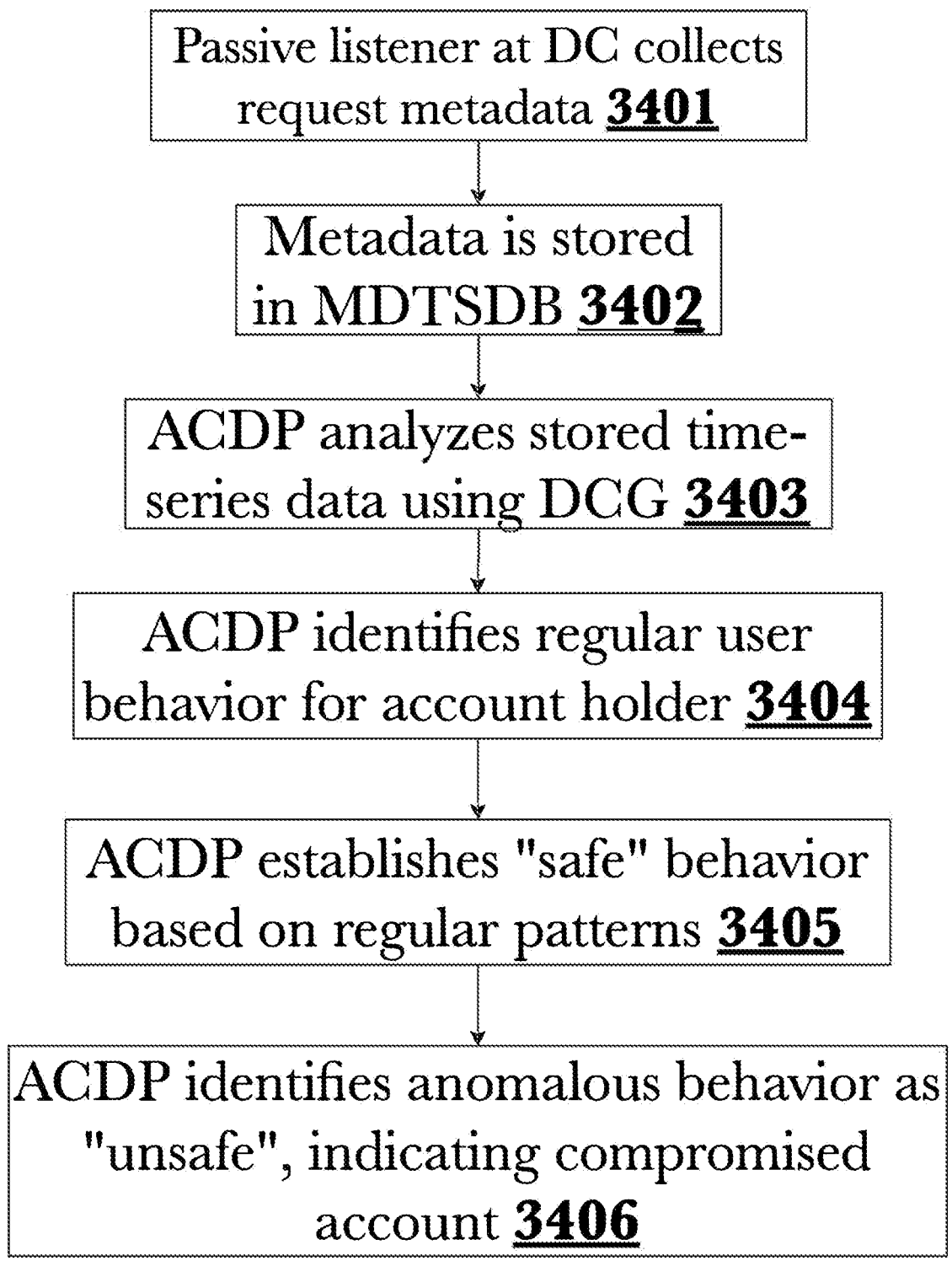
FIG. 34 is a flow diagram illustrating a method for detecting compromised credentials within a domain, according to an aspect of the invention.

FIG. 34 is a flow diagram illustrating a method for detecting compromised credentials within a domain, according to an aspect of the invention. In an attack using compromised credentials, a malicious actor takes control of a domain account and uses that account to access resources and perform actions while masquerading as the account holder. According to the method, a listener operating on a DC may collect metadata on received requests 3401, such as (for example, including but not limited to) username, timestamp, location, device ID, or success/failure of each request. This information may then be stored in a multidimensional time-series database (MDTSDB) 3402 with associated timestamp information. This stored time-series data may then be analyzed using a directed computational graph (DCG) 3403 to identify regular patterns of user behavior 3404 and establish a baseline of "safe" behavior 3405. When DCG analysis indicates activity outside the normal parameters, this may indicate a compromised user account 3406, such as when a malicious actor connects using stolen credentials and behaves in a manner inconsistent with the actual account holder.

Figure 35:
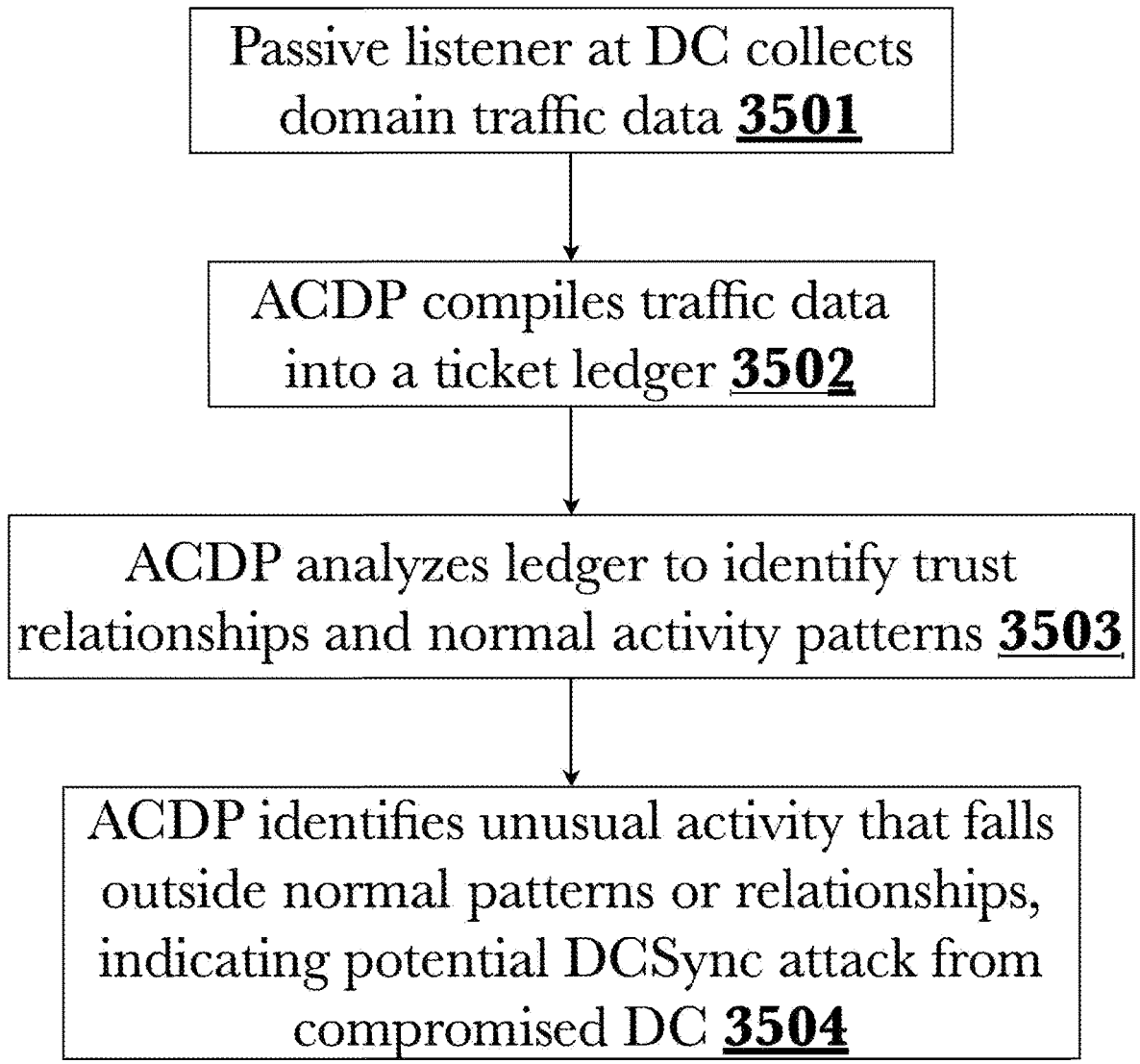
FIG. 35 is a flow diagram illustrating a method for detecting attacks within a domain using a ticket ledger, according to an aspect of the invention.

FIG. 35 is a flow diagram illustrating a method for detecting attacks within a domain using a ticket ledger, according to an aspect of the invention. These attacks may include exploits known as "DCSync", "DCShadow", and "Kerberoasting". In a DCSync attack, a malicious actor that has already obtained administrator privileges (such as through a golden ticket attack) mimics a valid domain admin account in order to request additional information from the DC, such as user passwords and account information. In a DCShadow attack, a malicious actor that has already obtained administrator privileges (such as through a golden ticket attack) mimics a domain controller to inject new data into the domain records while bypassing the normal security protocols that would prevent a non-privileged account from modifying records. Both of these attack types require administrator access and can be identified using a ticket ledger collected over time using listeners within a domain. In a Kerberoasting attack, a malicious actor does not require a compromised account or any obtained privileges (unlike with DCSync and DCShadow). A malicious actor also does not need to send any packets to a DC or client in order to effect the compromise; information may be collected in memory by simply connecting a device to a domain, and then it may be dumped from memory and compromised offline. The actor may then reconnect and use obtained information such as account credentials, to obtain access within the domain and potentially continue with additional attacks (for example, escalating to a silver or golden ticket attack to obtain administrator access).

According to the method, a listener operating on a DC may collect traffic information within the domain 3501, allowing an ACDP to compile the traffic data and build a ledger of issued tickets within the domain 3502. This ledger may be analyzed by the ACDP to identify trust relationships between domain controllers and clients 3503. Any unusual activity, such as a DC admin account request from an account that is ordinarily unusued or has no involvement with the clients for which is requesting data, may be identified as falling outside the known relationships 3504. This unusual activity may then indicate that an administrator account is acting unusually (such as requesting information for users with which it has no established trust relationship), or new information may suddenly appear that may indicate that records have been modified as part of a DCShadow attack. Spikes in activity levels may be used as an indicator of a Kerberoasting attack, indicating an account requesting or being issued more tickets than normal, which may serve as an indicator of a compromised account that may have had its credentials cracked in a Kerberoasting exploit.

Figure 36:
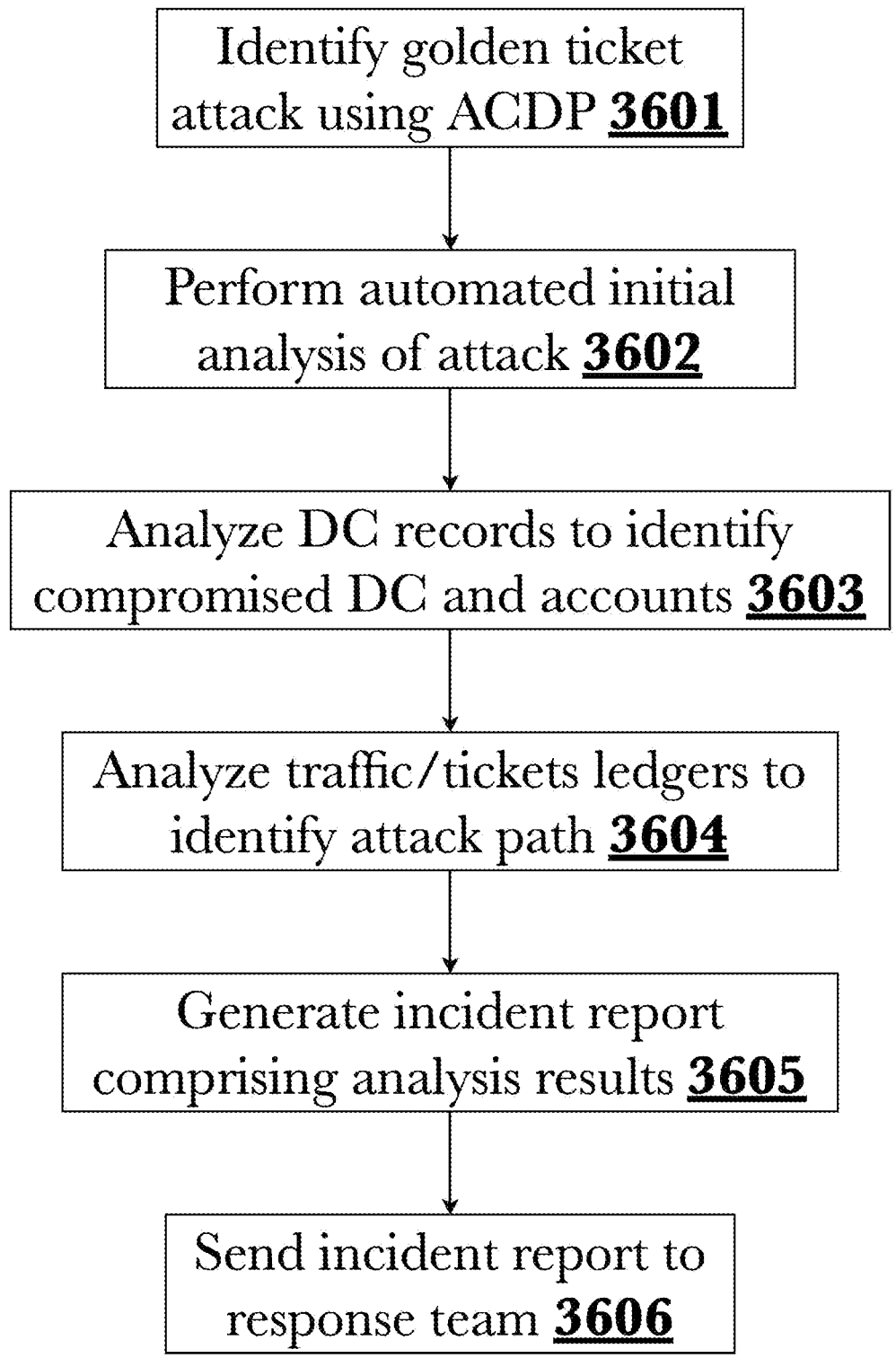
FIG. 36 is a flow diagram illustrating a method for automatically reporting a Kerberos ticket attack, according to an aspect of the invention.

FIG. 36 is a flow diagram illustrating a method for automatically reporting a Kerberos ticket attack, according to an aspect of the invention. According to the method, when a Kerberos ticket attack is recognized 3601 (as described above, with reference to FIG. 31) an ACDP may determine the extent of the attack 3602. For example, a domain controller's records may be analyzed to determine any compromised accounts or domain controllers 3603 that may require immediate action, and traffic and ticket ledger records (as detailed above, with reference to FIG. 35) may be analyzed to identify an attack vector, i.e. the path used by the attacker to gain access to the domain 3604. ACDP may then generate a detailed incident report 3605 comprising the attack information and initial analysis. This incident report is then sent to an administrator or response team as an urgent notification 3606, providing the details of the attack so a remediation strategy may be implemented immediately.

Figure 37:
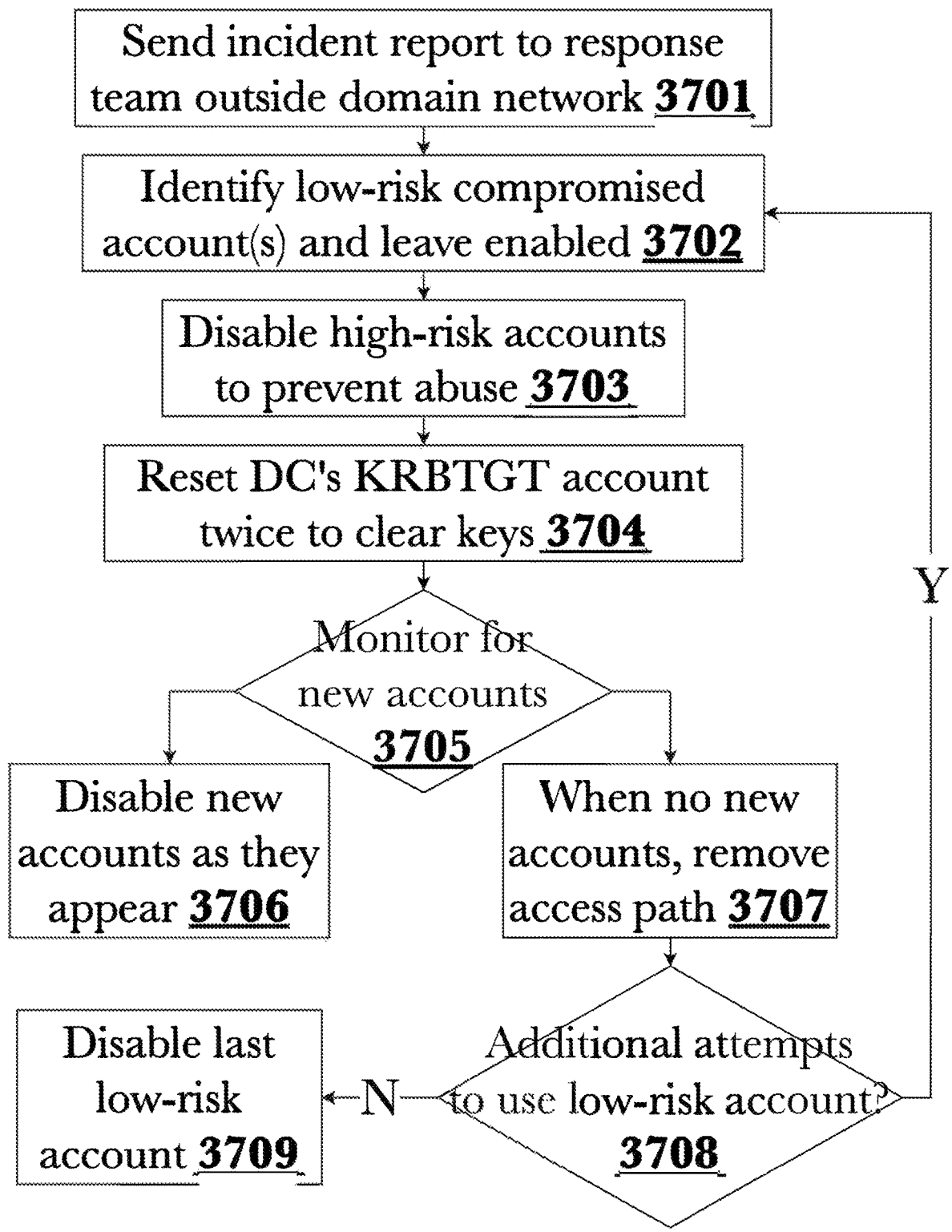
FIG. 37 is a flow diagram illustrating a method for mitigating a Kerberos ticket attack without alerting the attacker, according to an aspect of the invention.

FIG. 37 is a flow diagram illustrating a method for mitigating a Kerberos ticket attack without alerting the attacker, according to an aspect of the invention. According to the method, once an incident report is received 3701 indicating a Kerberos ticket attack is underway, care must be taken not to undermine response efforts by alerting the attacker prematurely. If alerted, the attacker may abandon the attack before any meaningful analysis can be performed, whereas a careful mitigation effort allows the attack a degree of low-risk access while the attack is analyzed to obtain as much information as possible and facilitate more thorough remediation (such as hardening systems against an exploited vulnerability, patching discovered access paths, or other such responses that are only possible with knowledge about the attack that took place). To reduce the risk of alerting the attacker, a response team may be alerted 3701 outside the domain network, for example via telephone, and no incident records are left on networked systems where an attacker may discover them. The response team may then perform mitigation measures while allowing the attacker limited capability while the attack is further analyzed (as described below, in FIG. 38).

Mitigation may begin with identifying low-risk compromised accounts (that is, the lowest-risk account or accounts among those confirmed to be compromised in the attack underway) to keep enabled 3702, allowing the attacker a controlled degree of access while mitigation and analysis continue. Higher-risk accounts may then be disabled 3703, preventing them from being used to access internal resources by the attacker. The domain controller's KRBTGT account (that is, the administrative account that issues and authenticates ticket-granting tickets) must then be reset twice 3704, as a single reset only clears the current password while the previous keys persist in memory and can still be used to authenticate already-issued tickets the attacker may have obtained. This prevents the attacker from obtaining additional tickets (as they can no longer authenticate against the DC's new account) and limits their access with current tickets by clearing the authentication keys. The response team may then monitor for any additional compromised accounts 3705, disabling as needed 3706. When no new compromised accounts appear after a time, the attack path may be removed while leaving a low-risk compromised account enabled 3707 to monitor for any additional attempted attacks using the same account 3708. If a new attack is attempted, such as the known compromised account attempting a different access path, the mitigation process repeats for the new attack. When no attempts have been made after a time, the last compromised account may be disabled to prevent re-use 3709.

Figure 10:
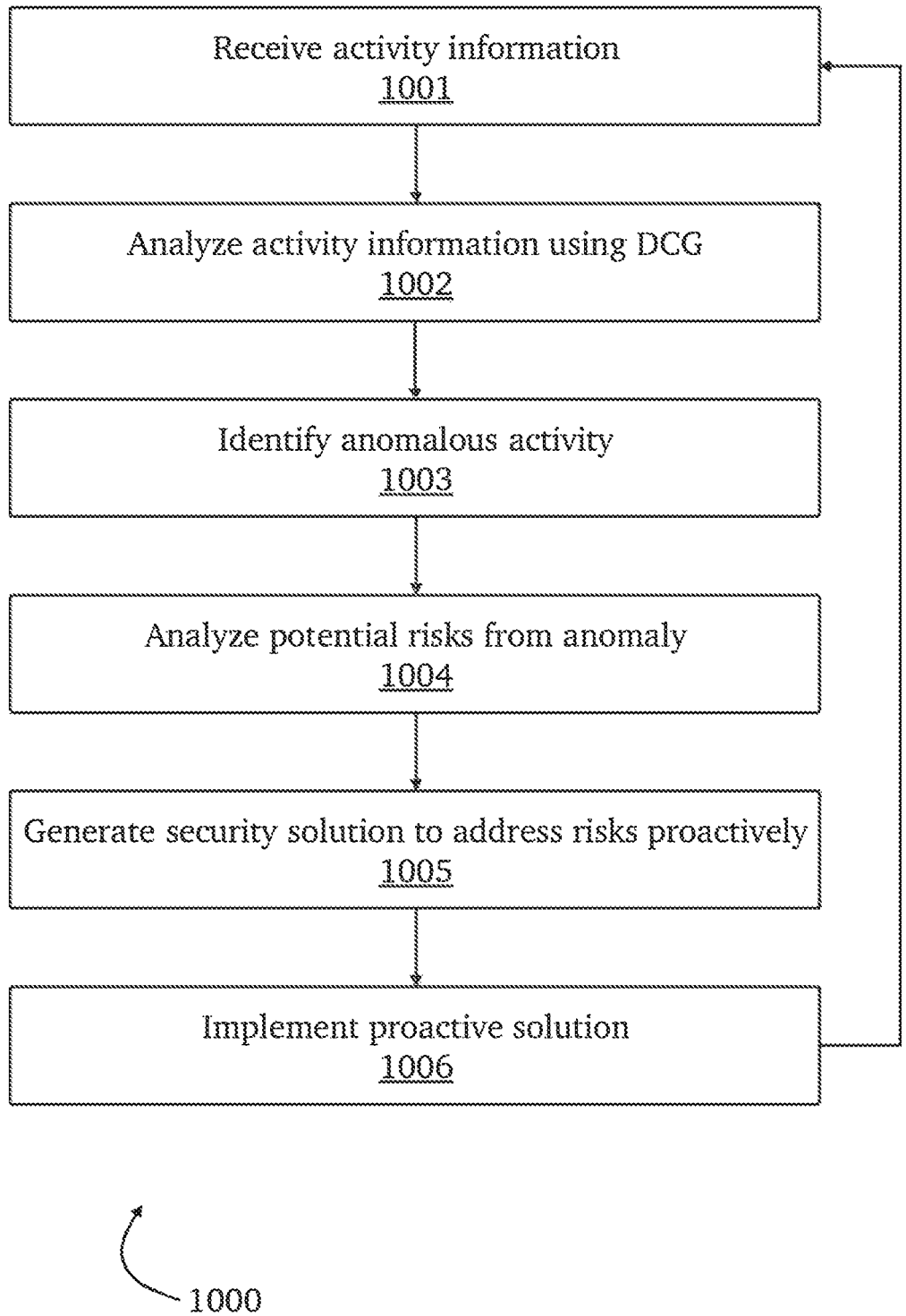
FIG. 10 is a flow diagram of an exemplary method for cybersecurity behavioral analytics, according to one aspect.

FIG. 10 is a flow diagram of an exemplary method 1000 for cybersecurity behavioral analytics, according to one aspect. According to the aspect, behavior analytics may utilize passive information feeds from a plurality of existing endpoints (for example, including but not limited to user activity on a network, network performance, or device behavior) to generate security solutions. In an initial step 1001, a web crawler 115 may passively collect activity information, which may then be processed 1002 using a DCG 155 to analyze behavior patterns. Based on this initial analysis, anomalous behavior may be recognized 1003 (for example, based on a threshold of variance from an established pattern or trend) such as high-risk users or malicious software operators such as bots. These anomalous behaviors may then be used 1004 to analyze potential angles of attack and then produce 1005 security suggestions based on this second-level analysis and predictions generated by an action outcome simulation module 125 to determine the likely effects of the change. The suggested behaviors may then be automatically implemented 1006 as needed. Passive monitoring 1001 then continues, collecting information after new security solutions are implemented 1006, enabling machine learning to improve operation over time as the relationship between security changes and observed behaviors and threats are observed and analyzed.

This method 1000 for behavioral analytics enables proactive and high-speed reactive defense capabilities against a variety of cyberattack threats, including anomalous human behaviors as well as nonhuman "bad actors" such as automated software bots that may probe for, and then exploit, existing vulnerabilities. Using automated behavioral learning in this manner provides a much more responsive solution than manual intervention, enabling rapid response to threats to mitigate any potential impact. Utilizing machine learning behavior further enhances this approach, providing additional proactive behavior that is not possible in simple automated approaches that merely react to threats as they occur.

Figure 11:
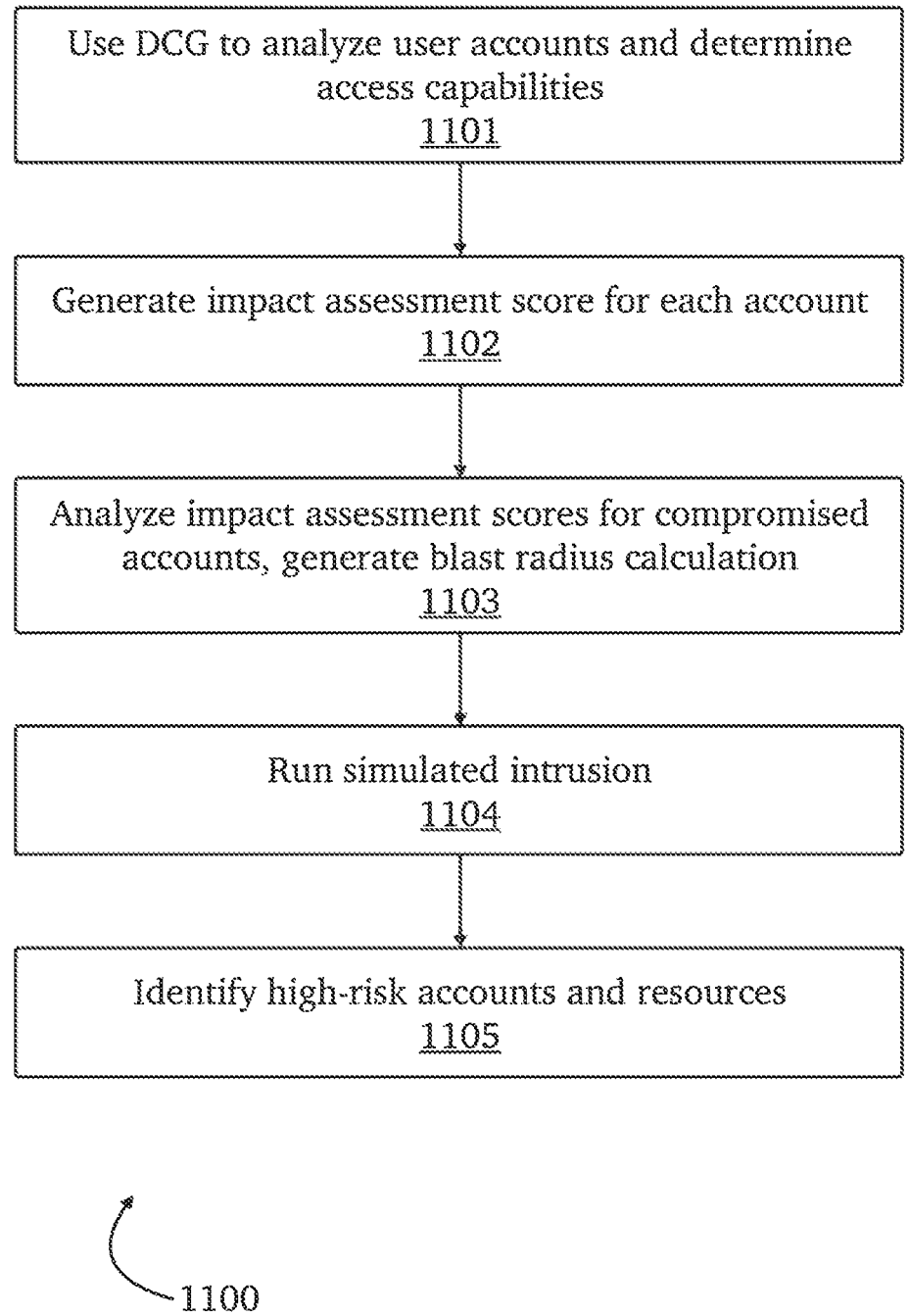
FIG. 11 is a flow diagram of an exemplary method for measuring the effects of cybersecurity attacks, according to one aspect.

FIG. 11 is a flow diagram of an exemplary method 1100 for measuring the effects of cybersecurity attacks, according to one aspect. According to the aspect, impact assessment of an attack may be measured using a DCG 155 to analyze a user account and identify its access capabilities 1101 (for example, what files, directories, devices or domains an account may have access to). This may then be used to generate 1102 an impact assessment score for the account, representing the potential risk should that account be compromised. In the event of an incident, the impact assessment score for any compromised accounts may be used to produce a "blast radius" calculation 1103, identifying exactly what resources are at risk as a result of the intrusion and where security personnel should focus their attention. To provide proactive security recommendations through a simulation module 125, simulated intrusions may be run 1104 to identify potential blast radius calculations for a variety of attacks and to determine 1105 high risk accounts or resources so that security may be improved in those key areas rather than focusing on reactive solutions.

Figure 12:
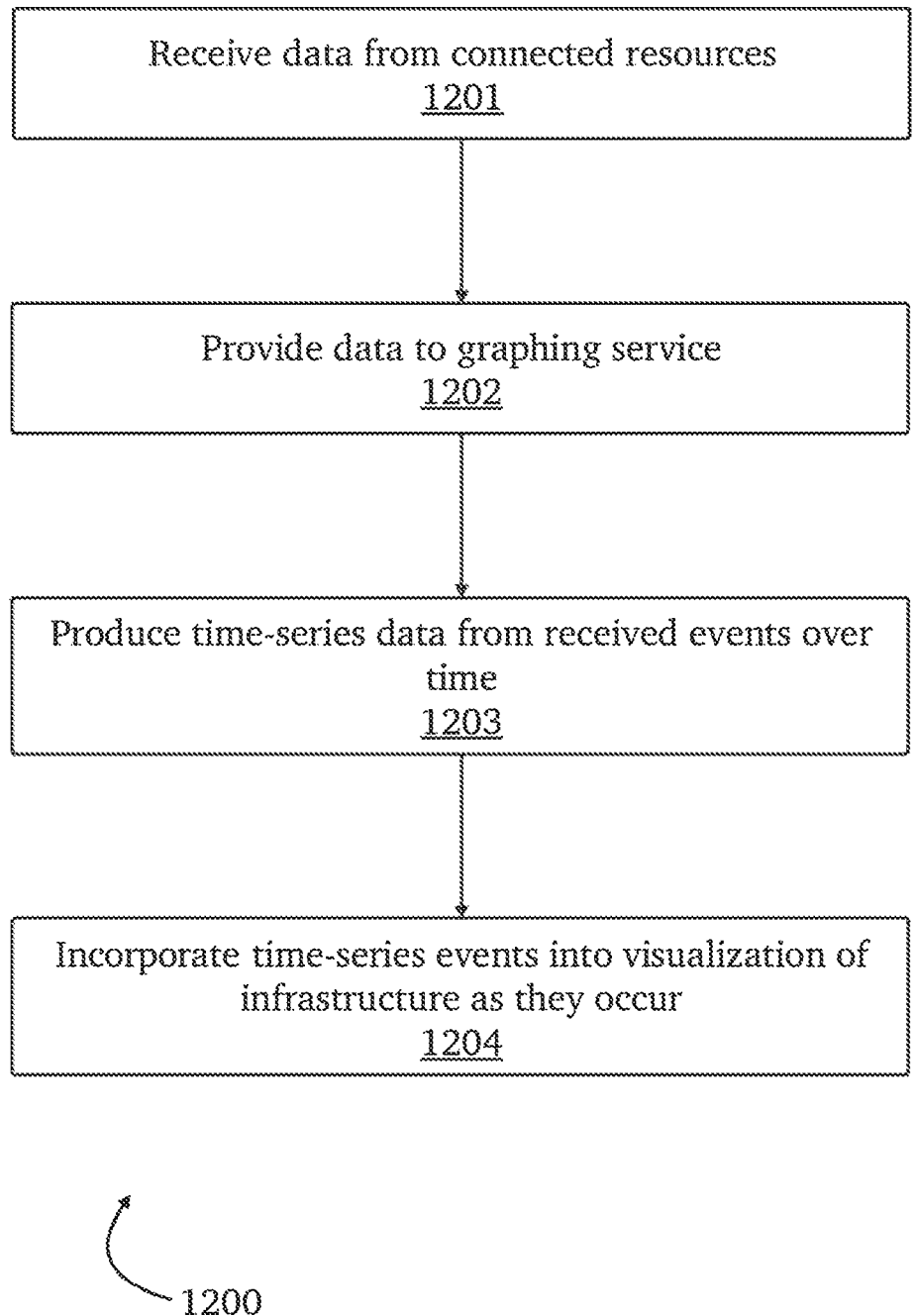
FIG. 12 is a flow diagram of an exemplary method for continuous cybersecurity monitoring and exploration, according to one aspect.

FIG. 12 is a flow diagram of an exemplary method 1200 for continuous cybersecurity monitoring and exploration, according to one aspect. According to the aspect, a state observation service 140 may receive data from a variety of connected systems 1201 such as (for example, including but not limited to) servers, domains, databases, or user directories. This information may be received continuously, passively collecting events and monitoring activity over time while feeding 1202 collected information into a graphing service 145 for use in producing time-series graphs 1203 of states and changes over time. This collated time-series data may then be used to produce a visualization 1204 of changes over time, quantifying collected data into a meaningful and understandable format. As new events are recorded, such as changing user roles or permissions, modifying servers or data structures, or other changes within a security infrastructure, these events are automatically incorporated into the time-series data and visualizations are updated accordingly, providing live monitoring of a wealth of information in a way that highlights meaningful data without losing detail due to the quantity of data points under examination.

Figure 13:
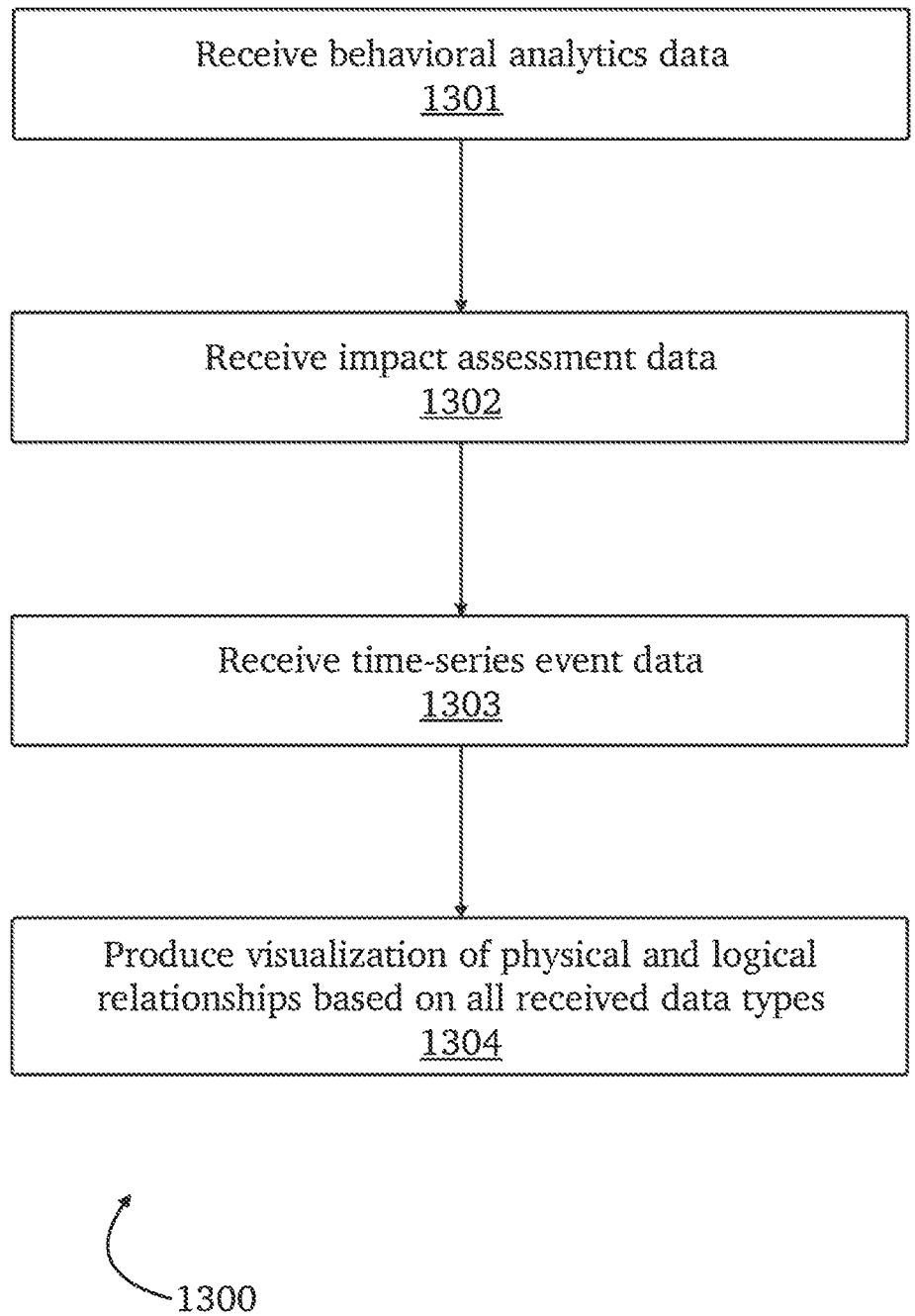
FIG. 13 is a flow diagram of an exemplary method for mapping a cyber-physical system graph (CPG), according to one aspect.

FIG. 13 is a flow diagram of an exemplary method 1300 for mapping a cyber-physical system graph (CPG), according to one aspect. According to the aspect, a cyber-physical system graph may comprise a visualization of hierarchies and relationships between devices and resources in a security infrastructure, contextualizing security information with physical device relationships that are easily understandable for security personnel and users. In an initial step 1301, behavior analytics information (as described previously, referring to FIG. 10) may be received at a graphing service 145 for inclusion in a CPG. In a next step 1302, impact assessment scores (as described previously, referring to FIG. 11) may be received and incorporated in the CPG information, adding risk assessment context to the behavior information. In a next step 1303, time-series information (as described previously, referring to FIG. 12) may be received and incorporated, updating CPG information as changes occur and events are logged. This information may then be used to produce 1304 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 14:
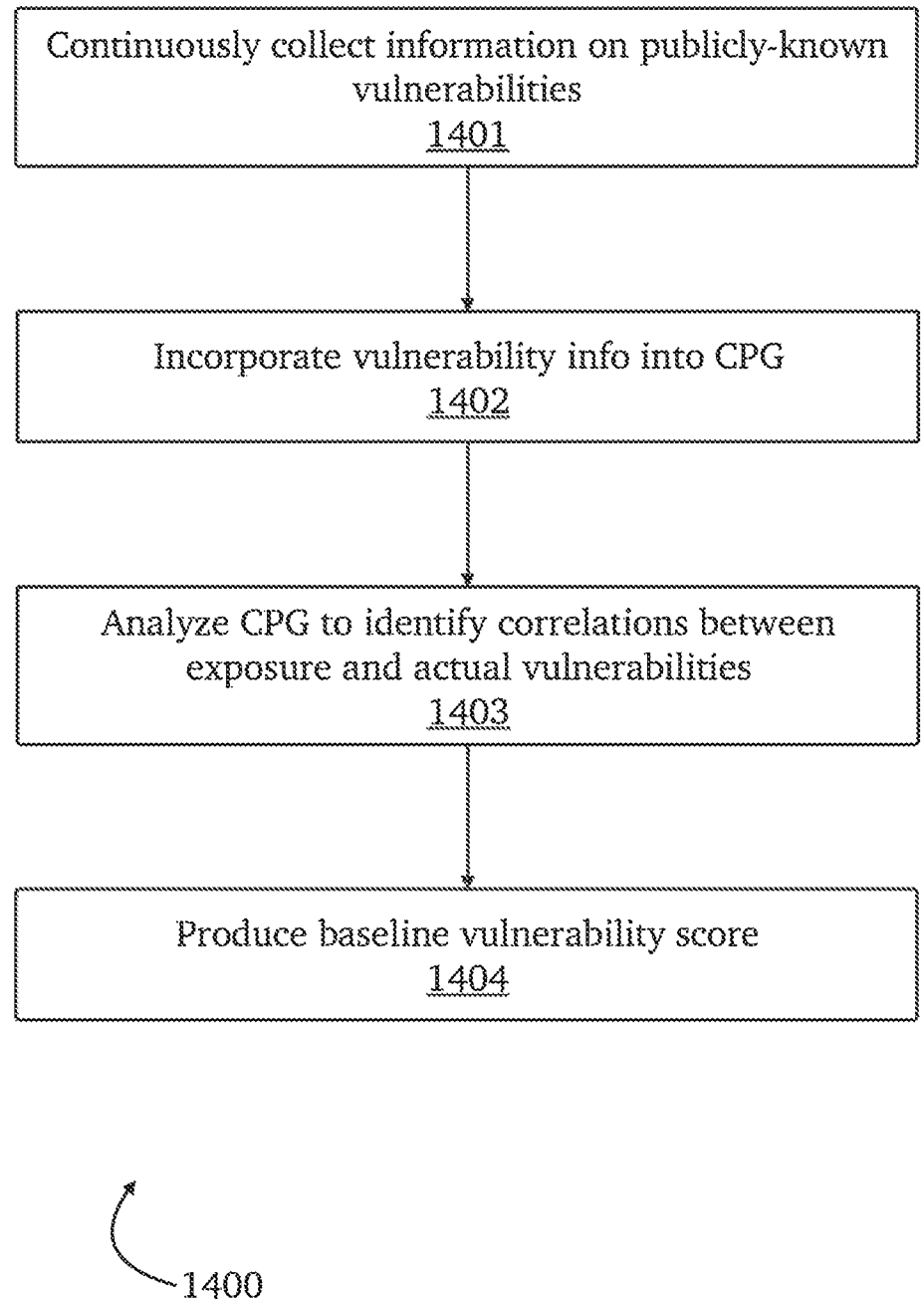
FIG. 14 is a flow diagram of an exemplary method for continuous network resilience scoring, according to one aspect.

FIG. 14 is a flow diagram of an exemplary method 1400 for continuous network resilience scoring, according to one aspect. According to the aspect, a baseline score can be used to measure an overall level of risk for a network infrastructure, and may be compiled by first collecting 1401 information on publicly-disclosed vulnerabilities, such as (for example) using the Internet or common vulnerabilities and exploits (CVE) process. This information may then 1402 be incorporated into a CPG as described previously in FIG. 13, and the combined data of the CPG and the known vulnerabilities may then be analyzed 1403 to identify the relationships between known vulnerabilities and risks exposed by components of the infrastructure. This produces a combined CPG 1404 that incorporates both the internal risk level of network resources, user accounts, and devices as well as the actual risk level based on the analysis of known vulnerabilities and security risks.

Figure 15:
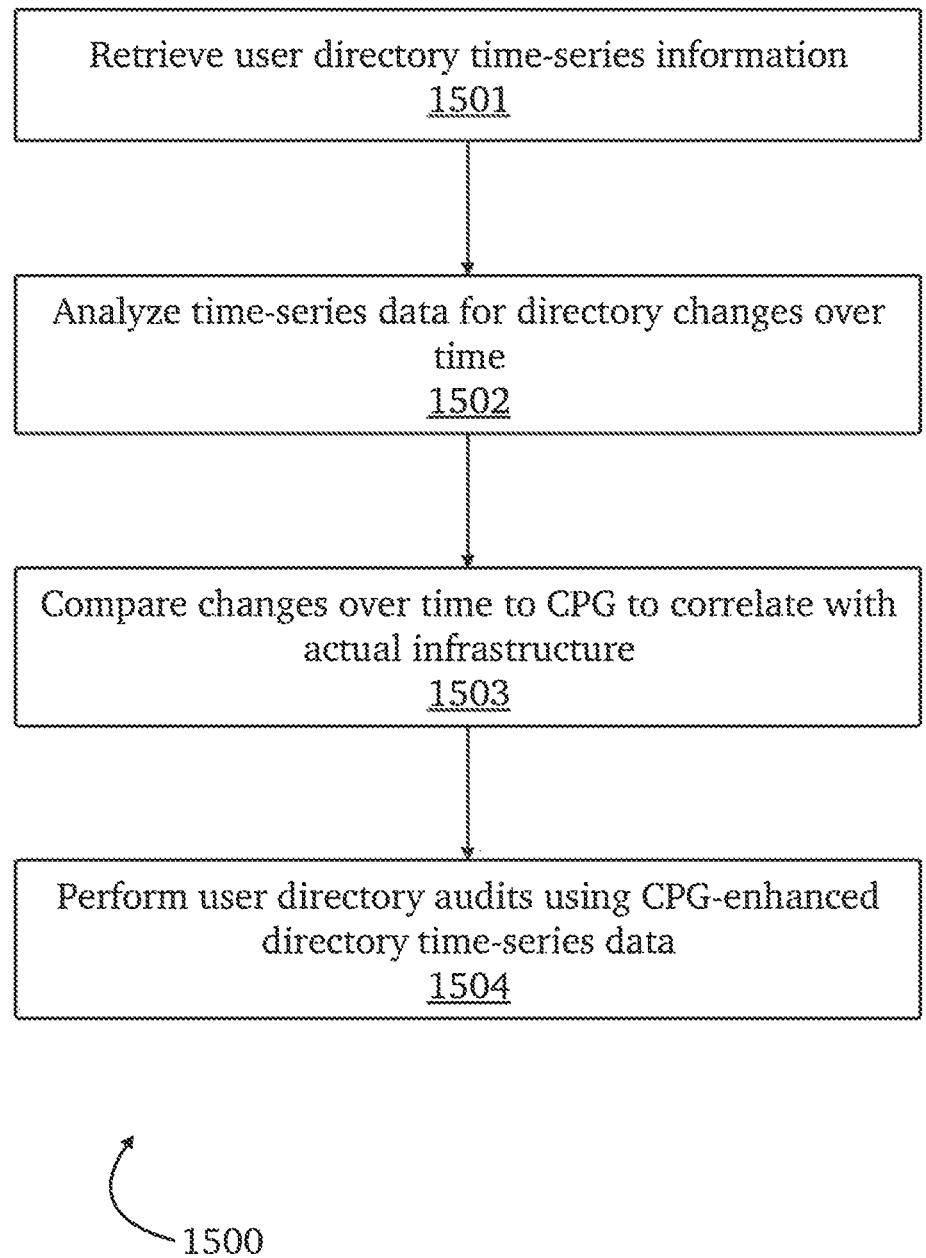
FIG. 15 is a flow diagram of an exemplary method for cybersecurity privilege oversight, according to one aspect.

FIG. 15 is a flow diagram of an exemplary method 1500 for cybersecurity privilege oversight, according to one aspect. According to the aspect, time-series data (as described above, referring to FIG. 12) may be collected 1501 for user accounts, credentials, directories, and other user-based privilege and access information. This data may then 1502 be analyzed to identify changes over time that may affect security, such as modifying user access privileges or adding new users. The results of analysis may be checked 1503 against a CPG (as described previously in FIG. 13), to compare and correlate user directory changes with the actual infrastructure state. This comparison may be used to perform accurate and context-enhanced user directory audits 1504 that identify not only current user credentials and other user-specific information, but changes to this information over time and how the user information relates to the actual infrastructure (for example, credentials that grant access to devices and may therefore implicitly grant additional access due to device relationships that were not immediately apparent from the user directory alone).

Figure 16:
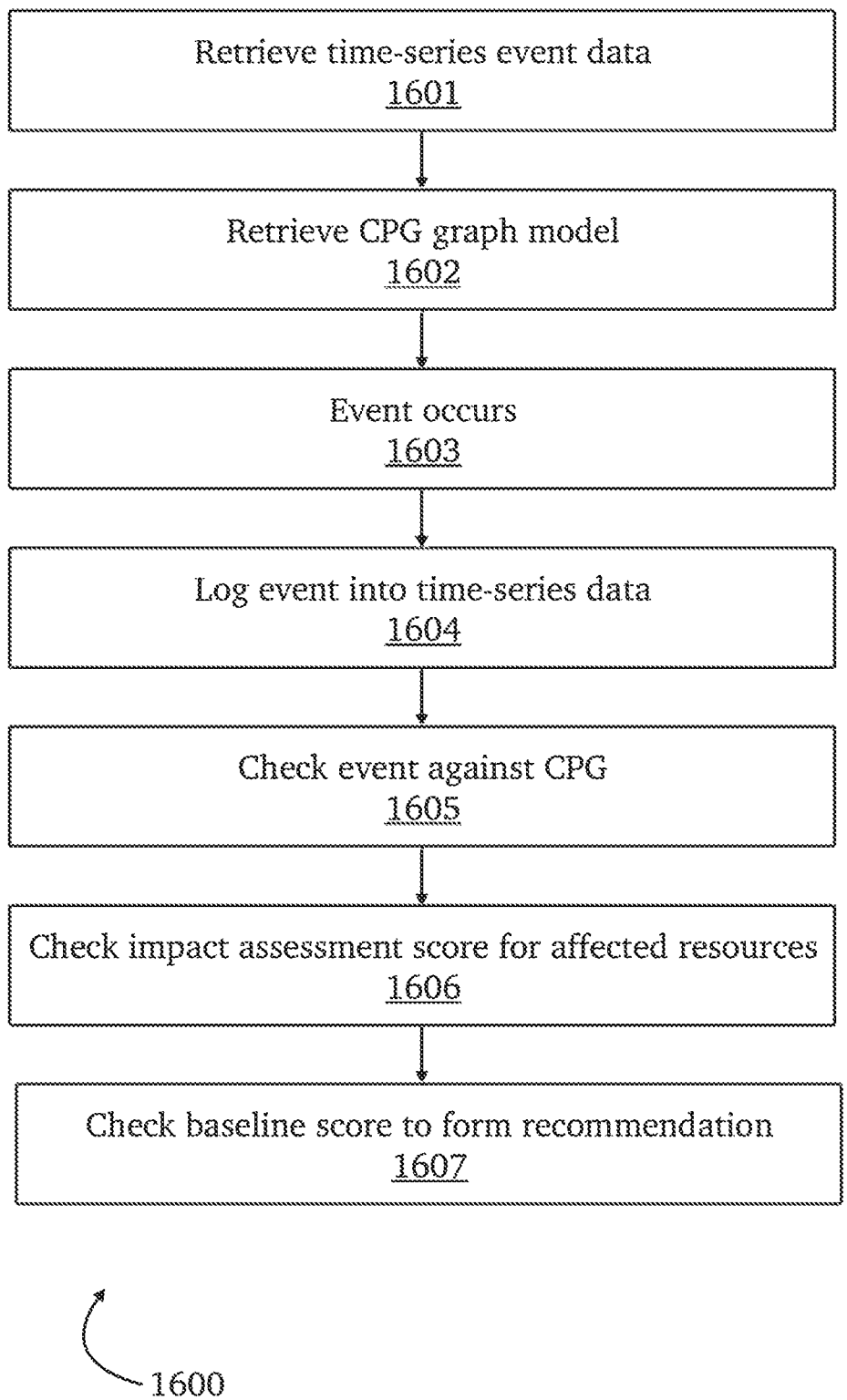
FIG. 16 is a flow diagram of an exemplary method for cybersecurity risk management, according to one aspect.

FIG. 16 is a flow diagram of an exemplary method 1600 for cybersecurity risk management, according to one aspect. According to the aspect, multiple methods described previously may be combined to provide live assessment of attacks as they occur, by first receiving 1601 time-series data for an infrastructure (as described previously, in FIG. 12) to provide live monitoring of network events. This data is then enhanced 1602 with a CPG (as described above in FIG. 13) to correlate events with actual infrastructure elements, such as servers or accounts. When an event (for example, an attempted attack against a vulnerable system or resource) occurs 1603, the event is logged in the time-series data 1604, and compared against the CPG 1605 to determine the impact. This is enhanced with the inclusion of impact assessment information 1606 for any affected resources, and the attack is then checked against a baseline score 1607 to determine the full extent of the impact of the attack and any necessary modifications to the infrastructure or policies.

Figure 17:
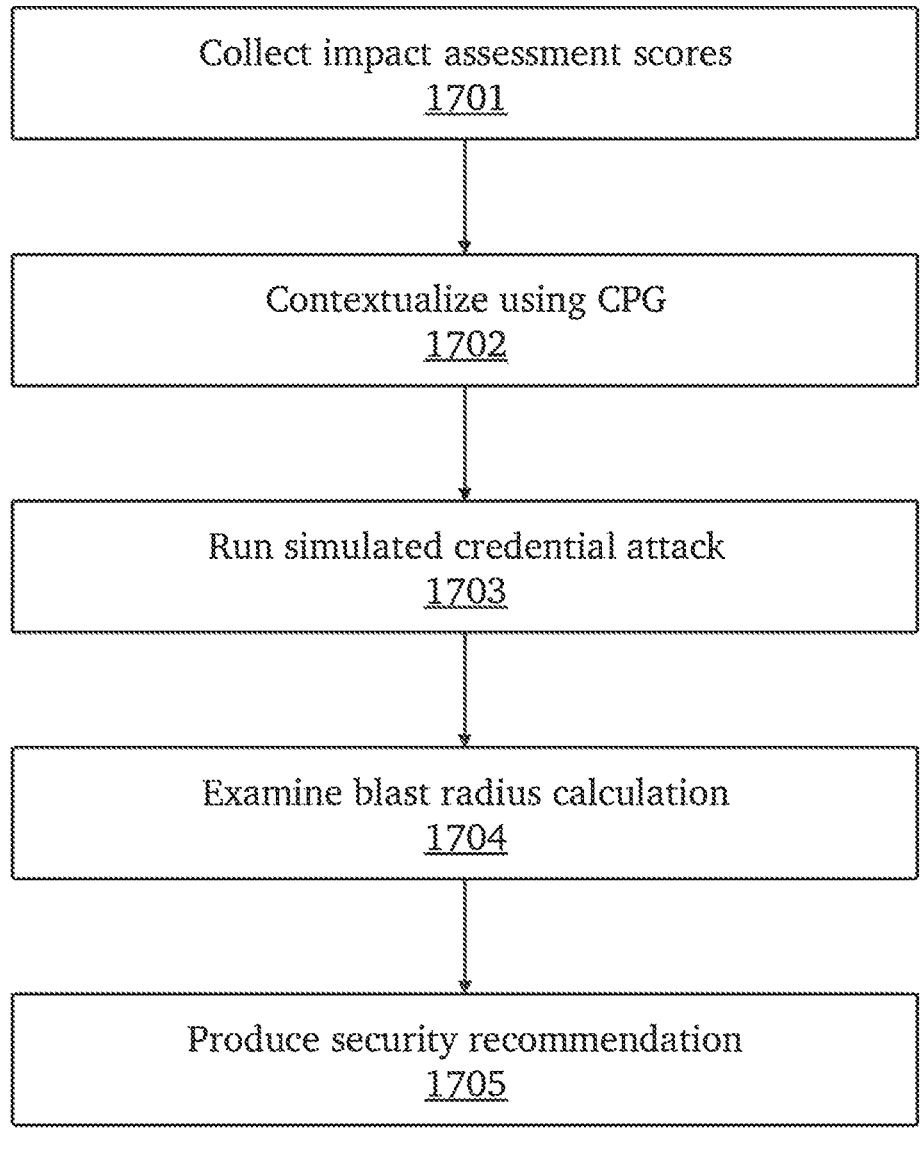
FIG. 17 is a flow diagram of an exemplary method for mitigating compromised credential threats, according to one aspect.

FIG. 17 is a flow diagram of an exemplary method 1700 for mitigating compromised credential threats, according to one aspect. According to the aspect, impact assessment scores (as described previously, referring to FIG. 11) may be collected 1701 for user accounts in a directory, so that the potential impact of any given credential attack is known in advance of an actual attack event. This information may be combined with a CPG 1702 as described previously in FIG. 13, to contextualize impact assessment scores within the infrastructure (for example, so that it may be predicted what systems or resources might be at risk for any given credential attack). A simulated attack may then be performed 1703 to use machine learning to improve security without waiting for actual attacks to trigger a reactive response. A blast radius assessment (as described above in FIG. 11) may be used in response 1704 to determine the effects of the simulated attack and identify points of weakness, and produce a recommendation report 1705 for improving and hardening the infrastructure against future attacks.

Figure 18:
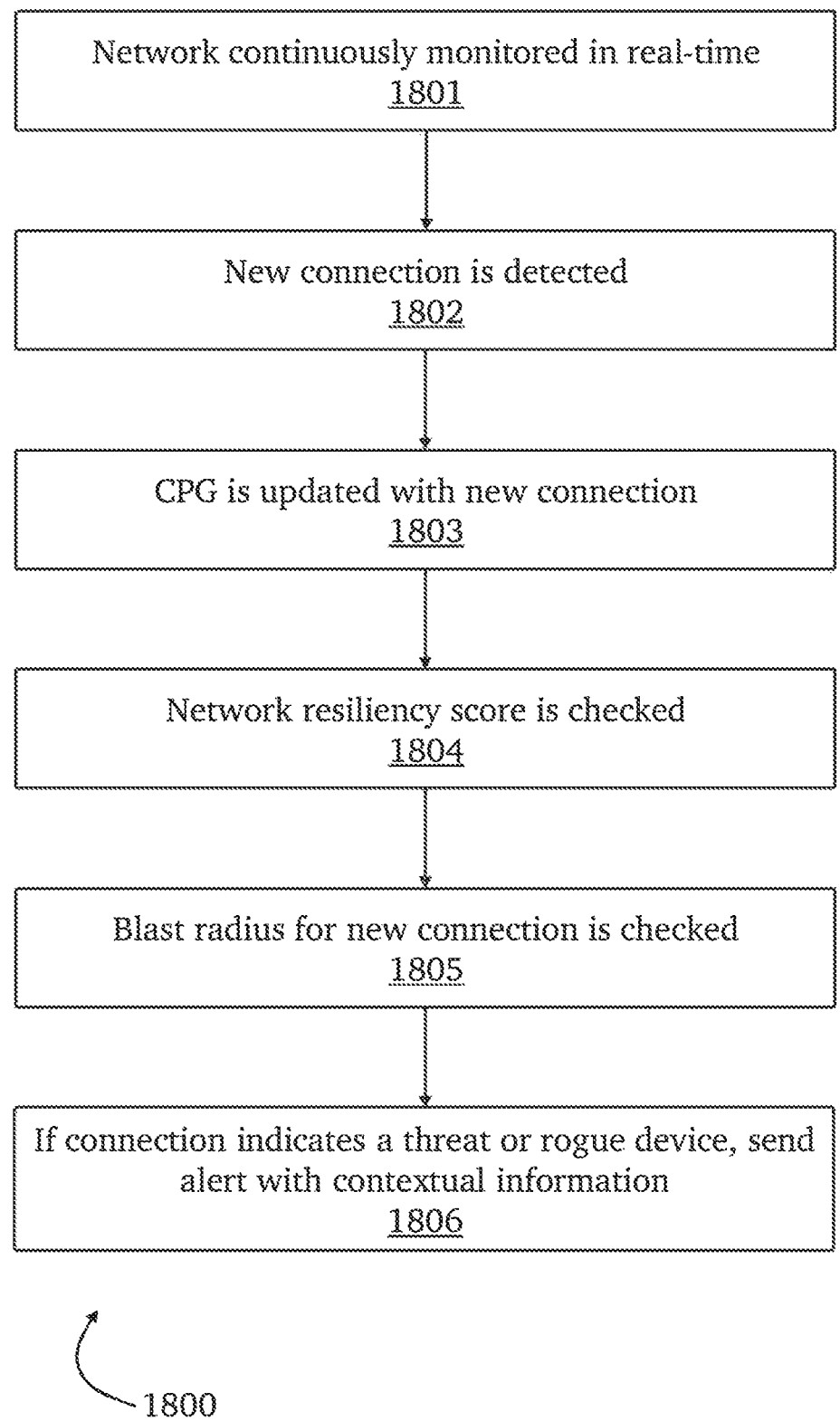
FIG. 18 is a flow diagram of an exemplary method for dynamic network and rogue device discovery, according to one aspect.

FIG. 18 is a flow diagram of an exemplary method 1800 for dynamic network and rogue device discovery, according to one aspect. According to the aspect, an advanced cyber decision platform may continuously monitor a network in real-time 1801, detecting any changes as they occur. When a new connection is detected 1802, a CPG may be updated 1803 with the new connection information, which may then be compared against the network's resiliency score 1804 to examine for potential risk. The blast radius metric for any other devices involved in the connection may also be checked 1805, to examine the context of the connection for risk potential (for example, an unknown connection to an internal data server with sensitive information may be considered a much higher risk than an unknown connection to an externally-facing web server). If the connection is a risk, an alert may be sent to an administrator 1806 with the contextual information for the connection to provide a concise notification of relevant details for quick handling.

Figure 19:
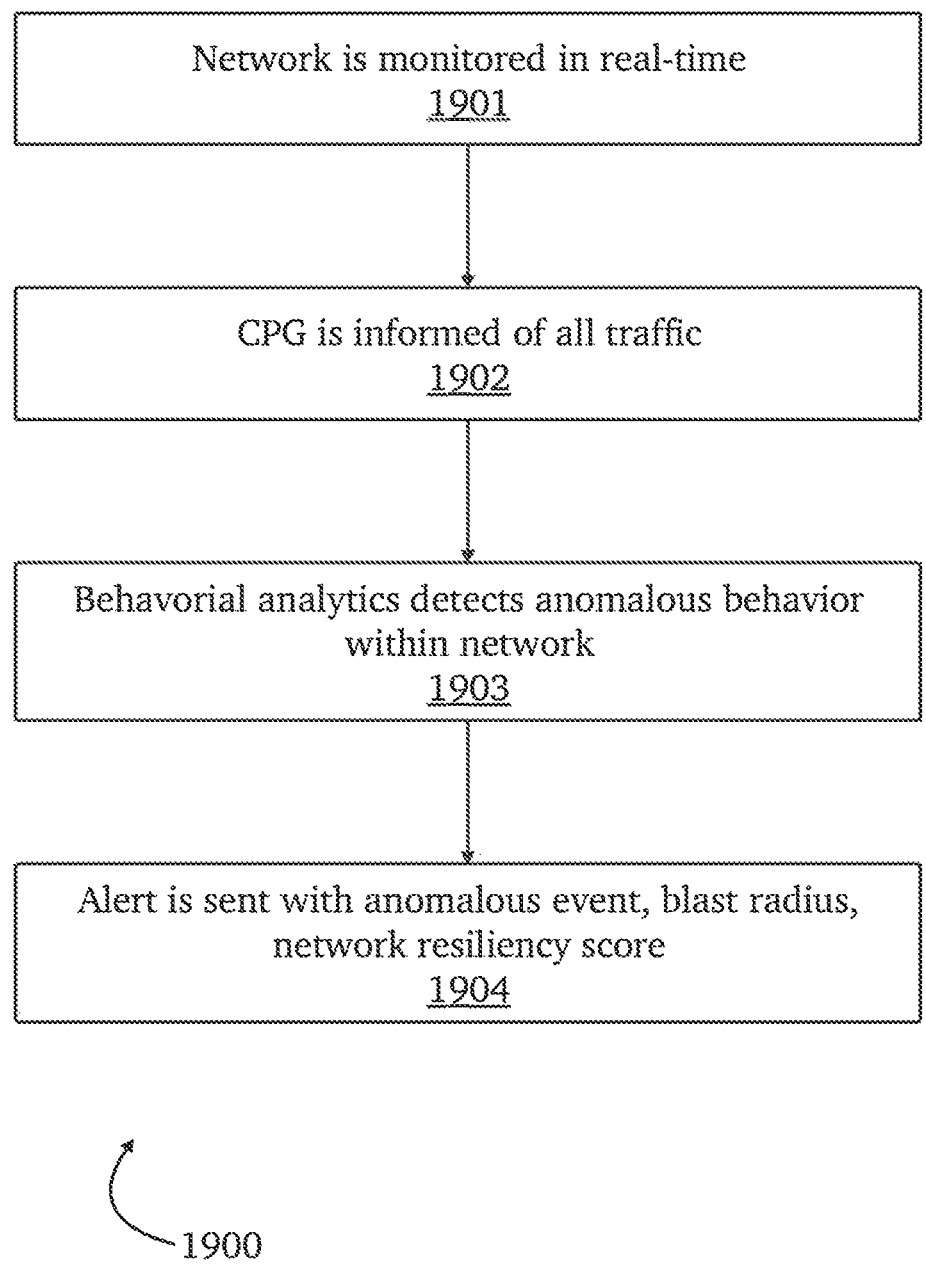
FIG. 19 is a flow diagram of an exemplary method for Kerberos ticket attack detection, according to one aspect.

FIG. 19 is a flow diagram of an exemplary method 1900 for Kerberos ticket attack detection, according to one aspect. To detect these forms of attack, behavioral analytics may be employed to detect erroneously-issued authentication tickets or forged AO's, whether from incorrect configuration or from an attack. According to the aspect, an advanced cyber decision platform may continuously monitor a network 1901, informing a CPG in real-time of all traffic associated with people, places, devices, or services 1902. Machine learning algorithms detect behavioral anomalies as they occur in real-time 1903, notifying administrators with an assessment of the anomalous event 1904 as well as a blast radius score for the particular event and a network resiliency score to advise of the overall health of the network. By automatically detecting unusual behavior and informing an administrator of the anomaly along with contextual information for the event and network, a compromised ticket is immediately detected when a new authentication connection is made.

Figure 20:
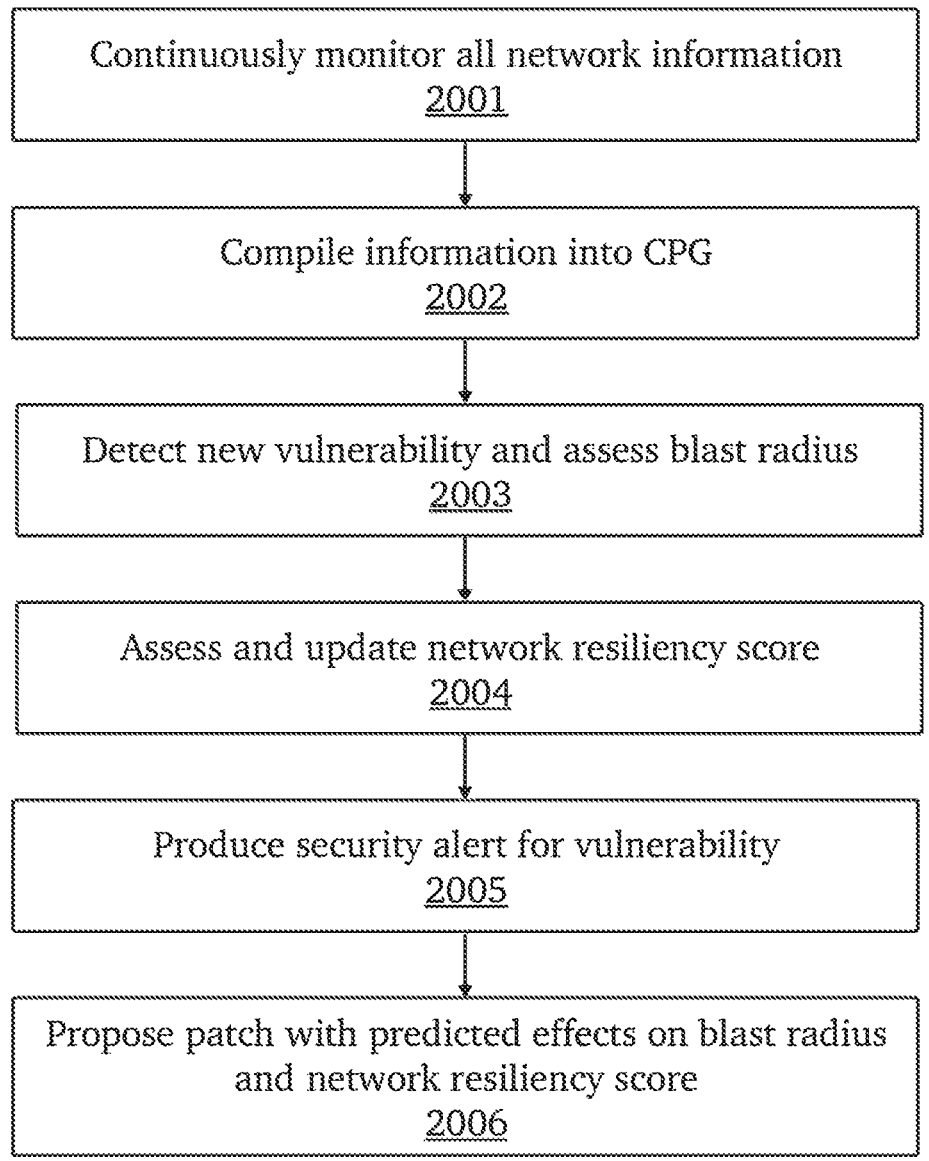
FIG. 20 is a flow diagram of an exemplary method for risk-based vulnerability and patch management, according to one aspect.

FIG. 20 is a flow diagram of an exemplary method 2000 for risk-based vulnerability and patch management, according to one aspect. According to the aspect, an advanced cyber decision platform may monitor all information about a network 2001, including (but not limited to) device telemetry data, log files, connections and network events, deployed software versions, or contextual user activity information. This information is incorporated into a CPG 2002 to maintain an up-to-date model of the network in real-time. When a new vulnerability is discovered, a blast radius score may be assessed 2003 and the network's resiliency score may be updated 2004 as needed. A security alert may then be produced 2005 to notify an administrator of the vulnerability and its impact, and a proposed patch may be presented 2006 along with the predicted effects of the patch on the vulnerability's blast radius and the overall network resiliency score. This determines both the total impact risk of any particular vulnerability, as well as the overall effect of each vulnerability on the network as a whole. This continuous network assessment may be used to collect information about new vulnerabilities and exploits to provide proactive solutions with clear result predictions, before attacks occur.

Figure 21:
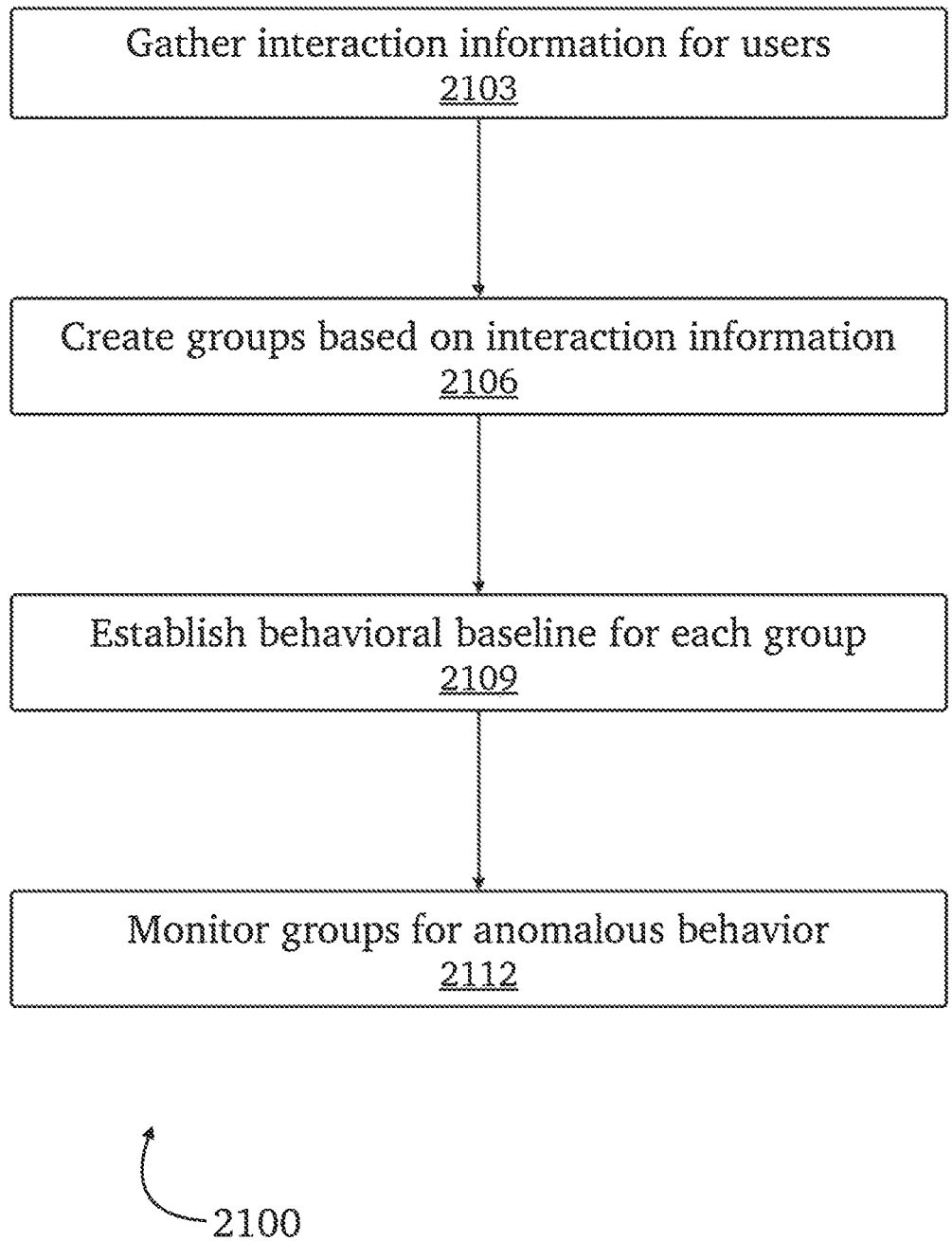
FIG. 21 is a flow diagram of an exemplary method for establishing groups of users according to one aspect.

FIG. 21 is a flow diagram of an exemplary method 2100 for establishing groups of users according to one aspect. At an initial step 2103, data pertaining to network interaction between users and devices are gathered by a grouping engine. At step 2106, the grouping engine may then process the gathered information by converting it to a graph format and using DCG module to establish groupings for users. A system administrator may provide additional input, and fine-tune the groupings if required. At step 2109, a behavioral baseline is established for each group that may be based on the interaction information, network logs, connected devices, and the like. At step 2112, groups are continuous monitored for anomalous behavior.

Figure 22:
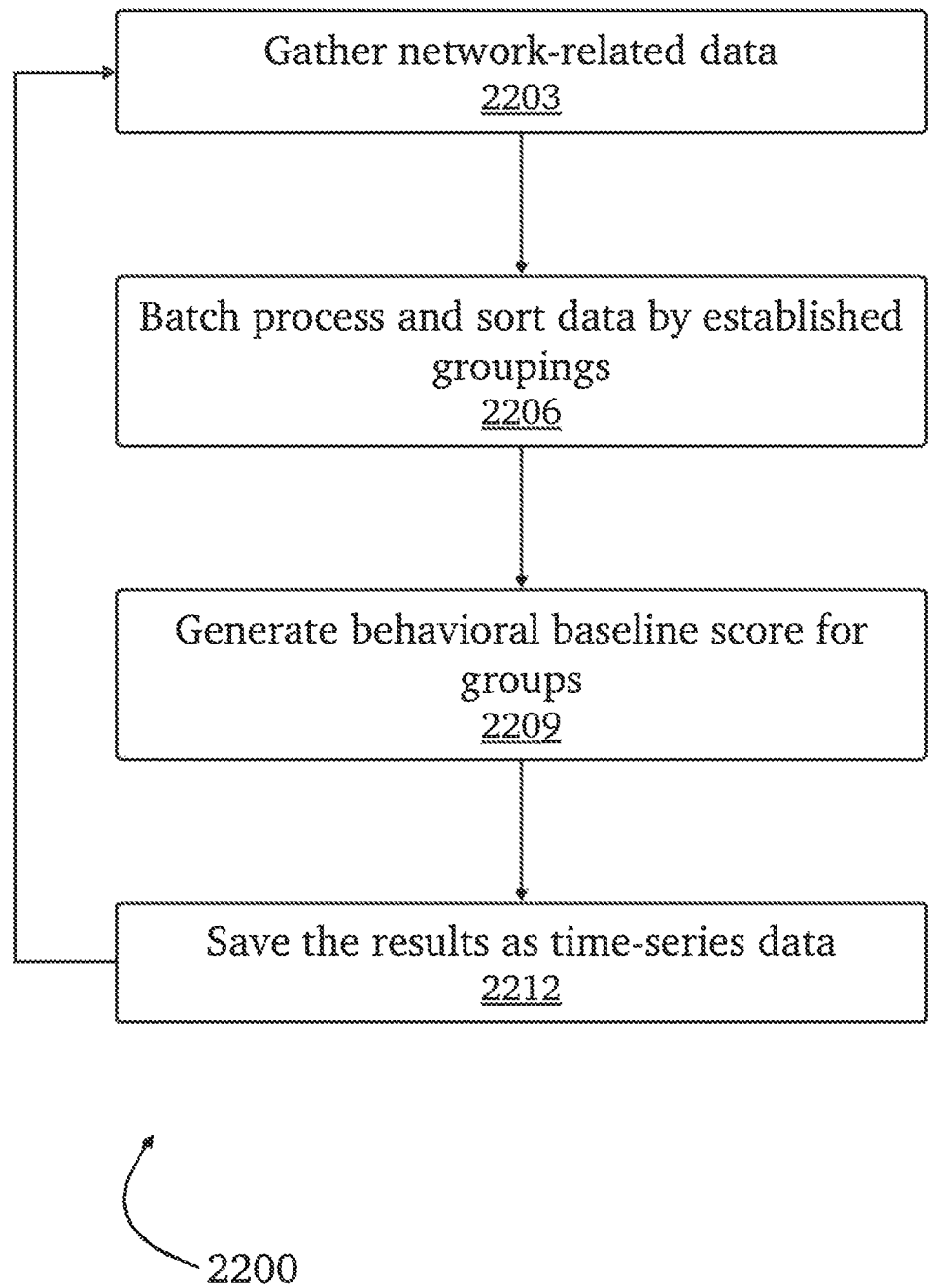
FIG. 22 is a flow diagram of an exemplary method for monitoring groups for anomalous behavior, according to one aspect.

FIG. 22 is a flow diagram of an exemplary method 2200 for monitoring groups for anomalous behavior, according to one aspect. At an initial step 2203, a system, as described above in FIG. 8, gathers network-related data. This data may comprise usage logs, Kerberos session data, computers and other devices connected to the network, active users, software installed, and the like. At step 2206, a behavioral analysis engine may process the data. Parallel computing may be used to speed up the processing of the data. The data may then be sorted by, and associated to, previously established groupings. At step 2209, a behavioral baseline score is generated for each group based on the results of the data processing. At step 2212, the data is stored into a time-series graph database. The process repeats periodically to create snapshots of various moments in time, and stored into the database. This may allow the system to retrain the baseline to take into considering non-anomalous baseline variances that may occur over time, as well as forecast changes in group dynamics using predictive analysis functions of ACDP system 100.

Figure 23:
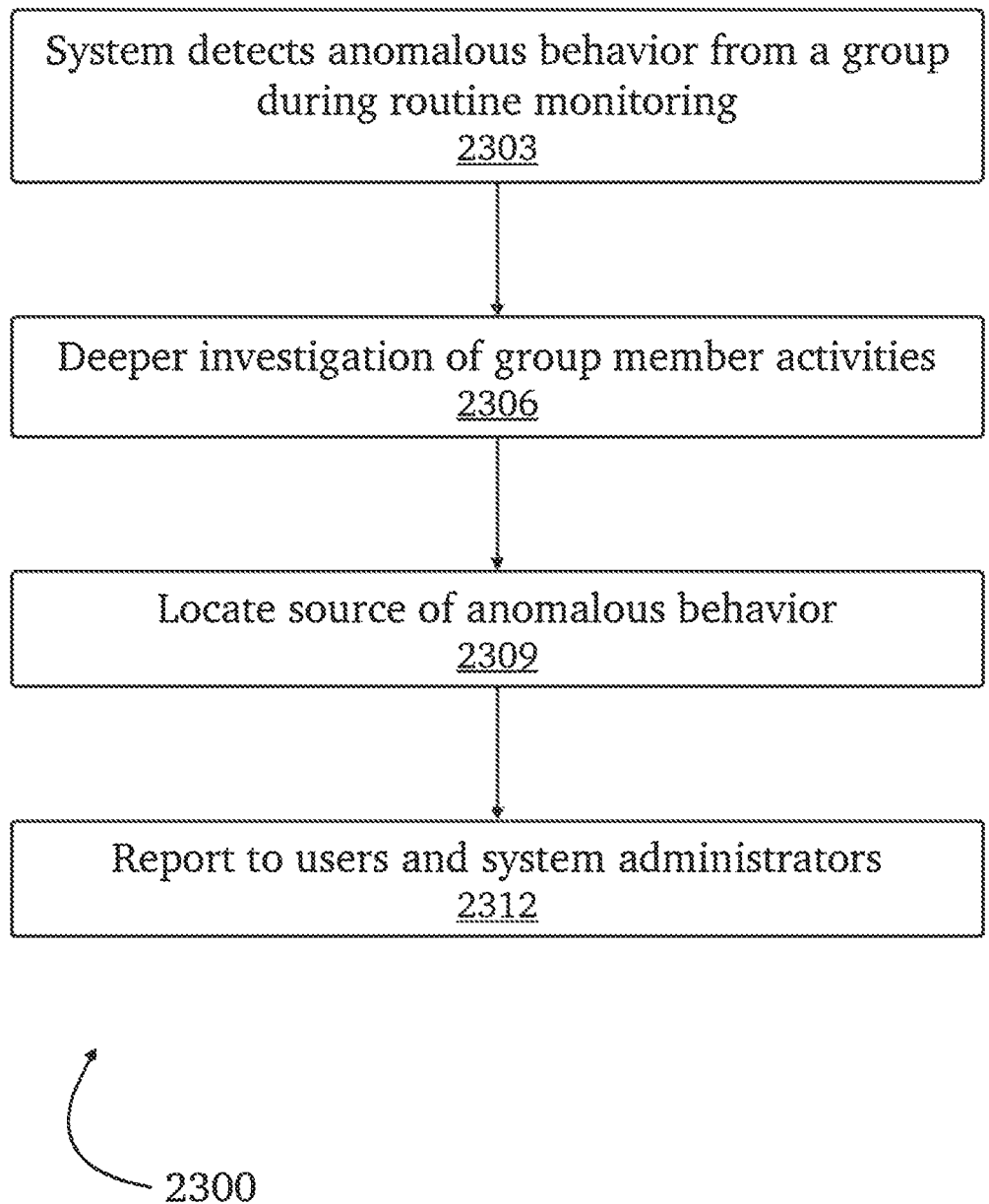
FIG. 23 is a flow diagram for an exemplary method for handing a detection of anomalous behavior, according to one aspect.

FIG. 23 is a flow diagram for an exemplary method 2300 for handling a detection of anomalous behavior, according to one aspect. At an initial step 2303, the system detects anomalous user behavior from a group. This may be based on comparison to established baselines, or a high priority incident caught during routine monitoring, for example a device accessing a blacklisted domain. At step 2306, the system investigates the group in which the anomalous behavior originated. This may include a more thorough analysis of usage and access logs. If applicable, users or devices with higher access privileges may be investigated before those with lower access privileges. At step 2309, the source or sources of the anomalous behavior is identified, and some corrective measures may be taken. For example, the offending device or user account may be automatically locked out of the network until a solution has been implemented. At step 2312, group members and system administrators may be notified. The system may utilize the various techniques discussed above to recommend a corrective action, or the system may take action automatically.

Figure 24:
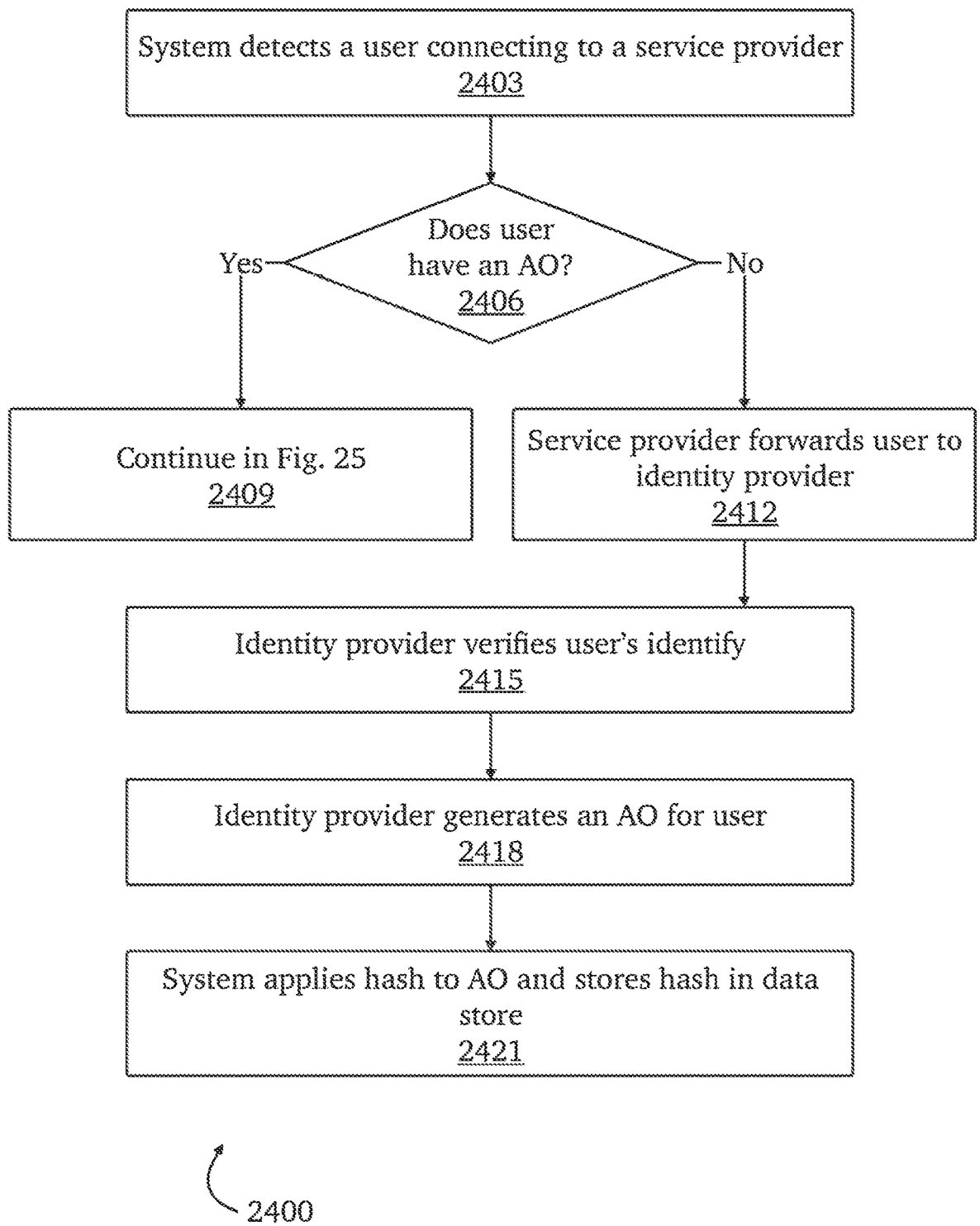
FIG. 24 is a flow diagram illustrating an exemplary method for processing a new user connection, according to one aspect.

FIG. 24 is a flow diagram illustrating an exemplary method 2400 for processing a new user connection, according to one aspect. At an initial step 2403, system 910 detects a user connecting to a monitored service provider. At step 2406, if the user is connecting with an existing AO, the process leads to the method discussed in FIG. 25 at step 2409.

If the user doesn't have an existing AO, the service provider forwards the user to an identity provider at step 2412. At step 2415, the identity provider prompts the user for identifying information, such as a username and password. At step 2418, after successful verification, the IdP generates a unique AO for the user. At step 2421, system 910 retrieves the AO and uses a hashing engine to calculate a cryptographic hash for the newly generated AO, and stores the hash in a data store.

Figure 25:
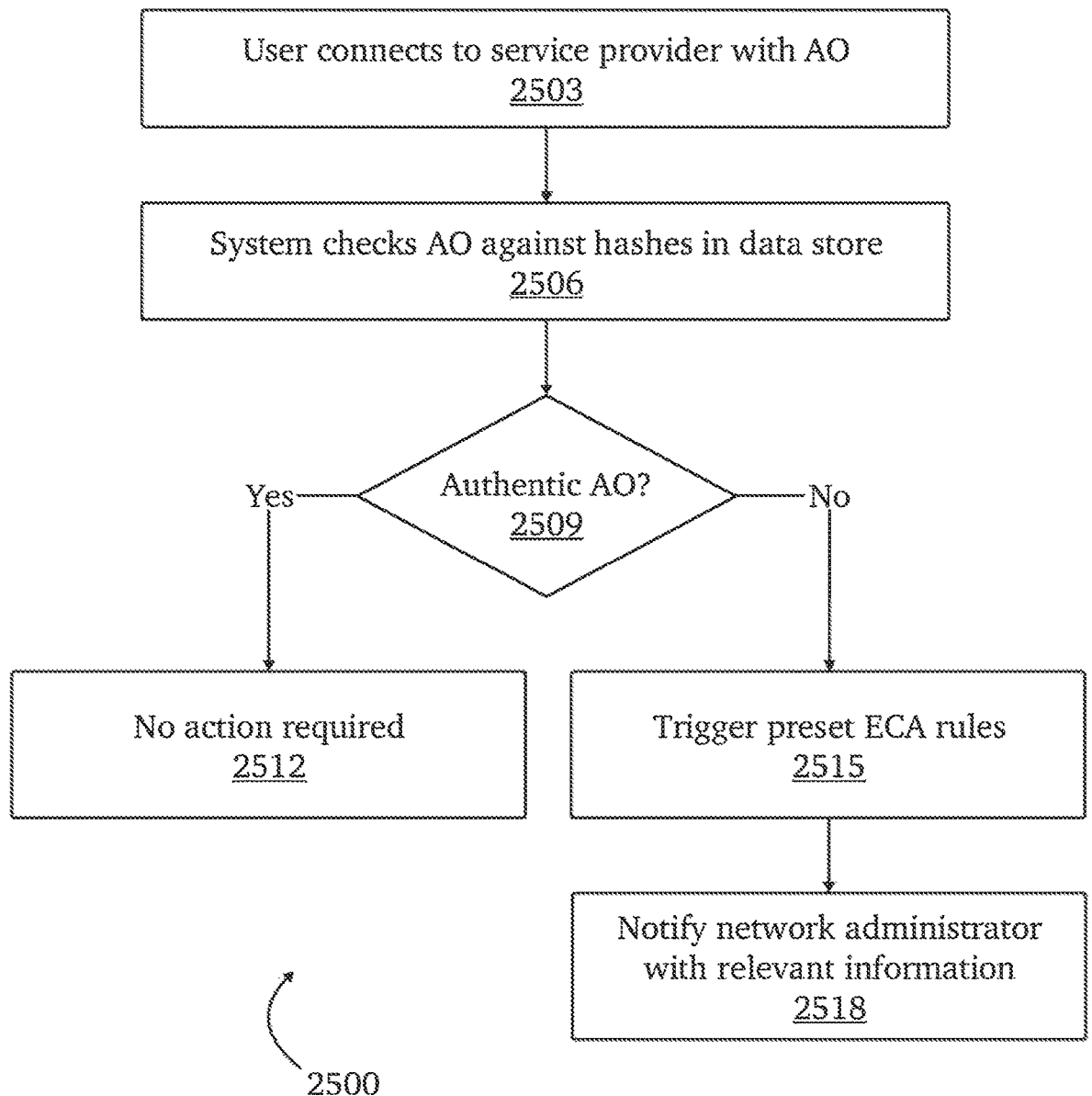
FIG. 25 is a flow diagram illustrating an exemplary method for verifying the authenticity of an authentication object, according to one aspect.

FIG. 25 is a flow diagram illustrating an exemplary method 2500 for verifying the authenticity of an authentication object, according to one aspect. At an initial step 2503, a user with an AO connects to a monitored service provider. At step 2506, system 910 detects the connection request, retrieves the AO, and generates a cryptographic hash for the AO. System 910 may now compare the newly generated hashes with previous generated hashes stored in memory. At step 2509, if the AO is found to be authentic, the connect proceeds as normal and method 2500 ends at step 2512 as no further action for this session is required. If the AO is determined to be forged, method 2500 goes to step 2515 where ECA rules may be triggered to perform their preset functions, and perform "circuit breaker" checks within a user-configurable time period. At step 2518, a network administrator at step may be notified, and sent any relevant information, such as blast radius, access logs for the forged AO connection, and the like.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 26:
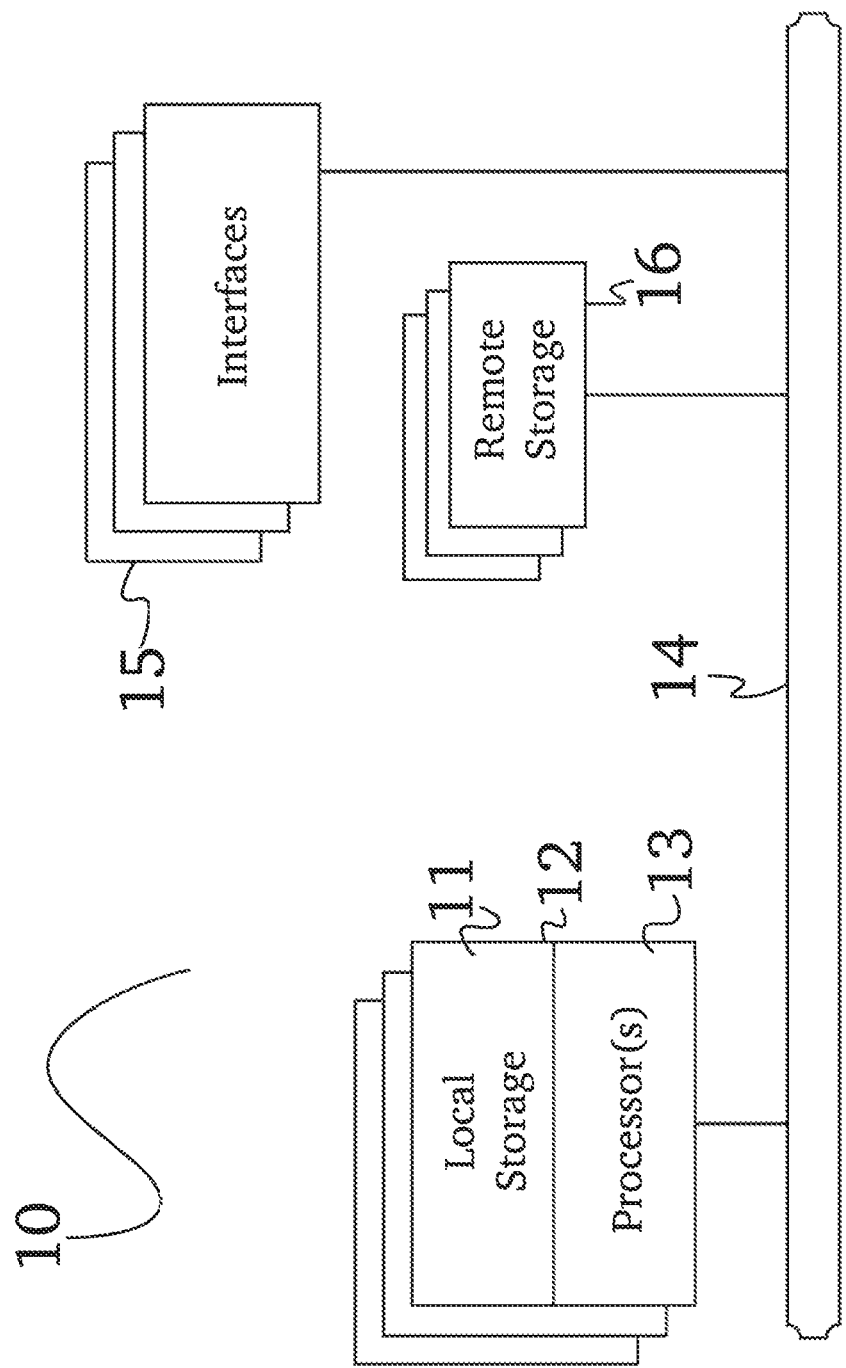
FIG. 26 is a block diagram illustrating an exemplary hardware architecture of a computing device used in various embodiments of the invention.

Referring now to FIG. 26, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 26 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 27:
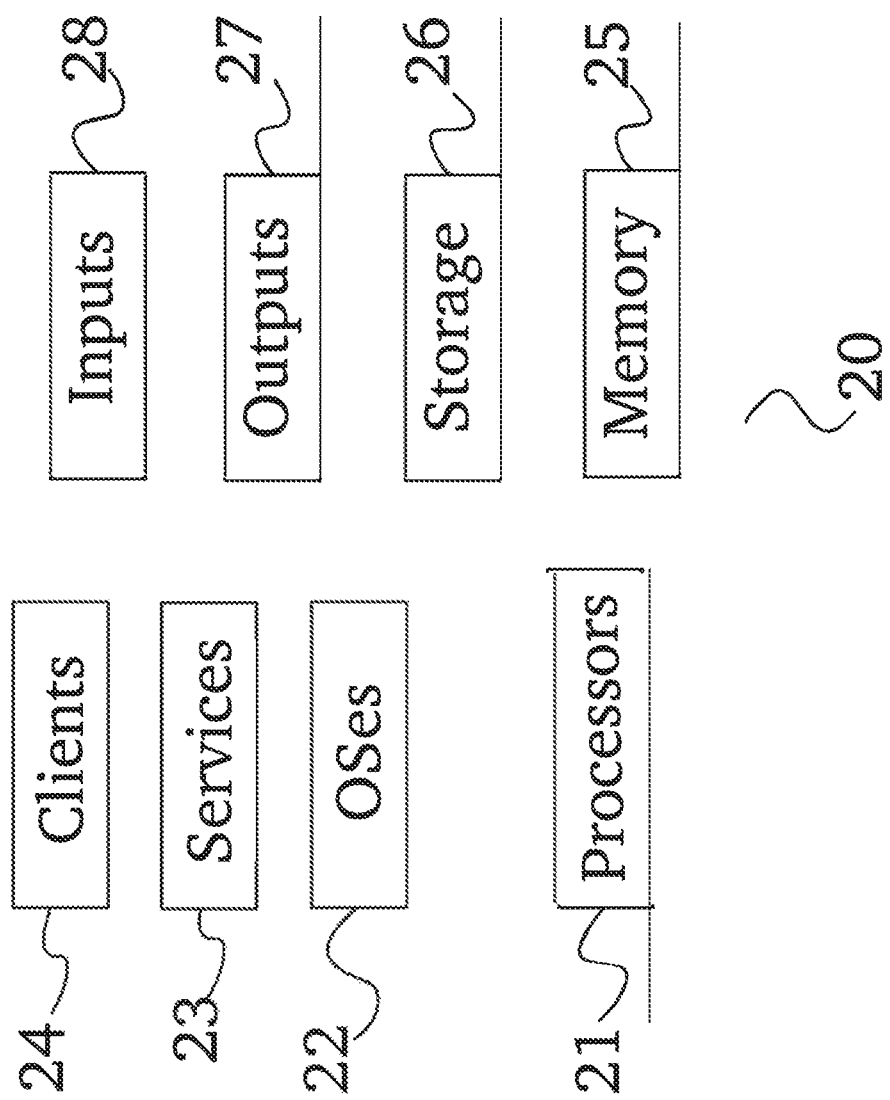
FIG. 27 is a block diagram illustrating an exemplary logical architecture for a client device, according to various embodiments of the invention.

In some aspects, systems may be implemented on a standalone computing system. Referring now to FIG. 27, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20 and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 26). Examples of storage devices 26 include flash memory, magnetic hard drive, CD-ROM, and/or the like.

Figure 28:
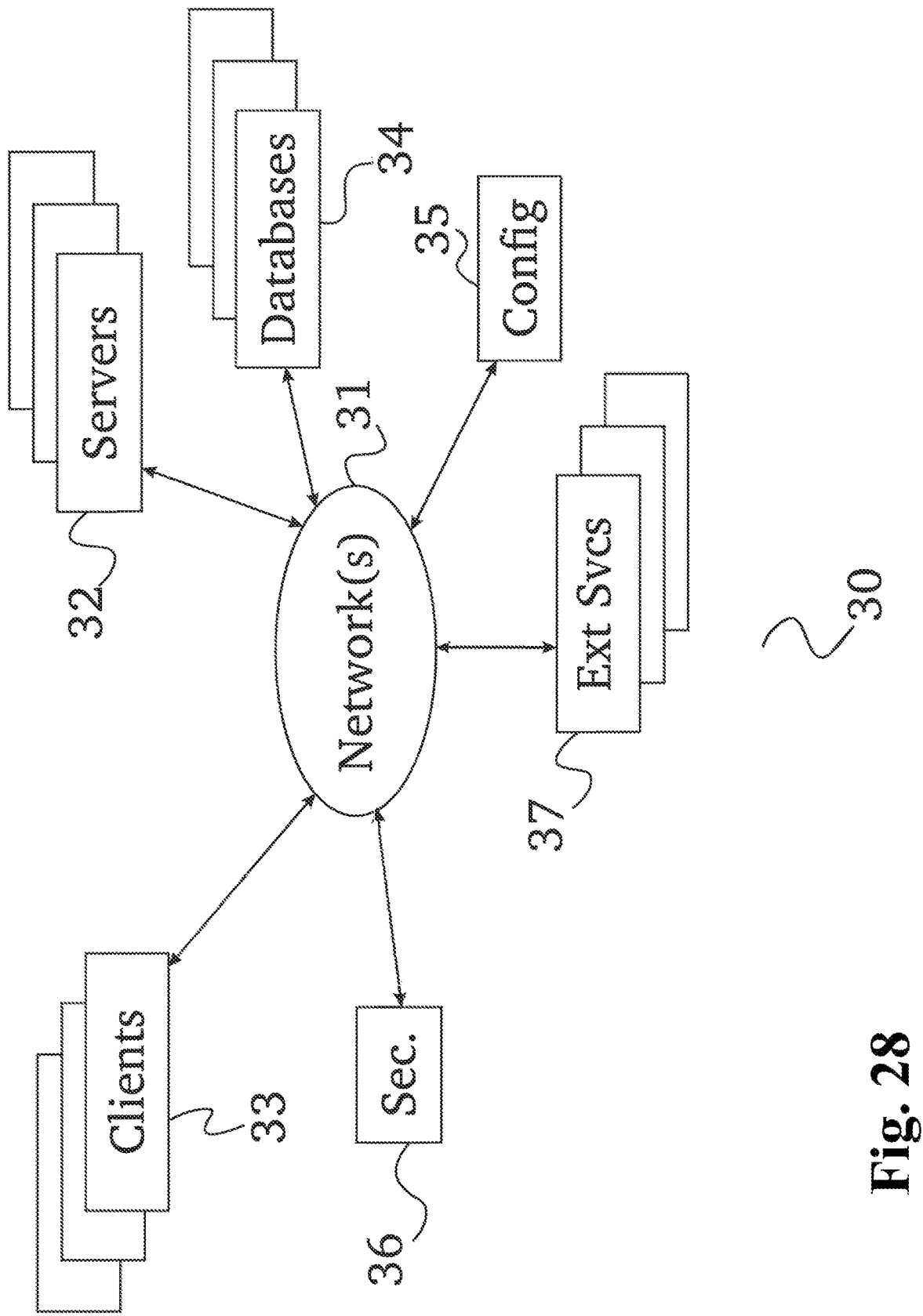
FIG. 28 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 28, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 27. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 29:
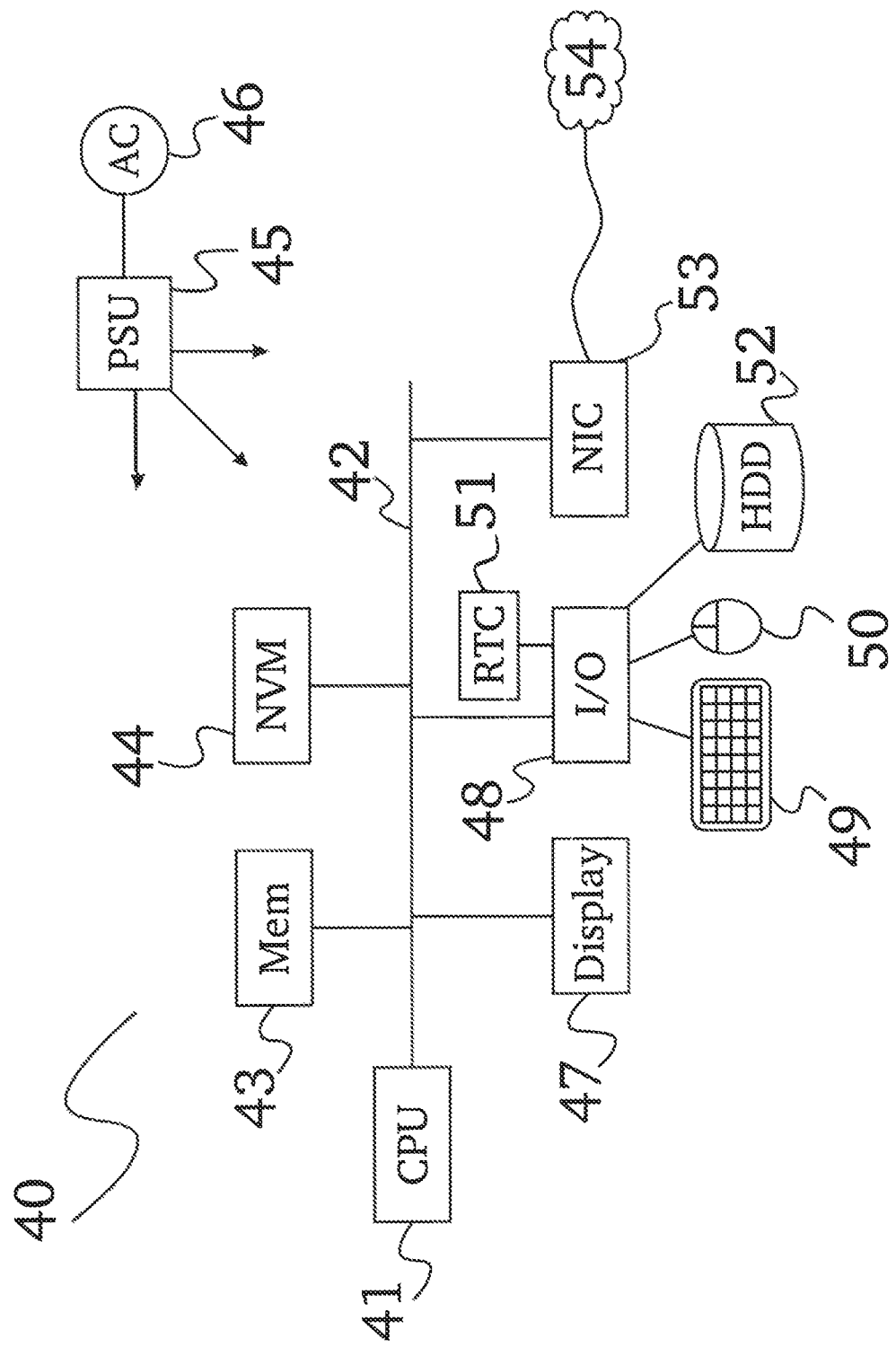
FIG. 29 is another block diagram illustrating an exemplary hardware architecture of a computing device used in various embodiments of the invention.

FIG. 29 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein.

It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalent.

What is claimed is:

1. A system for detecting and mitigating ticket-based attacks within a domain, comprising:
   a computing system comprising a memory and a processor;
   an authentication object inspector comprising a first plurality of programming instructions stored in the memory which, when operating on the processor, causes the computing system to:
      receive network traffic via a first network connection, the network traffic comprising at least a plurality of first authentication objects known to be generated by an identity provider associated with an authentication domain;
      store a record of each received first authentication object, with attached metadata comprising a timestamp of when each first authentication object was received, in a time-series database;
      compute a unique identifier of each first authentication object;
      store the unique identifier of each first authentication object in a database of unique identifiers for the identity provider;
      receive a request for access to a network resource within the authentication domain accompanied by a second authentication object;
      compute a unique identifier of the second authentication object;
      determine if the second unique identifier exists in the database of unique identifiers for the authentication provider; and
      where the unique identifier of the second authentication object does not exist in the database of unique identifiers:
         analyze a plurality of the stored first authentication objects to determine a plurality of compromised accounts;
         generate an incident report comprising results of the analyses of the plurality of stored first authentication objects and the plurality of stored network traffic records; and
         transmit the incident report via a second network connection that is not connected to, or visible to, to the identity provider;

wherein each unique identifier is a cryptographic hash generated by performing a plurality calculations and transformations on the respective authentication object.

2. The system of claim 1, wherein the authentication object inspector is operated by the identity provider.

3. The system of claim 1, wherein the authentication object inspector is operated by a client device communicating with the identity provider over a network.

4. A method for detecting and mitigating ticket-based attacks within a domain, comprising the steps of:
using an authentication object inspector operating on a computing device comprising a memory and a processor to:
receive network traffic via a first network connection, the network traffic comprising at least a plurality of first authentication objects known to be generated by an identity provider associated with an authentication domain;
store a record of each received first authentication object, with attached metadata comprising a timestamp of when each first authentication object was received, in a time-series database;
compute a unique identifier of each first authentication object;
store the unique identifier of each first authentication object in a database of unique identifiers for the identity provider;
receive a request for access to a network resource within the authentication domain accompanied by a second authentication object;
compute a unique identifier of the second authentication object;
determine if the second unique identifier exists in the database of unique identifiers for the authentication provider; and
where the unique identifier of the second authentication object does not exist in the database of unique identifiers:
analyze a plurality of the stored first authentication objects to determine a plurality of compromised accounts;
analyze a plurality of the stored network traffic records to determine a plurality of access paths;
generate an incident report comprising results of the analyses of the plurality of stored first authentication objects and the plurality of stored network traffic records; and
transmit the incident report via a second network connection that is not connected to, or visible to, to the identity provider;
wherein each unique identifier is a cryptographic hash generated by performing a plurality of calculations and transformations on the respective authentication object.

5. The method of claim 4, wherein the authentication object inspector is operated by the identity provider.

6. The method of claim 4, wherein the authentication object inspector is operated by a client device communicating with the identity provider over a network.

7. Non-transitory, computer-readable storage media having computer-executable instructions embodied thereon that, when executed by one or more processors of a computing system employing an asset registry platform for detecting and mitigating ticket-based attacks within a domain, cause the computing system to:

receive network traffic via a first network connection, the network traffic comprising at least a plurality of first authentication objects known to be generated by an identity provider associated with an authentication domain;
store a record of each received first authentication object, with attached metadata comprising a timestamp of when each first authentication object was received, in a time-series database;
compute a unique identifier of each first authentication object;
store the unique identifier of each first authentication object in a database of unique identifiers for the identity provider;
receive a request for access to a network resource within the authentication domain accompanied by a second authentication object;
compute a unique identifier of the second authentication object;
determine if the second unique identifier exists in the database of unique identifiers for the authentication provider; and
where the unique identifier of the second authentication object does not exist in the database of unique identifiers:
analyze a plurality of the stored first authentication objects to determine a plurality of compromised accounts;
analyze a plurality of the stored network traffic records to determine a plurality of access paths;
generate an incident report comprising results of the analyses of the plurality of stored first authentication objects and the plurality of stored network traffic records; and
transmit the incident report via a second network connection that is not connected to, or visible to, to the identity provider;
wherein each unique identifier is a cryptographic hash generated by performing a plurality of calculations and transformations on the respective authentication object.

8. The non-transitory, computer-readable storage media of claim 7, wherein the authentication object inspector is operated by the identity provider.

9. The non-transitory, computer-readable storage media of claim 7, wherein the authentication object inspector is operated by a client device communicating with the identity provider over a network.

10. A system for detecting and mitigating ticket-based attacks within a domain employing an asset registry platform, comprising one or more computers with executable instructions that, when executed, cause the system to:
receive network traffic via a first network connection, the network traffic comprising at least a plurality of first authentication objects known to be generated by an identity provider associated with an authentication domain;
store a record of each received first authentication object, with attached metadata comprising a timestamp of when each first authentication object was received, in a time-series database;
compute a unique identifier of each first authentication object;
store the unique identifier of each first authentication object in a database of unique identifiers for the identity provider;

receive a request for access to a network resource within the authentication domain accompanied by a second authentication object;

compute a unique identifier of the second authentication object;

determine if the second unique identifier exists in the database of unique identifiers for the authentication provider; and where the unique identifier of the second authentication object does not exist in the database of unique identifiers:

analyze a plurality of the stored first authentication objects to determine a plurality of compromised accounts;

analyze a plurality of the stored network traffic records to determine a plurality of access paths;

generate an incident report comprising results of the analyses of the plurality of stored first authentication objects and the plurality of stored network traffic records; and transmit the incident report via a second network connection that is not connected to, or visible to, to the identity provider;

wherein each unique identifier is a cryptographic hash generated by performing a plurality of calculations and transformations on the respective authentication object.

11. The system of claim 10, wherein the authentication object inspector is operated by the identity provider.

12. The system of claim 10, wherein the authentication object inspector is operated by a client device communicating with the identity provider over a network.

* * * * *